(12) United States Patent
LaDue

(10) Patent No.: US 8,135,362 B2
(45) Date of Patent: Mar. 13, 2012

(54) SYMBOL STREAM VIRTUAL RADIO ORGANISM METHOD AND APPARATUS

(75) Inventor: Christoph Karl LaDue, Brighton Beach (AU)

(73) Assignee: Symstream Technology Holdings Pty Ltd, Victoria (AU)

( * ) Notice: Subject to any disclaimer, the term of this patent is extended or adjusted under 35 U.S.C. 154(b) by 582 days.

(21) Appl. No.: 11/370,014

(22) Filed: Mar. 6, 2006

(65) Prior Publication Data

US 2006/0229090 A1     Oct. 12, 2006

Related U.S. Application Data

(60) Provisional application No. 60/659,575, filed on Mar. 7, 2005.

(51) Int. Cl.
*H01Q 11/12* (2006.01)
(52) U.S. Cl. .......... 455/126; 455/69; 455/561; 455/502; 455/205; 370/328; 370/350; 375/358
(58) Field of Classification Search .................... 455/69, 455/126, 561, 502, 205; 375/358
See application file for complete search history.

(56) References Cited

U.S. PATENT DOCUMENTS

| | | |
|---|---|---|
| 4,426,555 A | 1/1984 | Underkoffler |
| 4,471,165 A | 9/1984 | DeFino et al. |
| 5,343,554 A * | 8/1994 | Koza et al. .................... 706/13 |
| 5,428,183 A | 6/1995 | Matsuda et al. |
| 5,532,641 A | 7/1996 | Basasubramanian et al. |
| 5,553,194 A | 9/1996 | Seza et al. |
| 5,590,406 A | 12/1996 | Bayley et al. |
| 5,612,974 A | 3/1997 | Astrachan |
| 5,711,012 A | 1/1998 | Bottoms et al. |
| 5,751,718 A | 5/1998 | Yip et al. |
| 5,778,316 A | 7/1998 | Persson et al. |
| 5,781,593 A | 7/1998 | Petch et al. |
| 5,818,870 A | 10/1998 | Yaguchi |
| 5,864,813 A | 1/1999 | Case |
| 5,905,761 A | 5/1999 | Je et al. |
| 5,978,365 A | 11/1999 | Yi |
| H1880 H | 10/2000 | Vines et al. |
| 6,285,767 B1 | 9/2001 | Klayman |
| 6,353,745 B1 | 3/2002 | Wehrend et al. |
| 6,426,960 B2 | 7/2002 | Antonio |
| 6,477,176 B1 | 11/2002 | Haemaelaeinen et al. |
| 6,501,962 B1 | 12/2002 | Green |
| 6,584,442 B1 | 6/2003 | Suzuki et al. |
| 6,952,445 B2 * | 10/2005 | Murphy ........................ 375/232 |
| 6,958,780 B1 | 10/2005 | Kawai |

(Continued)

FOREIGN PATENT DOCUMENTS

EP     0801513     10/1997

(Continued)

OTHER PUBLICATIONS

Toroslu et al., "A Genetic Algorithm Approach for Verification of the Syllable-Based Text Compression Technique", XP-000909078, Journal of Information Science, 1997, pp. 365-372.

(Continued)

*Primary Examiner* — Vladimir Magloire
(74) *Attorney, Agent, or Firm* — Blakely, Sokoloff, Taylor & Zafman

(57) ABSTRACT

A method of communicating using evolutionary synthesis for band-limited voice and data channels.

15 Claims, 27 Drawing Sheets

U.S. PATENT DOCUMENTS

| | | | |
|---|---|---|---|
| 7,031,739 B1 | 4/2006 | Imura | |
| 2001/0033560 A1 | 10/2001 | Tong et al. | |
| 2001/0038347 A1 | 11/2001 | Avery et al. | |
| 2002/0128840 A1* | 9/2002 | Hinde et al. ............ | 704/258 |
| 2003/0133423 A1 | 7/2003 | LaDue | |
| 2005/0147057 A1 | 7/2005 | LaDue | |
| 2005/0278169 A1* | 12/2005 | Hardwick ............... | 704/223 |
| 2006/0009209 A1* | 1/2006 | Rieser et al. ............ | 455/423 |
| 2006/0159120 A1* | 7/2006 | Klm ........................ | 370/465 |

FOREIGN PATENT DOCUMENTS

| | | |
|---|---|---|
| EP | 0844796 | 5/1998 |
| EP | 0948154 | 10/1999 |
| WO | WO95/26603 | 10/1995 |
| WO | WO97/19569 | 5/1997 |
| WO | WO97/29566 | 8/1997 |
| WO | WO98/59449 | 12/1998 |
| WO | WO99/20021 | 4/1999 |
| WO | WO99/49677 | 9/1999 |
| WO | WO99/50693 | 10/1999 |
| WO | WO00/13432 | 3/2000 |
| WO | WO99/60757 | 11/2000 |
| WO | WO01/89139 | 11/2001 |
| WO | WO 2005/015769 | 2/2005 |
| WO | WO 2005/086443 | 9/2005 |
| WO | WO 2006/011866 | 2/2006 |

OTHER PUBLICATIONS

Pedroza et al., "Evolutionary Synthesis of Communication Protocols", EE Dept. Federal Univ. of Rio de Janeiro, IEEE 2003, pp. 986-993.
Office Action for U.S. Appl. No. 09/573,466, dated Sep. 9, 2003, 5pgs.
Restriction Requirement for U.S. Appl. No. 09/573,466, dated May 18, 2004, 6 pgs.
Office Action for U.S. Appl. No. 10/294,765, dated Jun. 27, 2007, 15 pgs.
Final Office Action for U.S. Appl. No. 10/294,765, dated Nov. 20, 2007, 6 pgs.
Advisory Action for U.S. Appl. No. 10/294,765, dated Feb. 20, 2008, 3 pgs.
Office Action for U.S. Appl. No. 10/294,765, dated Jul. 9, 2008, 6 pgs.
Office Action for U.S. Appl. No. 10/294,765, dated Jan. 7, 2009, 6 pgs.
Restriction Requirement for U.S. Appl. No, 10/294,765, dated Jun. 30, 2009, 4 pgs.
Office Action for U.S. Appl. No, 10/294,765 dated Nov. 3, 2009, 6 pgs.
Office Action for U.S. Appl. No. 10/294,765, dated Feb. 18, 2010, 7pgs.
Office Action for U.S. Appl. No. 11/029,967, dated Sep. 11, 2008, 10 pgs.
Office Action for U.S. Appl. No. 11/029,967, dated Dec. 23, 2008, 7 pgs.
Office Action for Canadian Application No. 2,411,043, dated Feb. 12, 2007, 2 pgs.
Office Action for Canadian Application No. 2,411 043, dated Jan. 4, 2008, 2 pgs.
Office Action for Chinese Application No. 00819759.8, dated Jul. 15, 2005, 7 pgs.
Office Action for Chinese Application No. 00819759.8, dated Feb. 24, 2006, 5 pgs.
Office Action for European Application No. 00969093.4, dated Nov. 23, 2004, 8 pgs.
Search Report for European Application No. 00969093.4, dated Aug. 26, 200.4, 3 pgs.
Search Report for European Application No. 05016515.8, dated Oct. 4, 2005, 7 pgs.
Office Action for European Application No. 05016515.8, dated Jan. 9, 2006, 8 pgs.
Search Report for European Application No. 06075263.1, dated Aug. 24, 2006, 5 pgs.
Office Action for European Application No, 06075263.1, dated Jan. 22, 2007, 1 pgs.
Examination Report for Indian Application No. 2002/01176/Del, dated Sep. 19, 2007, 3 pgs.
Office Action for Israeli Application No. 152895, dated Jun. 26, 2007, 1 pgs.
International Preliminary Exam Report for PCT Application No. PCT/AU00/01229, dated Sep. 16, 2002, 5 pgs.
GSM 04.11 Version 3.3.0, "Point-to-Point Short Message Service Support on Mobile Radio Interface", ETSI/GSM, Jan. 1993, 73 pgs.
Stanjano et al., "The Thinnest of Clients: Controlling It All Via Cellphone", *Mobile Computing and Communications Review*, vol. 2, No. 4, 8 pgs.

* cited by examiner

SYMBOL STREAM VIRTUAL RADIO ORGANISM METHOD AND APPARATUS

This application claims the benefit of U.S provisional patent application No. 60/659,575, entitled Symbol Stream Virtual Radio Organism Method and Apparatus, filed Mar. 7, 2005, presently pending.

BACKGROUND OF THE INVENTION

1. Field of the invention

The invention relates to providing virtual communications protocols, processes and procedures that enables a completely virtual multi channel, communications platform for mobile cellular (MC) mobile trunked radio (MTR), specialised mobile radio (SMR), Enhanced Specialised Mobile Radio (ESMR), IEEE801.11, IEEE802.16, Hiperlan2, and other wireless network topologies without modifying existing network elements or operational procedures.

2. Description of Related Art

Telecommunications technology that offers many enhancements to conventional wireless service offerings to network operators and wireless customers such as 2.5 Generation, third generation (3G) and proposed fourth generation (4G) require significant wireless and wireline network infrastructure upgrades. These upgrades are costly and do not sufficiently serve the needs of wireless user on a global scale. The invention introduces novel art that teaches how to implement a completely scalable, multi application specific broadband multimode wireless telecommunications platform that is designed for selected mobile wireless communications network topologies, without introducing new network elements such as base site radios, base site controllers, new switching topology upgrades and the like. Also in most cases these new mobile cellular technologies require additional radio spectrum allocation and the like. Many mobile cellular technologies exist today that enable mobile telecommunications large scale public land mobile systems. However the most dominate mobile cellular public land mobile network is the Global System for Mobile (GSM). GSM operates with 800-850 Mhz, 900 Mhz, 1800 Mhz and 1900 Mhz. Also Wireless Local Area Network (WLAN) Wireless Wide Area Network (WWAN) mesh topology networks are gaining ground in terms deployment on a global scale. The invention seamlessly merges Second Generation (2G) mobile cellular networks with current and planned IEEE.802.11, IEEE.802.16 variants such as Worldwide Interoperability for Microwave Access (WI-MAX) and the like. The invention applies its unique genetic algorithmic language to both 2G mobile cellular networks and Wireless Local Area Network (WLAN) Wireless Wide Area Network (WWAN) mesh topology in order to create an incredibly secure, efficient and low cost network topology that will operate on a global scale.

GSM networks include over 690 Second Generation (2G) mobile wireless Public Land Mobile Networks that are defined as Mobile Transaction Area (MTA) and Rural Subscriber Areas (RSA). These 690 GSM PLMN Plan Areas also include 400 plus 2.G, GPRS and Third Generation (3G) operators. In total, GSM networks provide wireless services to 777.5 million voice and data users world wide. The invention provides the first completely virtual, multi-featured wireless broadband communications platform that transforms conventional 2G wireless mobile telephony networks into highly flexible high bandwidth communication systems. This is accomplished without all the upfront costs associated with conventional deployment strategies that require network element upgrades such as expensive additional radio spectrum information that are required to enable such packet switched networks as General Packet Radio System (GPRS) multislot class eight, GPRS multislot class 10, GSM EDGE-EGPRS multislot class 10 technology, High Speed Circuit Switched Data (HSCSD) Universal Mobile Telephone System (UMTS), CDMA20001X, WCDMA, 3GSM, orthogonal frequency divisional multiple access (OFDM) networks and the like.

Such mobile satellite networks as Inmarsat, Globalstar-CDMA, Iridium-TDMA, Ellipsoid satellite networks, Big Leo, Little Leo, Geo and HALO high altitude low Earth orbit aircraft that carry specialised stratospheric base sites can benefit from the inventions means and methods. There are many other such networks that could be virtually upgraded with the inventions means and methods. The invention enables the seamless convergence of Satellite, terrestrial mobile cellular, and wireless local area networks, wireless wide area networks.

The invention applies the means and method of deploying instant messaging (IM), Push-to-Talk voice and data over cellular (PoC), music file CODEC delivery such as MPEG 3-MP3, MPEG 4, video content and the like. IP Multimedia Subsystem (IMS) is a new framework, basically specified for mobile wireless networks for providing Internet Protocol (IP) telecommunications services that incorporate session initiation protocol (SIP). The invention also uses a novel approach to topology hiding interworking gateway (THIG) that provides another layer of message encryption in addition to its Holophasec 3D Codec encryption. The invention applies these new modalities in a completely novel way that requires no carrier-network element upgrade and the like. Mobile cellular carriers worldwide are facing decreasing Average Revenues Per User (ARPU) and need to benefit from their return on investment (ROI). Because of strong competition, the prices of voice calls and Internet access are declining and the carrier's margins are being reduced. Carriers can no longer afford to offer only voice and ever faster Internet access because these items are becoming mere commodities.

The invention applies a virtual portal approach that enhances Second Generation (2G) and applies a vast service and application array such as the Multimedia Domain (MMD) and the like. The invention applies video, data and voice chat services, push-to-talk services, person to person VOIP services that also include high speed symbolic data services and the like. The invention enhances 2G network with a full range of applications such as instant messaging with presence management. The invention applies future-proof virtual network solutions that have no comparison in the art today. The invention utilise both the mobile cellular voice channel and other bearer and teleservice asynchronous data channels to transmit voice, data and specialised voice over I.P. services. The invention provides H3D Codec files that enable point-to-point voice and data over uniquely encrypted simultaneous voice and data services from the inventions SVRO Radio Module (SRM) to any user-point of presence operating on the internet and the Public Switched Telephone Network (PSTN).

SUMMARY OF THE INVENTION

According to a first aspect of the invention there is provided the application of novel Holophasec 3D Genetic Algorithms that enable the most efficient and secure virtual modulation ever developed for voice channels and data channels that operate within the topology of wireless and wireline telecommunications networks. This unique modification is defined in this disclosure as Holophasec 3D-Genetic Algorithmic Virtual Modulation (H3D-GA-VM). According to the second aspect of the invention there is provided a Holophasec 3D Codec (H3D-Codec). The Holophasec 3D Codec is applied to single channel voice and data channels utilised in all telecommunications network topologies. The H3D-Codec is used to algorithmically replace the conventional vocoder that is used all voice telephony.

According the third aspect of the invention there is provided the means and method if enabling multiplexed-multichannel communications over wireless and wireline telecommunication networks without the need of modifying any network element of any telecommunications network. According to the fourth aspect of the invention there is provided a specialised SVRO Radio. Module (SRM) that utilises modified protocol stacks and other novel features that enable single and multichannel communications over wireless and wireline networks. According to the fifth aspect of the invention there is provided a SVRO Broadcom modem that provides direct quick connect, packet switched virtual circuit over the conventional multichannel air interface voice and data channels telephone lines. According to the sixth aspect of the invention there is provided a SVRO Broadcom modem that provides direct quick connect, packet switched virtual circuit over the conventional single and multichannel telephone voice and data lines.

According to the seventh aspect of the invention there is provided the means and method modifying existing protocol stacks that are utilised in relation to conventional mobile cellular (MCR), mobile trunked radio (MTR), specialised mobile radio (SMR) WI-FI IEEE802.11, WiMAX IEEE802.16e, Hyperlink/2 and other equivalent handsets. According to the eighth aspect of the invention there is provided a single and multiple channel management system defined here as the SVRO Transaction Event Processing (STEP) gateway system that also acts a specialised public and private Internet Service Provider (ISP) interface between users and the over all global telecommunications network topology. The invention provides hybrid quick connect/disconnect virtual circuit TCP/IP-Voice Over I.P-simultaneous voice and data services. According the eight aspect of the invention there is provided a SVRO Wireless Server that applies Holophasec 3D-Genetic Algorithmic Virtual Modulation (H3D-GA-VM) over Industrial System (ISM) unlicensed frequencies, IEEE802.11, IEEE802.16 10-66 GHz WiMAX, HIPERLAN/2, DECT, Bluetooth systems and the like in one user device.

The invention applies H3D-GA-VM methods to enable a comprehensive combination of user and multi-layered network features that enable broadband performance over a plurality of conventional TDMA, CDMA, SDMA, OFDM, wireless mobile networks such as Global System for Mobile (GSM) 800-850/900/1800/1900, CDMA IS-95, CDMA2000, TS-CDMA, UMTS-WCDMA, GPRS, EGPRS, 3GSM, iDEN Mobile trunked Radio (MTR-PTT), EDACS Mobile Trunked Radio (MTR), Tetra Mobile Trunked Radio (MTR), Push-to-Talk (PTT) radio networks, IEEE802.11 a/g broadband networks, IEEE802.16 a/g WI-FI, WiMAX dual band systems broadband networks, Bluetooth frequency hopped Spread Spectrum (FHSS), DECT, Home RF, and the like. The invention can also be applied to all known forms of mobile satellite communication topologies. Such mobile satellite networks as Inmarsat, Globalstar-CDMA, Iridium-TDMA, Ellipsoid satellite networks, Big Leo, Little Leo, Geo and other such networks could be virtually upgraded with the inventions means and methods.

The invention enables a vast array of application specific systems and services. The invention enables broadband communications over a plurality of wireless and wireline communication topologies. Such financial transaction application communications for: Automatic Teller Machine (ATM) systems, Merchant Terminal EFT/POS systems, and Small Bank Branch Financial terminal systems. Additional financial related applications for improved pre-pay debit financial applications such as mobile-wireless service prepay, utility prepay services and the like.

The invention enables a vast array of business-enterprise application specific systems and services such as email, SVRO Short Message-Service (SSMS), Universal Messaging, user group message broadcast and delivery, document file transfer and the like. The invention provides a vast array of stationary Machine to Machine (M2M) telemetry/telematics related applications such as; Electrical. Meter-Power Usage reporting, Electrical and Gas Meter anti-tamper management and reporting, Gas Meter-Usage reporting, Traffic Light control systems, Heat Ventilation Air conditioning Control (HVAC), Commercial and Residential Security System status reporting, High value Agricultural Asset Management, High value Manufactured Goods-Asset Management, Maritime Port Security and Container tracking and the like. The invention also provides on ship container tracking, goods-condition analysis and the like. The invention also provides unique marine anti-piracy systems and the like.

The invention provides a vast array of mobile Machine to Machine (M2M) telemetry/telematics related applications such as; Motor Vehicle Tracking & systems management, Motor Vehicle Emergency response, Motor Vehicle Anti-theft response systems, Motor Vehicle Fleet Management, Motor Vehicle Anti-Hijacking systems, Motor Vehicle Subsystem Status reporting, Railroad Routing & Management, Rail Road Train car and Un-tethered Container Tracking. The invention enables a vast array of application specific systems that enable video and audio file content delivery to users. The invention enables high bandwidth transfer of MPEG 3, MPEG 4 and other such compressed music and video content files to and from a specialised SVRO Radio (SRM). The invention provides an SRM with a fully integrated hard drive and the like. The invention also provides novel pre-pay debit services and the like by introducing unprecedented security and user call tracking.

BRIEF DESCRIPTION OF THE DRAWINGS

The accompanying drawings, which are incorporated in and constitute a part of the specification, illustrate a preferred embodiment of the invention and together with a general description given above and the detailed description of the preferred embodiments given below, serve to explain the principles of the invention. It is to be understood that the particularity of the ensuing description does not supersede the generality of the foregoing summary of the invention.

DETAILED DESCRIPTION

Figure 1:
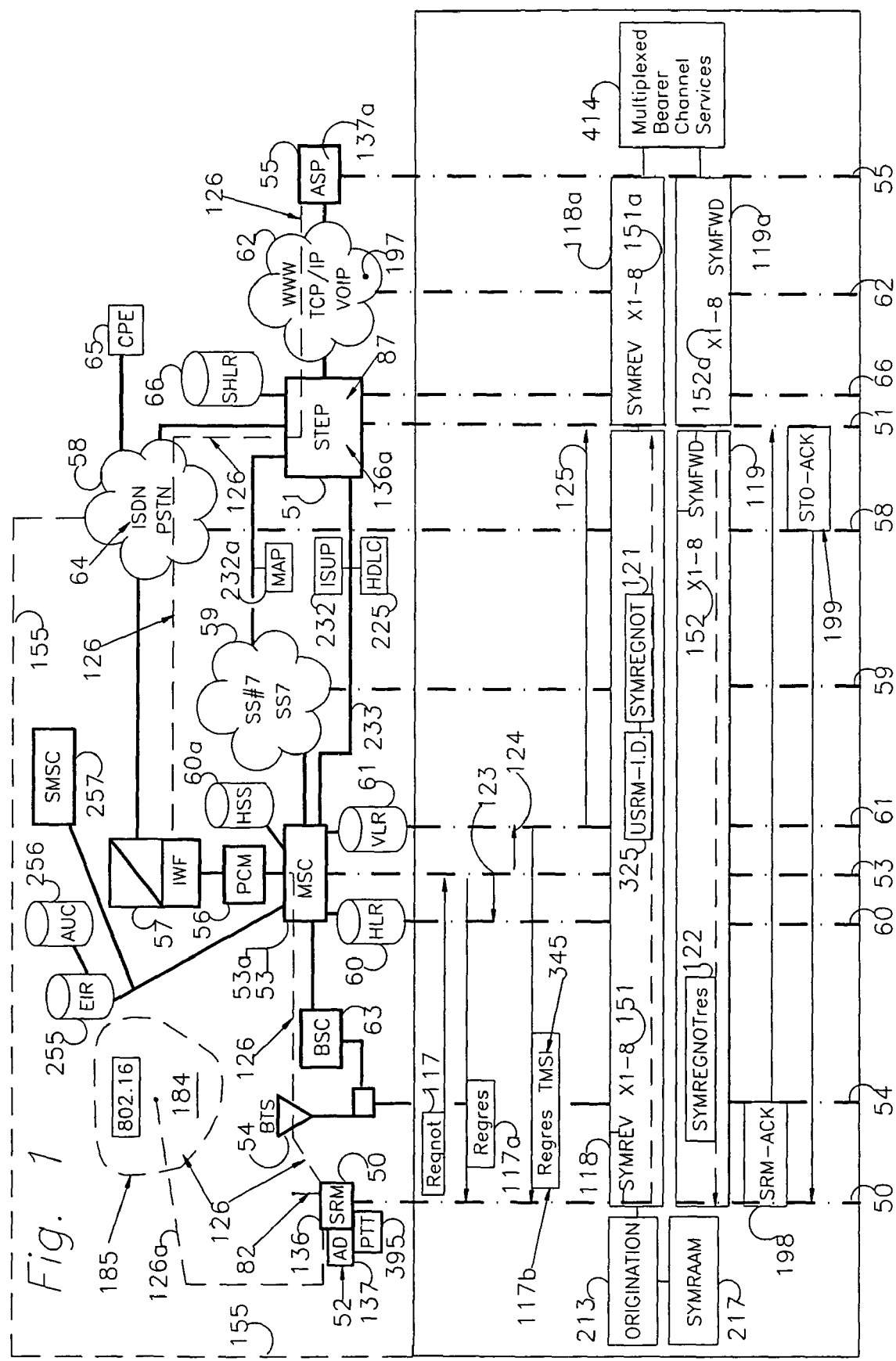
FIG. 1, Depicts the SVRO Virtual voice and data network operating within the network elements of an existing wireless mobile cellular Public Land Mobile Network (PLMN) according to the invention.

Reference will now be made in detail to the present preferred embodiments of the invention illustrated in the accompanying drawings. In describing the preferred embodiments and applications of the invention, specific terminology is employed for the sake of clarity and establishment of novelty. However, the invention is not intended to be limited to the specific terminology so selected. Terminology used in this disclosure is to be understood in terms how each specific element includes all technical equivalents that operate in a similar manner, in terms of similar technological configurations that are included in the body content of the disclosure.

According to a first aspect of the invention is the application of novel Holophasec 3D Genetic Algorithms that enable the most efficient virtual modulation ever developed for voice channels and data channels that operate within the topology of wireless and wireline telecommunications networks. This unique modification is defined in this disclosure as Holophasec 3D-Genetic Algorithmic Virtual Modulation (H3D-GA-VM). According to the second aspect of the invention there is provided a Holophasec 3D Codec (H3D-Codec). The Holophasec 3D Codec is applied to single channel voice and data channels utilised in all telecommunications network topologies. The H3D-Codec is used to algorithmically replace the conventional vocoder that is used all voice telephony including the inventions mobile SVRO Radio Module (SRM) cellular/WWLAN multimode handsets. The H3D-Codec enables both K secure voice and high bandwidth data communications over mobile wireless channels such as voice based band-limited non-linear channels with memory and asynchronous data channels without memory that are used in mobile cellular PCM channels and wireless and wireline voice over I.P. channels.

According to the second aspect of the invention the inventions H3D-Codec introduces high bandwidth data and voice over internet protocol (VOIP) functionality to such data bearer service-channels as packet assembler/disassembler data (PAD), Group three Facsimile (G3), X.25, rate adapted subrate information—circuit switched synchronous and synchronous duplex data, 300-9600 bps, simultaneous voice and data services and the like. The invention provides H3D-Codec services from the inventions SVRO Radio Module (SRM), the inventions SVRO Radio Module (SRM) and the Symbols-Stream Transaction Event Processing (STEP) gateway to any designated application service provider (ASP) or any other point-of-presence (POP) such as another SRM and or customer premise equipment (CPE) such as personal computer, laptop computer, personal digital assistant (PDA).

According the third aspect of the invention there is provided the means and method of enabling multiplexed-multichannel communications over wireless such as a GSM absolute frequency-digital traffic channel and wireline telecommunication networks without the need of modifying any network element of any telecommunications network. The invention provides simultaneous multichannel-multiplexing using H3D-Codec—high bandwidth data and voice over internet protocol (VOIP) functionality to such data bearer service-channels as packet assembler/disassembler data (PAD), Group three Facsimile (G3), X.25, rate adapted subrate information—circuit switched synchronous and synchronous duplex data, 300-9600 bps, simultaneous voice and data services and the like. The invention provides H3D-Codec services from the inventions SVRO Radio Module (SRM), the inventions SVRO Radio Module (SRM) and the Symbols-Stream Transaction Event Processing (STEP) gateway to any designated application service provider (ASP) or any other point-of-presence (POP) such as another SRM and or customer premise equipment (CPE) such as personal computer, laptop computer, personal digital assistant (PDA).

According to the fourth aspect of the invention there is provided a specialised SVRO Radio Module (SRM) that utilises modified protocol stacks and other novel features that enable single and multichannel communications over wireless and wireline networks. According to the fifth aspect of the invention there is provided a SVRO Broadcom (SSB) modem that provides direct quick connect, packet switched virtual circuit over the conventional multichannel air interface voice and data channels telephone lines. According to the sixth aspect of the invention there is provided a SVRO Broadcom (SSB) modem that provides direct quick connect, packet switched virtual circuit over the conventional single and multichannel telephone voice and data lines. According to the seventh aspect of the invention there is provided the means and method modifying existing protocol stacks that are utilised in relation to conventional mobile cellular (MCR), mobile trunked radio (MTR), Push-to-Talk (PTT) radio networks, PPT over cellular (POC), iDEN-MTR-PTT, specialised mobile radio (SMR) IEEE802.11, IEEE802.16-WIFI, WiMAX and other equivalent handsets and user equipment radio cards and the like. In fact the invention the means and method of converging (2G) and IEEE802.16 variants.

According to the eighth aspect of the invention there is provided a single and multiple channel management system defined here as the SVRO Transaction Event Processing (STEP) gateway system that also acts as a specialised public and private Internet Service Provider (ISP) interface between users and the over all global telecommunications network topology. The invention provides hybrid quick connect/disconnect virtual circuit TCP/IP-Voice Over I.P-simultaneous voice and data services. According the ninth aspect of the invention there is provided a SVRO Radio Module that applies Holophasec 3D-Genetic Algorithmic Virtual Modulation (H3D-GA-VM) over Industrial System (ISM) unlicensed frequencies, such as DECT, Bluetooth systems, IEEE802.16, WIFI and WiMAX networks and the like. The marriage of second generation (2G) SVRO methods with SVRO methods applied to IEEE802.16, WIFI and WiMAX networks and the like into one comprehensive mobile wireless communications platform.

According to the tenth aspect of the invention there is provided the means and method of applying push-to-talk (PTT) voice and data services over any mobile cellular channel, and or IEEE802.11, IEEE802.16 including GSM while using the H3D-Codec means and method.

The invention applies H3D-GA-VM methods to enable a comprehensive combination of user and multi-layered network features that enable broadband performance over a plurality of conventional wireless mobile networks such as Global System for Mobile (GSM) 450/800/850900/1800/1900 Mhz-V.110 ISDN data services, 9.6 Circuit Switched Data (CDS), high speed circuit switched data (HSCDS), CDMA IS-95, CDMA2000, TS-CDMA, UMTS-WCDMA, GPRS, EGPRS, 3GSM, iDEN Mobile trunked Radio (MTR), Tetra Mobile Trunked Radio (MTR) EDACS Mobile Trunked Radio (MTR), Push-To-Talk (PTT) radio networks, PTT over cellular (PTT-PoC) IEEE802.11 a/g broadband networks, IEEE802.16 a/g WI-FI, WiMAX dual-band broadband networks, and the like. The invention can also be applied to all known forms of mobile satellite communication topologies. Such mobile satellite networks as Inmarsat, Globalstar-CDMA, Iridium-TDMA, Ellipsoid satellite networks, Big Leo, Little Leo, Geo and other such networks could be virtually upgraded with the inventions means and methods.

The invention comprises features that are best described as a combination of circuit switched, packet switched protocol topologies, and pre-connection data and the like. This novel combination includes the best of both digital voice and data circuit switched channels, packet switched channels, control channels, channel overhead monitoring, caller I.D. used for application specific messaging, logical T1/E1-DS0 plus channels, ISDN channels, Frame Relay channels, Voice Over I.P. channels, TCP/IP variants, GSM Mobile Application Part (MAP) protocol, ANSI 41 protocol that utilises Signaling System Seven (SS7) which ANSI SS7 for North America and some countries in South America and Signaling System Number Seven Channels (SS#7) is CCITT SS7 which is used throughout the rest of world.

The invention provides 2.5 Generation, Third Generation (3G), Fourth Generation (4G) performance over existing second generation (2G) mobile cellular radio (MCR), mobile trunked radio (MTR), specialised mobile radio (SMR) and enhanced specialised mobile (ESMR) wireless networks without requiring any circumvention of conventional operational interim standards (IS), International Telecommunications Union (ITU) recommendations, European Telecommunications Union (ETU), and other related standard organisation governing operational standards. The invention can also be applied to all known forms of mobile satellite communication topologies. Such mobile satellite networks as Inmarsat, Globalstar-CDMA, Iridium-TDMA, Ellipsoid satellite networks, Big Leo, Little Leo, Geo and other such networks could be virtually upgraded with the inventions means and methods.

The invention requires no additional spectrum assignment in order to provide these additional features. The invention in no way circumvents host mobile wireless public land mobile network (PLMN) element-equipment operations. Such network elements as conventional base site (BS), base transceiver stations (BTS), base site controllers (BSC), mobile switching centre (MSC-MTSO) hardware, firmware and software modalities are also not adversely affected. The invention only requires new classes of service (COS) settings to mobile switching centre (MSC) coupled with unique virtual user authentication, and simultaneous multi-user channel assignment methods. The invention also provides completely novel means and methods of reusing and improving existing authentication, signaling, remote feature access protocols that only enhance and extend host wireless narrowband network functionality without adversely affecting any conventional host network operational modalities. The inventions means and methods can operate over any GSM, CDMA, and Mobile Trunked Radio (MTR) Base Transceiver Station (BTS) without requiring any hardware or software upgrade.

The inventions specialised mobile wireless radio module protocol stack also contains unique modification that enable simpler human machine interface (HMI) interface instruction, command sets, and service request protocols, multislot-channel multiplexing of up to eight simultaneous channels during one Symbols-Stream communications event. The invention enables the utilisation of eight forward channel and eight reverse channel time slots simultaneously for a plurality of digital data over voice channels, bearer channel services such as: 9.6 circuit switched data (CDS), Packet assembler/Disassembler (PAD), High Speed Circuit Switched (HSCSD) traffic channel (TCH), and V.110 ISDN data service processes and procedures. The most widely dispersed communications service is digital voice. For all Mobile Cellular Public Land Mobile (PLMN) support robust voice services. 9.6 circuit switched data (CDS), PAD data, HSCSD, G3 Facsimile and V.110 ISDN are available on all Base Transceiver Stations (BTS). Conversely SVRO multichannel data over multi-voice channels can operate anywhere there is mobile cellular GSM and or CDMA coverage These modifications enable a wide range of new service modalities.

These new operational features include the means and method of one user accessing and utilising all multislot-channel-time slots and user frames of a 2G narrowband digital traffic channel (DTC) as defined in the art as the physical frequency—Absolute Radio Frequency Channel Number (ARFCN). A Digital Traffic Channel (DTC) defines the physical frequency bounds that enable multiple user bi-directional communications within the logical modulation structures of multiple user traffic channels (TCH). A TCH channel contains all voice, data, bearer and teleservice channel services, control and signaling protocols, processes and procedures. For example a GSM TDMA DTC channel enables up to eight time-slots or multislot/TCH-channels. The invention enables a novel approach to multiplexed communications. An entire DTC can be occupied i.e., all reverse uplink TCH channels, and all forward downlink TCH channels by one interleaved-multiplexed SVRO Radio Module (SRM). In this way the inventions multichannel enabled SRM can simultaneously manage one forward and reverse multichannel SVRO voice, data and/or control and signaling communications event cycle. A CDMA digital traffic channel (DTC) can support more than eight simultaneous TCH users. The invention is easily applied to all forms of CDMA wireless and wireline related voice and data communications.

For example the invention provides the multiple channel access that exceeds the current limits of class eight and class 10 GPRS and EDGE service capabilities and 3G and 4G multichannel service capabilities. In fact the invention provides the means and method of enabling user access to all eight logical-multislot channels of a GSM 450/850-900/1800/1900 host network digital traffic channel (DTC). The invention is not effected by high traffic loads because the protocols processes and procedures operate at half (TCH/H) or full rate (TCH/F) In one of many novel protocol modalities a user can initialise a simultaneous voice and data session. The protocol can enable a conventional voice call and multichannel data, text or file download/upload process as a combined communications event while using a single narrowband GSM, CDMA, iDEN-Nextel, Tetra, EDACS, digital traffic channel (DTC) in conjunction with one SVRO Radio Module (SRM) and a virtually connected SVRO Transaction Event Processing (STEP) Gateway system.

Selected mobile wireless public land mobile networks (PLMN) simply act as a communication conduit. The invention also applies is H3D-GA-VM modulation methods to Push-To-Talk (PTT) radio networks that operate improved Push-To-Talk Over Cellular Network (PoC) standards which helps operators to establish an open standard for PTT services. The invention utilises a novel, straight forward means and method of applying H3D-GA-VM modulation over Push-To-Talk (PTT) 'walkie-talkie' radio networks for pulse code modulation (PCM) communication networks and Push-To-Talk (PTT) 'walkie-talkie' radio utilising unique voice over I.P. that are virtually modified and adapted to the inventions H3D-VOIP. In fact the invention introduces wireless push-to-talk (PTT) over long distance VOIP topologies between a plurality of the inventions SRMs.

The inventions unique modulation method introduces quick-connect-fact packet switched simultaneous voice, data, text, audio and video services over any conventional or proposed Push-To-Talk (PTT) radio networks. The invention also applies specialised H3D-GA-VM methods that provide H3D-VOIP network links between a PTT enabled SRM and other PTT enabled SRMs that are operating within the virtual network topology of a SVRO Global Virtual Network. The invention brings back the tribal 'party line' culture that was a basis of the early days of telephony. However the invention enables 'pre-connection' PTT party to party 'keying,' that notifies a 'keyed' party that one or a plurality of SVRO PTT virtual network services. The main issues that govern the parameters for a successful global deployment PTT services are interoperability, end-to-end performance, and rapid deployment. SVRO PTT services adhere the international PTT-PoC standard. However the invention vastly improves PTT services for it combines specialised voice over I.P. protocols that guarantee the global social development of push-to-talk (PTT) 'talk groups.'

The invention enables the simple idea of creating SVRO PTT-VOIP talk groups with separate member-users operating seamlessly across vast regional borders. For example a SVRO PTT-VOIP user operating in Melbourne Australia can easily 'key' a talk group member in London simply by keying the user who is operating a PTT-VOIP enabled SVRO Radio Module (SRM). Once a SVRO PTT-VOIP user has established a PTT-VOIP user group, each separate user no matter his location on the globe will always know when another member SVRO PTT-VOIP user is online. He simply 'keys' the user via SVRO PTT-VOIP pre-connection services These mobile wireless network topologies are virtually upgraded by applying: unique Vocoder waveform mapping protocols using specialised Holophasec 3D Spatial Diversity Logic (H3D-SPD) genetic algorithms (GA), that produce infinite variations in wave-sample formations that equate to a Holophasec 3D Modulation (H3D-MOD) method when the vocoder is actively engaged. The also occurs when the inventions Holophasec 3D Codec is virtually applied to selected PCM multislot channel structures, unique quick-connect-disconnect protocols, remote feature access protocols, manipulated ANSI 41, IS-41, GSM MAP, PDC, TS-CDMA authentication HLR/VLR protocols, GSM Mobile Application Part (MAP) authentication protocols, Japan PDC-SS7 equivalent authentication protocols, novel SIM card and multiple channel assignment overhead protocols and the like. These SVRO protocols are virtually applied to the inventions SVRO Radio Module (SRM) that embodies the synthesis of all these combined protocols. These SVRO protocols are virtually applied to the inventions SVRO Transaction Event (STEP) Gateway processor system that embodies the synthesis of all these protocols under one dynamic self-adaptive STEP gateway management system based upon artificial evolution and the inventions unique genetic algorithms.

The invention provides the means and methods of communicating bi-directionally via one or a plurality of physical and logical channels applied by any selected mobile wireless cellular network channel topology, a new highly efficient, flexible and cost effective virtual network communications system is created. This virtual network creation signifies the first aspect of the invention. However the invention also presents a novel way of adding minimal infrastructure to any public land mobile network (PLMN) by simply integrating the inventions SVRO Transaction Event Processing (STEP) gateway processing systems: which is a combination of switching matrix arrays, TCP/IP-VOIP server arrays, and storage area network (SAN) arrays.

According to one of a plurality of key aspects of the invention there is provided a specialised SVRO Radio Module (SRM). The SRM is a special radio module that utilises off the shelf electronic componentry to create, contain and manage novel voice channel H3D-Codec waveform mapping that are used to self adapt within the frequency, amplitude and linear phase limits of a two dimensional (2D) host digital PCM voice, or other bearer and teleservice service data channel. Once the inventions self-adaptive wave mapping fit within the operational bounds of the host channel the self-adaptive protocol optimises the over all performance of the channel— virtually. As such the invention provides a modified mobile wireless radio module protocol stack (MPS). A protocol stack is comprised of all mobile cellular radio (MCR), and or mobile trunked radio (MTR), PTT-PoC, operational procedures that contain autonomous system control functions that typically include user access protocols to the host network access procedures such as; registration notification (Regnot), voice and data service origination procedures, user authentication procedures, remote SRM management, remote application device management and the like. These conventional protocols include physical-frequency channel assignment, and user and control channel logical-channel assignment-time slot procedures and the like. This specialised protocol stack provides for virtual authentication access, using novel means and use of all eight logical channel-time slots that comprise a GSM digital traffic channel, while operating the inventions SVRO Radio Module (SRM) and its virtually connected Symstream Transaction Event Processing (STEP) Gateway system.

According to one or a plurality of aspects of the invention there is provided a specialised SVRO Transaction Event Processing (STEP) gateway system that is designed to manage specialised in-band and out-of-band virtual communications protocols, processes and procedures in conjunction with a plurality of operating SVRO Radio Modules (SRM). The inventions STEP gateway system comprises a plurality of support systems that create a unique network operation centre (NOC) systems that combine specialised servers, routers, storage area networks, modified service control points (SCP) such as home location registers (HLR), modified service switch points (SSP) and signaling transfer point (STP) data bases that manage selected ANSI-41, GSM-MAP standards and other related ITU recommendations. The STEP gateway system also combines novel uses of TCP/IP and voice over I.P. protocols, processes and procedures by simply applying the H3D-Modulation scheme to voice over I.P. channel-samples that can be applied to public TCP/IP networks and the invention private virtual private networks (VPN) that are used to support financial communications such as automatic teller machine (ATM) transaction communications, content delivery communications and operational statistical update communications. The invention also applies these VPN network modalities to merchant terminal-electronic financial transaction/point of sales (EFT/POS).

By applying H3D-MOD to TCP/IP-VOIP channels the invention provides the means and methods of applying simultaneous digital voice and data communication between bank switches and other financial application specific points of presence. The invention also introduces the hardest practical encryption known in the art today into these financial communication backend networks. The STEP gateway system also is comprised of components that contain special algorithms the enable special utilisation of specialised voice over I.P. protocols, processes and procedures for many other applications.

According to one of a plurality of aspects of the invention, there is applied a specialised artificial intelligence using artificial evolution genetic algorithmic (GA) procedure that creates a completely variable continuous discrete state (CDS) modulation due to unique wave mapping and multidimensional symbolic dictionary algorithmic procedures which defines the H3D-Modulation (H3D-MOD) method. This method redefines how to apply highly flexible symbolic dictionaries that can produce n-dimensional symbolic state bounds. This channel wave mapping procedures enables the generation of geometric symbolic construct (GSC) mapping. SVRO introduces novel use of H3D-Modulation to all forms of digital voice-Pulse Code Modulation channels, wireless and wireline data communications. The inventions unique H3D-Modulation method does not inject standard binary data through existing vocoders. The invention uniquely causes the vocoder to generate lossless symbolic data by re-mapping PCM speech samples. The invention also enables re-mapping all known forms of digital samples and applies these new methods to all telecommunications platforms regardless of the bearer service channel type, and this includes remapping of IEEE802.11, IEEE802.16 WI-FI, WiMAX and other such wireless LAN channel structures.

The invention can be applied to a plurality of mobile cellular radio public land mobile networks, mobile trunked radio protocols, processes and procedures that enable a total virtual communications network over existing mobile wireless communication network topologies. The first aspect of the invention comprises the H3D-Modulation method over one or plurality of traffic channels (TCH). H3D-Modulation enables unique protocols, processes and procedures that are applied virtually to one or plurality communication channels, user apparatus and virtual network back end equipment that embodies a novel means and method of mapping a plurality of waveform structures. In accord with the preferred embodiment there is provided a means and method of Generating Symbolic Alphabets for Data Communication through band-limited lossy communications channel with memory environments, while using artificial evolution. The invention addresses a new problem addressed here: lossless data communication over a compressed speech channel.

This type of channel is highly non-linear with memory, and hence conventional data modulation techniques are not applicable or demonstrate unacceptable performance. Thus a new approach is developed here, based on the concept of artificial evolution. The invention introduces a stochastic optimisation method described by John Holland in his book "Adaptation in natural and artificial systems." Since this time it has been used for a range of applications where traditional optimisation methods have proved to be insufficient. In this case, the invention uses a completely novel approach to genetic algorithm utilisation. As such it is used to search through a multidimensional signal space to find a set of signals that are robust under the impact of a non-linear channel with memory. At the heart of this novel approach is the development of an appropriate alphabet, or dictionary, of symbols that are harmonically optimised for use in communication over selected communication channel.

These H3D-Modulation symbols must fit into the designated bandwidth and satisfy any other channel constraints. As disclosed H3D-Modulation symbols are generated using a genetic algorithms. Once this set of symbols has been determined, which occurs offline, the signal processing is quite straightforward: modulation consists of simply choosing a symbol from the dictionary that represents the data that you wish to send, while demodulation involves finding the closest match to the received symbol in the dictionary. Artificial evolution is used to generate an optimal alphabet of symbols that satisfy the bandwidth and amplitude constraints of the channel, as well as any other limitations, while at the same time maintaining the maximum degree of differentiability between the symbols. The greater the difference there is between the symbols, the lower the probability of making an error in pattern matching at the receiver. Therefore, the invention introduces the first fully variable symbolic state modulation through digital communication methods whereby each symbol or string of symbols is utterly variable in terms of dynamic adaptation to the instant host channel.

The invention uniquely applies channel and channel symbol optimisation by Genetic Algorithm-H3D-Modulation. This invention introduces this new approach to communicate data over band-limited non linear channels with memory. Unlike conventional techniques this novel method does not require channel equalization and conventional modulation as such: it is based upon the concept of symbols—a set of pre-defined signals with finite bandwidths. Data is encoded into the symbols for transmission over one eight non-linear channels with memory simultaneously. This set of symbols is also decoded at the receiver by symbol matching using a type of neural network. The entire non-linear channel topology including symbol sets and decoder is synthesised by artificial evolution with the central aim of maximizing symbol separability. The invention presents the full algorithmic structure of the SVRO system which creates data communication over the GSM voice channel, and or IEEE802.11, IEEE802.16 WI-FI and WiMAX channels as an instant example. This evolutionary synthesis represents a new paradigm in communication system design.

The method is embodied within the algorithmic processes and procedures of the inventions H3D-Codec that can be applied as a software upgrade to all mobile wireless cellular radios including GSM radio modules, TS-CDMA-China radio modules, CDMA IS95-2000 radio modules, iDEN radio modules, GPRS radio modules, Push-To-Talk PoC (PTT) radio networks, UMTS-WCDMA radio modules, satellite radio modules, cable broadband modems, ADSL modems, the inventions SVRO Broad band-quick connect modems for metallic and fibre optic channels and the like. The H3D-Codec is in part a product of the inventions usage of evolutionary synthesis. For example: first, a "population" of waveform structures is created at random. In this case these specialised waveform structures or symbols are transmitted across the chosen channel. The fitness of each symbol is assessed harmonically, and then average fitness of the symbol population is increased by eliminating those entities that are judged unsuitable and keeping those that work well in the system.

Removed symbols are replaced by combining old fit entities; cross-over, or by random alteration; mutation, to produce new symbols or children. This process of assessment, removal, and replacement of symbols is repeated until an optimal solution is produced. This H3D-GA-VM algorithm is more clearly outlined in the enclosed figures. This survival of the fittest-approach mimics the natural selection that occurs in natural evolution in physics and biology. The invention applies these methods in order to generate a set of sampled-symbols that perform well as an optimised method of communication through the selected channel. However the channel is best optimised when cooperative competition is utilised instead of simplicity producing symbols from purely a competitive means and method.

How the fitness of symbols or sets of symbols is defined can vary—in very general terms a very fit symbol is one that can be transmitted through the channel and recognised successfully at the receiver with little or no error, while an unfit symbol is one that is often mistaken for another symbol or simply noise when transmitted through the system. The fittest symbol that survives the most adverse set of channel conditions is archived and used again by the inventions virtual network elements, in this way the invention enables a breeder reactor of symbolic dictionaries that can be reused over and over again while at the same time introducing new symbols into the main data symbols storage area network (SAN) that located in the inventions STEP gate way system. The most direct approach to evaluating waveform-symbol fitness is therefore to simulate using the symbols to communicate through the channel and measure the probability of error for each symbol or group of symbols. While effective, this method of fitness evaluation can be time consuming, so as a faster alternative the fitness of a symbol can be defined as the minimum difference between the symbol in question and all the other symbols in the dictionary, with the difference between symbols meaning the mean square difference between sample points. This is a satisfactory definition of fitness because the chance of a symbol being mistaken for another by the receiver is determined by how similar it is to the other symbols in the dictionary.

While the most straightforward application of artificial evolution to the problem of optimising a dictionary of periodic wave symbols is to generate a number of different dictionaries and allow them to evolve using the algorithm disclosed with reference to included figures. In this method the inventions algorithm allows each new symbolic-waveform-entity in the evolutionary process to produce a whole dictionary. However, this process is both time-consuming and inefficient, because of the very large number of variables involved. Because the performance of any particular symbol is partly determined by the other symbols in the dictionary, a cooperative approach to optimisation is more efficient. In a cooperative genetic algorithm, only single dictionary of symbols is considered, so that each entity is a single symbol, and the symbols must evolve in such a way that they complement one another, or cooperate, to form an optimal dictionary. It is also possible to combine the two approaches, both competitive and cooperative, to allow cooperative evolution within the alphabet and competitive evolution within each symbol. Symbols are presented in both frequency and time domain.

When the optimised alphabet is used for data transmission, each symbol in the alphabet is assigned to represent a piece of data. At the receiver, this data is recovered by matching the received symbol with those in the table. This pattern matching can be accomplished by any of a number of well-known methods. These include, but are not limited to, neural-networks of any kind, least mean square difference, maximum likelihood, etc. To compensate for the effects of the channel, in our particular case the GSM vocoder or any other mobile communications or stationary communications vocoder, or applied codec such as the H3D-Codec the alphabets used for pattern matching at the receiver should be modified to take into account the impact of the channel on each individual symbol. This is a novel three dimensional recursive protocol that is accomplished by measuring the mean effect on each symbol over a very long period of data transmission. In this way a new alphabet is created that contains, not what the symbols looks like at transmission, but what it is expected to look like upon reception.

The invention introduces the means and method of linking computer processing systems together in order to produce massive volumes of SVRO symbolic states in that when SRMs are deployed each SRM has its own communication language. However when two or more SRMs are communicating one conventional PCM language is used for purposes of PTT-POC communications. In scenarios where two or more SRMs are swapping data files the inventions STEP gateway system creates a converging language that allows all parties to communicate data, text, images, video and audio files and the like.

The invention applies methods that enable a constant creation of a new alphabets and communication channel languages. This new alphabet is then used by the neural network or other pattern matching mechanism when decoding the incoming symbols. This method of compensation allows each symbol to be equalised differently, which is an advantage for a non-linear band limited channel such as mobile cellular PCM and wireless LAN PCM. The communication protocol described here, and represented by disclosed figures, requires no modulation as such. In fact, it is as simple as choosing from a look-up table at the transmitter, and addressing a different but corresponding table at the receiver that provides an optimised harmonic match. This has advantages of being low cost, flexible and easy to implement. One of the key advantages in that this method reduces computational complexity. The invention applies a unique protocol that manipulates the PCM voice channels voice activity detection (VAD) in terms of a technique designed to avoid transmission when there is no speech. The VAD constantly monitors the signal activity, to determine if speech is present or simply noise. If it concludes that there is no speech, it cancels transmission. This can cause problems for data transmission through the GSM voice channel, because it possesses noise-like features.

The inventions H3D-Modulation protocol processes embodies the process of Initialisation, Waveform Fitness Evaluations, Waveform Selection, Waveform Crossover, Waveform Mutation, and Termination between the transmitter and the receiver in order to continually generate symbols in order to perpetually build H3D-Modulation dictionaries in a special array of computers that perform H3D-dictionary symbol and language set generation. In order to ensure that the VAD indicates that there is voice present, it is sufficient to dynamically vary the spectral envelope of the signal, over a time scale of approximately 80 ms. To implement this under the current protocol, two transmission alphabets can be used, each designed to have different spectral shapes. Of course, this means that two different corresponding alphabets must be used at the receiver and transmitter synchronously. The fourth aspect of the invention introduces a method introduced here in order to propagate data communication through non-linear channels with memory. This approach requires no modulation and little signal processing as such. The data rate achieved depends on the size of the alphabet, and can only be limited by the processing power of the calculating hardware.

Because the algorithm described here of generating an alphabet of signals is stochastic i.e., each evolution is unique, the number of possible alphabets is virtually unlimited. This makes it attractive for applications such as secure data transmission for financial transactions for automatic teller machines (ATM), merchant EFT/POS and the like. This method adds to the all ready heavily encrypted mobile cellular networks, and all other modem wireless networks. Although the current embodiment considers data communication over GSM voice channel, other possible applications of this technique include data communication over any kind of lossy non-linear channel with memory, or any other data communications channel that can be defined as analogue or digital.

The novel H3D-Modulation symbol generation process is as follows: Initialization: set up initial population consisting of N-dimensional symbolic variations, assign probabilities of crossover and mutation, other variables necessary for H3D-Modulation/Dictionary-Fitness Evaluation that include: calculate fitness of each individual symbol in the population. The fitness reflects how well the symbol is "preserved" after having been sent through the vocoder/H3D-Codec Selection: is the process in which fitter individual-symbols are selected to reproduce offspring for the next generation. Selection probabilities are assigned that are based upon an individual symbols or complete dictionaries fitness. The individual-symbols in the population are sorted according to their fitness Crossover: is a process in which new symbols are generated by exchanging features of the selected symbol-parents with the intent of improving the fitness of the next generation Mutation: The mutation is to keep diversity of a population that enables a more diverse set of dictionaries and channel languages. It is performed by adding a random disturbance to one or several components of a symbol Termination: the termination occurs when the target fitness is reached or the certain number of generations has passed that no longer are used as optimised symbols.

This H3D-Modulation and H3D-symbol generation method is also used as part of the novel protocol, process and procedure that creates the improved version of the Holophasec 3D Codec that enables a highly efficient form of H3D-Modulation. In this disclosure there is provided a Holophasec 3D Codec that is used to algorithmically swap-replace conventional vocoder software in all mobile radio handsets. This novel H3D-Codec is applied to dynamically enabled by the inventions SVRO Radio Module (SRM) and the SVRO Transaction Event Processor (STEP) gateway system. The invention can be applied to any known multiple access technology known as CDMA, TDMA, FDMA, OFDM and SDMA that are applied to satellite mobile topologies, wireless local loop, wideband, broadband systems and more. Multiaccess schemes are used to provide resources for establishing voice and data calls. Since radio spectrum is a scarce resource and can be directly related to capacity, efficiency enables limited spectrum to handle large number of calls. In terms of basic understanding of mobile wireless telephony, in order to make a call, either a physical channel served by a circuit switch or a virtual channel served by a packet switch is required. The invention combines the best characteristics of both circuit and packet switched topologies in order create the most flexible, efficient, secure and low cost communications system known today.

In order to access physical channels, there are six major multiple-access schemes. FDMA; frequency division multiple access serves the calls with different frequency channels. TDMA; time division multiple access with different time slots. CDMA; code division multiple access serves the calls with different code sequences. PDMA; polarization division multiple access serves the calls with different polarizations. OFDM: Orthogonal Frequency Division Multiplexing. SDMA; space division multiple access serves the calls by spot beam antennas. In SDMA, the cells serve a different area covered by corresponding spot beams and can be shared by the same frequency. With the exception of PDMA all heretofore disclosed multiple access schemes can be applied to mobile communication systems and wireless LAN topologies. The invention can be applied to any of these multiple access schemes.

According to a plurality of aspects of the invention there is provided a unique SVRO Broadcom method and apparatus solution that enables quick/disconnect high speed broadband lossless data over voice over internet protocol (VOIP). The invention provides a third alternative to ADSL and broadband cable internet access services. The term broadcom finds its origins with respect to MATV-SMATV cable networks that also provided additional sideband communication channels that enabled the beginnings of cable television in the 1970's. These networks also grew into early virtual private networks (VPN) that provided early TCP/IP systems over coaxial cable topologies. The invention uses the term to define its combined mobile wireless cellular virtual network solutions and broadband quick connect/disconnect system that provides high bandwidth symbolic lossless data over lossy-band limited PSTN voice and data channel topologies. The invention combines voice over internet protocol (VOIP) and regular PCM voice channel protocols, processes and procedures. The invention provides a specialised SVRO Broadcom Modem that contains unique silicon integrated circuit (IC) technology that contains firmware and software that applies unique Holophasec 3D Modulation (H3D-MOD) to metallic and fibre optic channel space in addition to mobile wireless cellular virtual network solutions. The invention combines conventional pulse code modulation (PCM), VOIP-PCM protocols and the inventions Holophasec 3D Codec means and methods that utilises novel artificial evolution-genetic algorithms that enables massive improvements for symbolic-data propagation over VOIP and regular PCM voice channels and all other data communication channels.

The invention introduces five different application specific user devices: (1) SVRO Radio Module (SRM) single channel using existing vocoder and the H3D-GA-VM modulation means and method. (2) SVRO Radio Module (SRM) with H3D-Codec and Multiplexed-Multichannel capabilities. (3) SVRO Broadcom Modem which integrates the SRM multi-channel radio module that also embodies the quick connect virtual circuit fast packet switched land line protocols such as the inventions lossless H3D-GA-VM modulated symbolic data language, that is adapted as a unique tunneling procedure as applied to novel utilisation of voice over internet protocols (VOIP). The invention enables simultaneous voice and data services during one SVRO Communications Event. These protocols enable quick connection to the inventions specialised STEP ISP Gateway system. (4) SVRO Wireless Server which embodies specialised multimode communications capabilities via (a) terrestrial wireless and extraterrestrial satellite wireless network topologies and (b) unlicensed frequencies such as ISM 2.4-5.8 Ghz frequency hoped spread spectrum (FHSS) means and methods, (c) IEEE802.11, IEEE802.16, WI-FI, WiMAX (d) DECT frequencies (e) Home RF; that enables the deployment of simultaneous voice and data protocols that use SVRO H3D-GA-VM modulation through selected variations of direct sequence spread spectrum (DSSS) and FHSS CDMA modulation capabilities. (5) SVRO Radio Module that is integrated with a mini-hard drive system or flash memory, that enables a plurality of: (a) personal digital assistant (PDA) functions, (b) multimedia file functions, (c) content download functions, (d) MPEG 3/MPEG4 music files, (e) video files and the like.

Referring to FIG. 1, depicted here there is provided a virtual wireless mobile and stationary communications topology, based upon the many novel aspects of the invention. The invention provides and applies high bandwidth multi-channel protocols processes and procedures to existing narrowband second generation (2G) communication channels. These channel structures are defined as absolute frequency-physical channels that are designated as digital traffic channels (DTC). GSM Digital traffic channels (DTC) utilise Time Division Multiple Access (TDMA) that uses Gaussian Minimum Shift Key (GMSK) modulation. Global System for Mobile (GSM) mobile wireless public land mobile (PLMN) network 155. The invention is in no way limited to GSM mobile cellular topologies. GSM simply dominates all global mobile cellular network communication since it operates in over 200 nations worldwide and is still growing. While the GSM global topology dominates the body content of this discloser other networks such as CDMA2000, CDMA IS-95, iDEN TDMA Mobile Trunked Radio (MTR), EDACS Mobile Trunked Radio (MTR), Push-to-Talk (PTT) PoC, Tetra Mobile Trunked Radio (MTR), Specialised Mobile Radio (SMR), Enhanced Specialised Mobile Radio (ESMR) and the like are just as important a mobile wireless cellular network topologies as GSM.

Referring to FIG. 1, the invention provides the means and method of transmitting and propagating lossless symbolic data over a band-limited non linear channel with memory: lossy digital voice channel or any data channel environment such as a logically defined channels that utilise digital voice-pulse code modulation (PCM) schemes. The invention defines this new virtual communication medium as the SVRO voice and data communications channel 126, 126a. For example a GSM TDMA digital traffic channel (DTC) enables up to eight simultaneous user Traffic Channels (TCH) in the one physical channel. These user channels can be logically defined as voice, bearer or teleservice service asynchronous data, packet assembler-disassembler data (PADA), High Speed Circuit Switched Data (HSCSD), G3 facsimile data, V.110 ISDN and the like. While all narrowband mobile wireless networks such as GSM provide offer various data services, none of this services is adequate to deliver high bandwidth data.

Narrowband 2G mobile wireless cellular networks have been upgraded with various systems such as General Packet Radio System (GPRS), Enhanced Data for GSM Evolution (EDGE), in some cases GPRS and EDGE technology is merged to create EGPRS. These systems claim up to performance 384 Kbps, data over one single digital traffic channel (DTC). These claimed performance levels can only happen in ideal radio channel and interlinked public land mobile network (PLMN) channel conditions. Current GPRS Class 8 and Class 10 offerings do not even come close to achieving these claimed data rates. The invention also introduces a novel means of upgrading GPRS, EDGE, EGPRS, CDMA20001X, UMTS-WCDMA, OFDM networks to that secure, timely and low cost financial transactions can be applied to these networks. Currently these networks are unacceptable for the carriage of financial communications. Carriers who support these 2.5G, 3G and 4G networks cannot guarantee and support a time critical service line agreement (SLA).

This data rate claim does not apply to one user logical channel. The theoretical limit of 384 Kbps is achieved when all eight uplink and all eight downlink logical TCH channels that are contained within a physical digital traffic channel (DTC) are used in a multiplex topology by the invention. The invention can transmit and received one user data session, using a shared interleaved transmission of up to eight uplink and eight downlink user time slots. This technique is controlled by unique virtual protocols, processes and procedures that are embodied in the inventions SVRO Radio Module (SRM) and the Symstream Transaction Event Processing (STEP) gateway system. However each multiplexed channel is logically and physically separated from each other. Therefore no sensitive financial transaction information is compromised which is the case with GPRS, EGPRS, HSCSD and selected Third Generation (3G) mobile, 3GSM, cellular communication network platforms. However, the invention does not need to apply massive host mobile wireless cellular network upgrades in order to enable a plurality of operational classes of service (COS).

Conventional. 2.5G, 3G and proposed Fourth Generation (4G) solutions typically require expensive physical additions of new radio transceivers, to base transceiver stations (BTS) 54, base site controllers (BSC) 63 mobile switching centres (MSC) 53, Home Location Registers (HLR) 60 and Visitor Location Registers (VLR), the interworking functions (IWF) 57 and the like. Because of many factors known to those who practice the art GSM carriers only allocate so many GPRS/ EDGE channels per base transceiver station (BTS) 54. In fact only so many base transceiver stations (BTS) 54 are allocated any GPRS/EDGE and other precursor bearer services. These new radio transceivers are usually deployed in a dense user environment such as urban business districts in first generation nations and the like. Mobile carriers only deploy GPRS/ EGDE services where high bandwidth services will be used. GPRS/EDGE data services also tend to be expensive for the user and performance is not good during high traffic periods. Voice service always takes priority and this one of the key advantages of the present invention because it uses the voice channel and is incredibly low cost. Also because GPRS/ EDGE technology is pure packet switched whereby user channels are shared across a wide communications topology.

This shared topology requires massive network overhead, and vulnerable to security ingress through hacking from other private and public TCP/IP networks. Sometimes under heavy loads messages will take many minutes to be delivered to the customer/user. This is simply not acceptable.

GPRS/EDGE packet formats are based upon TCP/IP and are compatible with the world wide web (WWW) 62. In principle GPRS/EDGE and Third Generation (3G) shared network topologies are seen as significant advance over circuit switched topologies. In practice these open communication platforms present many practical problems. Mission critical business messaging, financial communications such as Automatic Teller Machine (ATM) transactions, Electronic Financial Transactions/Point of Sales (EFT/POS), security system reporting, insurance company data mining transactions, insurance company offset risk management communication transactions, mobile telematics messaging and the like require that the serving mobile wireless carrier can deliver these messages in a secure, low cost and timely manner. The means and method of the invention provides the mechanisms that can guarantee delivery of all mission critical messaging without exception.

The invention combines dedicated circuit topologies that are integrated algorithmically with packet switching, multiple destination delivery of messages, and specialised C"always on" features. The invention provides high bandwidth virtual communication services that can deliver between 20-384 Kbps per user when from, one to all logical TCH user speech and or bearer data channels that comprise a digital traffic channel (DTC) are assigned to a single SRM. The invention can virtually occupy all available multislot-logical channels during one SVRO Multichannel symbolic data communications event that uses up to eight aggregated-simultaneously assigned logical PCM voice channels. In this particular case the target host network is a Global System for Mobile (GSM) narrowband Second Generation (2G) mobile cellular network that is an integrated topology that comprises and typical public land mobile network (PLMN). The invention can virtually use any existing-conventional radio transceiver that is fitted within the hardware configuration of any GSM narrowband transceiver station (BTS). This is accomplished without disrupting, and circumventing existing host PLMN network element configurations, communication channel functions, equipment specifications, operational standards and the like.

Referring FIG. 1, a typical public land mobile network (PLMN) 155 is comprised of many different network elements such as a mobile switching centre (MSC) 53. A MSC 53 can also be a gateway MSC 53a. Both type of MSC configurations are typically comprised of one or more mobile switch matrix topologies, network management systems, quality and maintenance (Q&M) systems, and other such conventional apparatus that is well know to those who practice the art. A PLMN also contains a plurality of base site controllers (BSC) 63 that are used to interact with the MSC and a plurality of base transceiver stations (BTS) 54 that operate within the topology of a selected wireless mobile telephony network topography.

In FIG. 1, any mobile wireless PLMN is also comprised of a plurality of, wireless radio, fibre-optical and metallic channel topologies that act as physical and logical channel interconnections between such network elements as mobile switching centres (MSC) 53, base site controllers (BSC) 62, and base transceiver stations (BTS) 54. These conventional optical and metallic physical channel topologies typically comprise what commonly known in the art in this case the GSM mobile cellular carrier cloud that in some cases extends into the publicly switched telephone network (PSTN) 58. Additionally there are vast plurality of conventional and logical channel structures that create selected digital communications modalities that operate within the physical channel space of PSTN network topologies. The invention uses Integrated Service Digital Network (ISDN) 64, all basic and supplementary ISUP 232, Mobile Application Part (MAP) 232a service protocol variants.

ISDN and ISUP provides the logical transport of digital voice, audio, user data and control data and provides a relative efficient means of interconnecting directly to a plurality of switching matrixes that typically comprise an MSC 54. The means and methods of ISDN are well known to those who practice the art and the invention simply uses the PCM portion of the logical channel structures that ISDN systems, and ISUP-HDLC channel protocols provide. The inventions means and method do not require any modification to existing ISDN/ISUP-HDLC physical and or logical channel space and simply pass the invention modified PCM wave-samples through any of channel topology. The invention also uses and elegantly manipulates Transaction Capabilities Application Part (TCAP) and Mobile Application Part (MAP) 232a that contains GSM MAP and ANSI-TIA-41 automatic roaming and authentication messaging. The invention elegantly manipulates TCAP and MAP protocols in order to provide multiplex-multi channel services while using only one SIM card 73 as shown FIG. 4. Referring to FIG. 1, these protocols are enabled without circumventing the operational standard that governs the operational modality of a target network, nor does the invention require any embedded software or hardware elements that are associated with host network elements and the like.

In FIG. 1, a mobile switching centre (MSC) 53 typically manages all call flow modalities; such as user call flow that comprises in-bound and out bound voice and data traffic that is originated from mobile users who place voice calls, or send data, text and other digital information to other mobile users or those who operate customer premise equipment (CPE) 65, that are points of user presence on the PSTN 58. Customer premise equipment (CPE) can be a conventional hardwired or cordless telephone instrument, a personal computer (PC), virtual private network (VPN), a private business exchange (PBX), a dial up modem, asynchronous digital subscriber line (ADSL) modem, broadband cable modems and or other such user interface equipment that are well known to those who practice the art.

Signaling System # 7 (SS#7) 59 are virtual out-band signaling and control networks. SS7 comprise the largest landline data communications network in the world today. In North, Central and South America SS7 operates with a slight difference in byte-character formats than the version used around the rest of the globe known as SS#7. The differences are well known in to those who practice the art. Therefore details of the differences will not be added here for the purposes of this disclosure. Basically the operational standards of SS7 in the United States and in all other countries are based upon International Telecommunications Union (ITU) standards. First there was ISDN. Then came "portable" 800 numbers. Soon, mobile cellular providers saw ISDN as a way to integrate a plurality of mobile cellular networks together so that subscribers could roam from one cellular network to another without having to manually enter special roaming numbers. This implementation solved the automatic roaming problem when SS#7 was applied to ISDN logical channel topologies in order to facilitate automatic roaming call flow across a wide range of mobile cellular network topologies.

Figure 4:
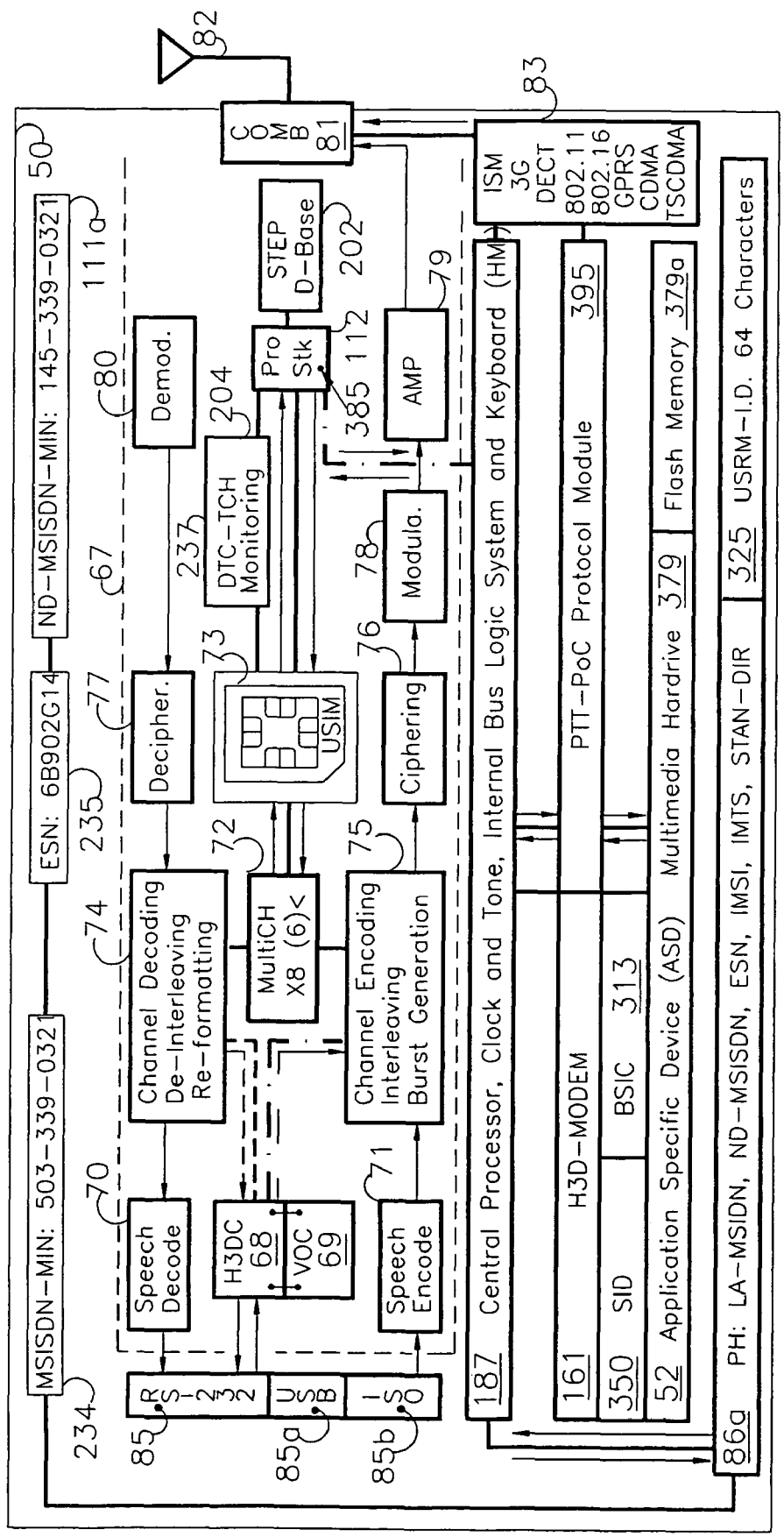
FIG. 4, is a logical block diagram of the inventions SVRO Radio Module (SRM), according to the invention.
Figure 5:
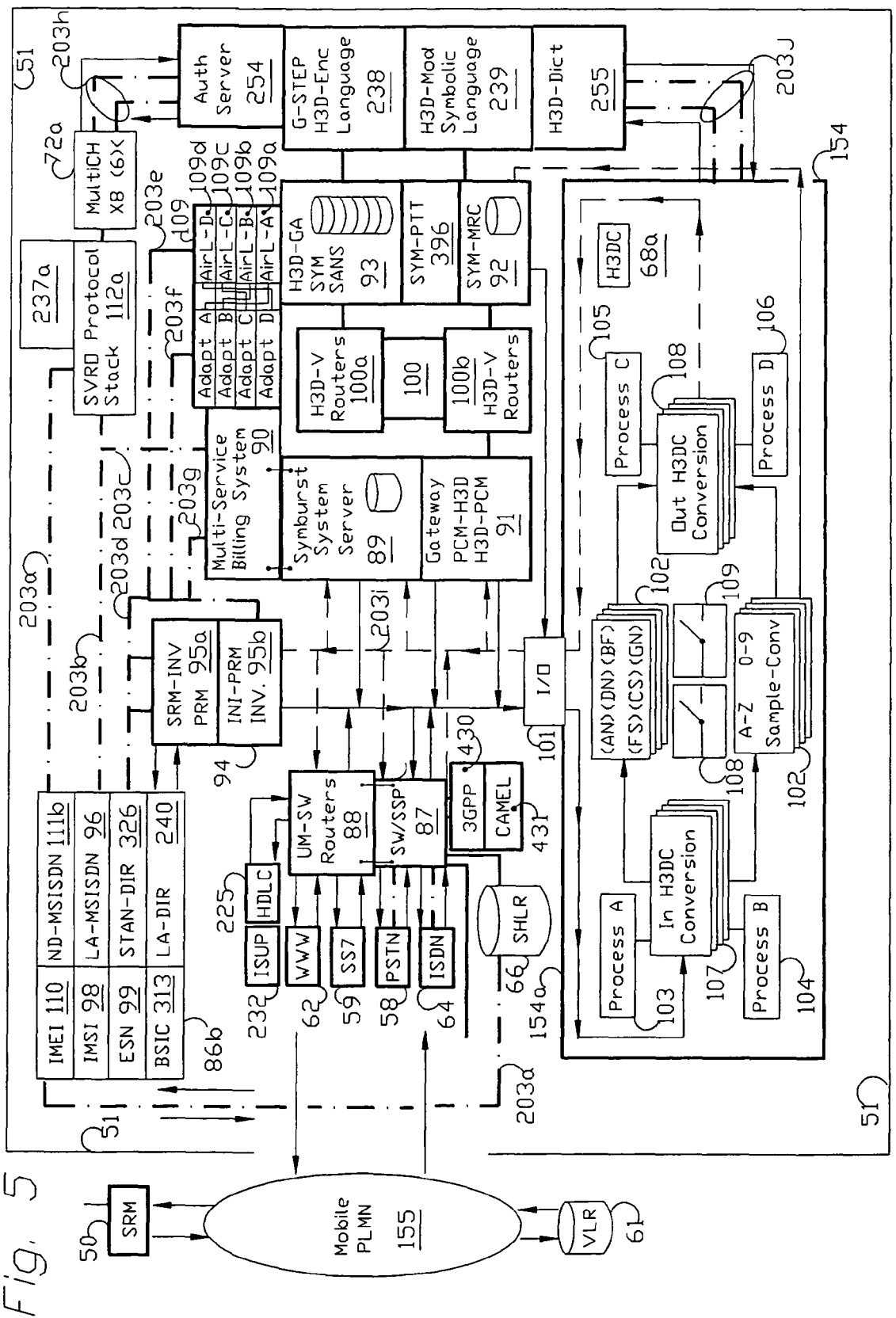
FIG. 5, is a logical block diagram of the inventions SVRO Event Processor System (STEP) gateway system, according to the invention.

The invention utilises SS#7 in terms of unique protocol means and methods that manipulates ANSI 41, IS-41, and GSM MAP protocols that are manipulated virtually in order to enable multiple channel access of up to eight user PCM, and the inventions multiplexed channel service channels 414 that are logically defined within a physical digital traffic channel (DTC) that can be interconnected with up to eight T1/E1 ISDN/ISUP-HDLC channels, that supply point-to-point connection between the inventions SRM and the STEP gateway system. The invention provides its own SVRO Home Location Register (SHLR) 66 that is an integral virtual network element of the SVRO in-band authentication system that is also interconnected to the conventional SS7 network as shown in FIG. 5. The invention SHLR applies the latest dual stack (ANSI/GSM-MAP) concept so that a single configured SHLR and Symstream Home Subscriber Server can be applied to any North American ANSI 41, 3GPP, and or Global GSM MAP PLMN protocol. This unique manipulation enables the use of only one remotely programmable subscriber information module (SIM) card module 73, as shown in FIG. 4, and one registered bonifide user account in accord with host mobile wireless cellular carrier-network provider authentication requirements that relate to standard voice service and bearer channel service accounts. These requirements are aligned with ANSI-41, IS-41 and GSM MAP signaling and authentication protocol standards.

The invention creates a novel and highly flexible quad-band SVRO Radio Module (SRM) that can roam across and within any GSM mobile wireless cellular topology. GSM uses a TDMA quadrature shift key (QSK) channelisation variant technique in which up to eight subscribers can use the same assigned physical radio frequency that is defined by any selected and assigned GSM digital traffic channel (DTC). A DTC is also known as an absolute frequency channel. Each user Traffic Channel (TCH) transmits at a different time. The digital bit streams of data bearer channels or PCM voice samples correspond up to eight distinct voice conversations, or bearer data channel transmission events are encoded, interleaved and transmitted using a digital a TDMA multiple access scheme. In a TDMA system, the sampled voice conversations are separated in time, with the bit-sampled stream organized into frames, typically on the order of several milliseconds. These methods are also well known to those who practice the art. The invention uses a combination of protocols that enable the aggregated assignment of up to eight upstream and eight downstream PCM voice channels, PCM voice over Internet Protocol channels for end-to-end voice and data communications, or any of the GSM bearer data channels that are currently available on a currently serving base transceiver station (BTS) 54 simultaneously using only one of the inventions SRM 50 as shown in FIG. 1.

A GPRS/EDGE user radio or mobile station can access, acquire and transmit data over multiple user frames simultaneously. For example class eight and class ten GPRS/EDGE networks can utlise multiple upstream and downstream channels has can. Class eight GPRS/EDGE can access and use one upstream channel and two downstream channel simultaneously. Class 10 GPRS/EDGE can access and use two upstream channels and four downstream channels simultaneously. However only those base transceiver stations (BTS) that have been retrofitted with radio transceivers that enable GPRS/EDGE communications can support this particular version of 2.5 generation service. Also typical GSM-GPRS/EDGE carrier installation policies only allow for one TCP/IP compatible transceiver. As disclosed because of cost and other factors only base transceiver stations (BTS) in central urban areas are typically fitted with GSM-GPRS/EDGE radio transceivers. As disclosed, the invention provides the means and method of accessing and utilising up to eight upstream user channels and eight downstream user channels simultaneously. The SVRO Single and Multiple channel communications can also be defined in terms of different classes of service (COS). Another important aspect of the invention is that voice services take priority over GPRS-EDGE and V.110 TCP/IP end-to-end services. Since the invention primarily uses up to eight voice channel to transmit data, the SVRO Service has the same priority as voice service. During peak voice traffic times the inventions voice and data services will not run slower or be denied access to the currently serving network because of high volumes of conventional voice traffic.

The inventions SVRO Radio Module (SRM) can access and utilise any GSM BTS radio transceiver mounted within the hardware configurations of any BTS tower that is operating in any GSM mobile wireless public land mobile network (PLMN) topology. Like any GPRS/EDGE/EGPRS or 3G mobile subscriber unit the inventions SRM can access and utlise a plurality of user channels simultaneously. However neither GPRS/EDGE, V.110, HSCDS data, Third Generation or any other CDMA based 2.5G or Third Generation mobile subscriber unit can access and use multiple digital speech voice-PCM channels and propagated lossless data across multiple user channels with the need of implementing any significant operational changes to base transceiver stations (BTS), base site controllers (BSC) and mobile switching centres (MSC). The invention only requires the integrated of one comprehensive SVRO carrier STEP gateway system for any entire operational area known in the art as a Metropolitan Transaction Area (MTA) or Rural Transaction Area (RTA).

GSM digital voice PCM channels are configured to provide conventional point-to-point circuit switched channel communication channel paths. Conventional GSM PCM speech channels, along with all mobile cellular and mobile trunked radio digital voice channels are based on, lossy band-limited non-linear channels with memory. The inventions data methods that are integral to all PCM channels including voice over Internet protocol (VOIP). These channel structures are not only used over wireless air interface channels, but also optical, and metallic channel topologies that typically carry conventional PCM voice channel communications. The invention also utilises PCM voice channels and PCM data channels, PCM video channels, and PCM audio channels that are applied over ISM/Bluetooth, IEEE802.11, IEEE802.16-WI-FI, WI-FI MAX, WI-FI Hyperlink and other ISM channels that support PCM voice, data, text, video, audio and the like. In fact the invention introduces a completely novel means of propagating SVRO virtual symbolic data that can be originated from the inventions STEP gateway system 51 as shown in FIG. 1 or any customer premise equipment (CPE) 65 that is routed through the inventions STEP gate system 51.

Figure 7:
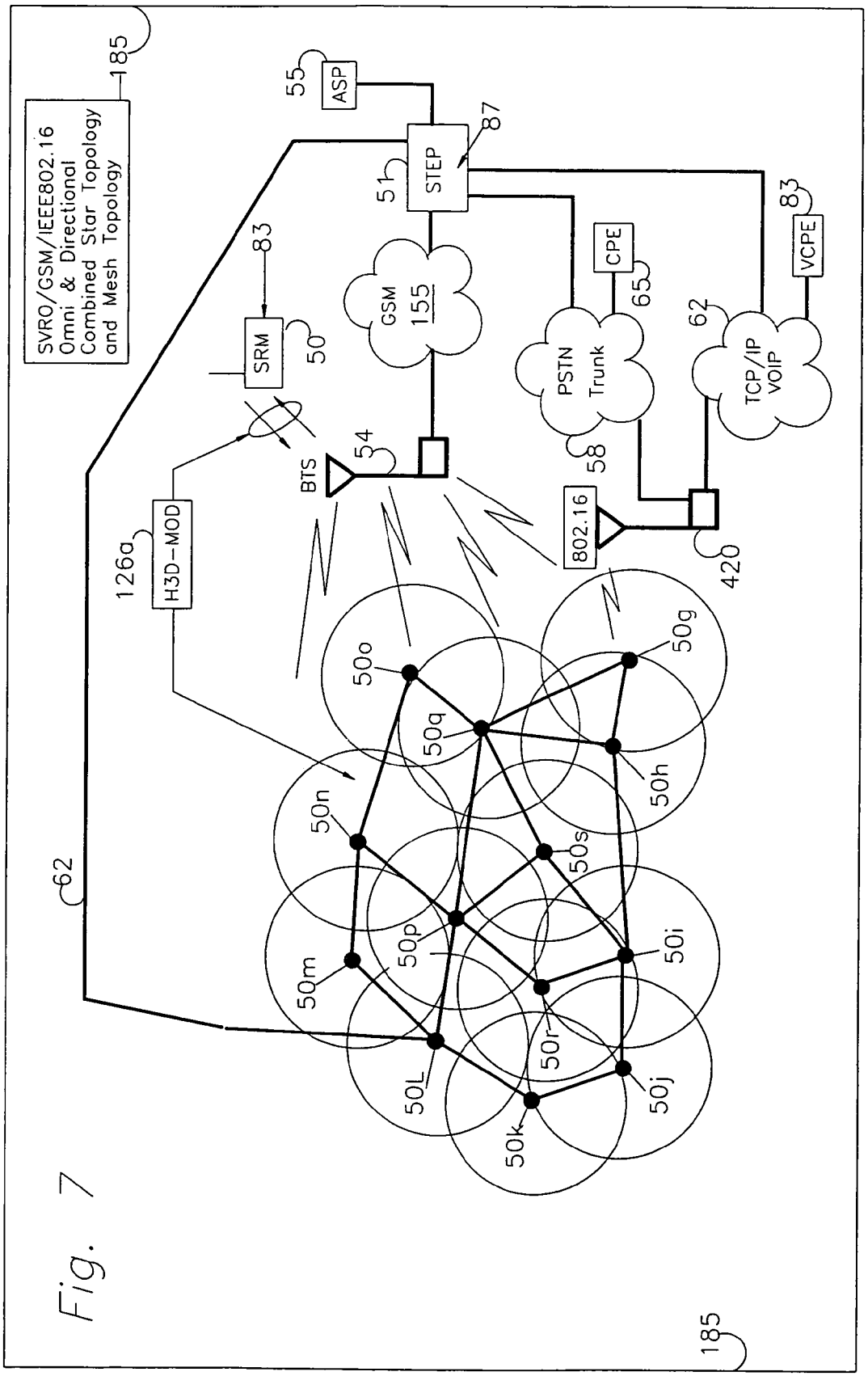
FIG. 7, is descriptive illustration of the inventions SVRO Subnet (SSN) Piconet-Scatternet Topology, according to the invention.

The virtual channel link to the SRM 50 that also acts as a specialised wireless server that enables communication of over a microcellular IEEE802.16 WI-FI, and or WiMAX 184 topology as shown in FIG. 1 and FIG. 7. The invention provides the means and method of applying its unique lossless symbolic data protocols over ISDN PCM channels, ISUP/HDLC/PCM Voice and PCM Data channels, mobile wireless cellular air interface channels, PTT-PoC channels, and the inventions SVRO Sub Net (SSN) IEEE802.11, IEEE802.16-WIFI-WIFI MAX, WIFI-Hyperlink2, ISM/DECT/Bluetooth channel in one seamless communications event that aggregately defines a SVRO virtual voice and data communications channel 126, 126a, 126b, 126c, 126d, and 126e respectively. The invention This unique communications event can comprise the use of one or all logical channels that operate over GSM or any other mobile wireless cellular PLMN topology, IEEE802.16 WI-FI, and or WiMAX 184 topology meshnet topology, as shown in FIG. 1 and FIG. 7. The invention also introduces a novel protocol that enables seamless automatic roaming between SVRO-SVRO mobile cellular networks and SVRO enabled IEEE802.16 WI-FI, WI-Max and Hyperlink2 networks.

A PCM speech channel that is used over any mobile wireless cellular air interface channel topology is typically compressed and heavily encrypted in order to insure conversation privacy. The invention also introduces an new Holophasec 3D Codec (H3D-Codec) that will be used to dynamically swap the conventional vocoder software that is resident in the software modules that comprise the application and PCM burst functions of the SRM. The H3D-Codec is used to dramatically increase raw and effective data throughput efficiency, and PCM and or bearer data channel efficiency when the invention uses non modified PCM voice, data, audio, video and other multimedia files that the invention applies to an unmodified digital PCM or bearer data channel. The H3D-Codec dramatically reduces the quantity of digital bits per PCM sample. In some cases the full contextual character will only require in cases a six bit per character, and other cases a three bits per contextual character sample. This will result in providing between 20-30 Kbps per channel in terms of conventional raw data rate comparisons. However the H3D-Codec operates within the upper, midrange and lower frequency, phase and amplitude bounds of the host PCM voice, data, text, audio and or multimedia channel. The H3D-Codec is used not only in unmodified mobile wireless cellular speech channels, for the inventions H3D-Codec enables high speed symbolic data and simultaneous speech services over TCP/IP based Voice Over I.P. (VOIP) channels. This usage creates a Holophasec 3D VOIP (H3D-VOIP) protocol that is utterly unique in the art. The H3D-Codec enables all the conventional operational parameters of the vocoder. However the H3D-Codec eliminates much of the elements of the conventional vocoder that include various filtering algorithms that severely impede voice and data transfer performance levels. When an SRM 50 is used to support conventional voice the SRM's protocol stack switches the H3D-Codec for the conventional vocoder software. When the user requires SVRO lossless symbolic data services, the SRM's protocol stack simply switches back to the H3D-Codec. The H3D-Codec improves the performance of the host PCM channel so that it can propagate optimised digital samples that can contain voice, data, text, audio, video and or other multimedia information. The fact the H3D-Codec can automatically switch between full rate and half rate or it can sustain full rate transmissions even when the rest of the channel on BTS are operating at half rate.

Referring to FIG. 1, in some cases the flexibility of the H3D-Codec extends beyond the transmission bounds of the PCM voice channel. The invention is also designed to operate end-to-end between the SRM 50 and the STEP gateway 51 over any of the bearer channels such as 9.6 asynchronous channels, packet assembler/disassembler channels, teleservice channels, Groupe 3 facsimile channels, X.25 channels and the like. This can be further with combined with WI-FI 802.11, and or WI-MAX IEEE802.16 184 communication channel topologies. This unique topology can in some application specific cases extend any SVRO-capable ASP 55 and CPE 65. The invention also provides the means and methods of multiplexing these mobile cellular channels so that up to eight uplink or reverse channels can be used and up to eight downlink or forward channels can be used to transmit multiplexed channels broadband data and voice along accessing and utilises with WI-MAX IEEE802.16, 184, WI-FI IEEE802.11 topologies with one communications device defined here as the SVRO Radio Module (SRM) 50.

Referring to FIG. 1 and FIG. 5, the invention enables bi-directional communications that are essentially symmetrical in most cases. The invention enables essentially the same performance for both uplink-reverse channel transmissions and downlink-forward channel transmission that occur between the inventions SRM 50 and the STEP Gateway system 51 via any serving mobile or stationary digital voice and data communications network known in the art today. These specialised PCM samples are propagated from the inventions SRM 50 to each base transceiver station (BTS) 54, and are governed by a trans rate adaptation unit (TRAU) that is usually co-located with the base site controller (BSC) 63 that applies error correction and channel timing in relation to the SRM 50 synchronisation and other functions well know to those who practice the art. The inventions quick/connect and disconnect protocols are software components of both the SRM 50 unique in-channel protocol layers and the STEP gateway systems 51 SW/SSP 87 unique in-channel protocol layers that use the same synchronisation method that is used for conventional voice-call PCM voice channel modalities. The protocol stack 112 as shown in FIG. 4 that is an essential software component of the SRM 50, and the protocol stack 112*a* as shown in FIG. 5, uniquely govern the inventions unique in-channel protocol layers, and the unique out-of-band signaling and authentication protocol layers. The invention only introduces some additional synchronisation, periodic beat-tones, filter optimisation and the like that serve to optimise in-channel symbolic data transfer performance. The invention uses protocol layers of the ISUP/HDLC and or ISDN link layer protocol operates between the SRM 50, as is seamlessly passes through the serving mobile wireless PLMN's MSC and or gateway MSC that is virtually connected to the inventions STEP gateway system 51 co-located service switch point (SSP) 87 arrays as shown in FIG. 5.

Figure 2:
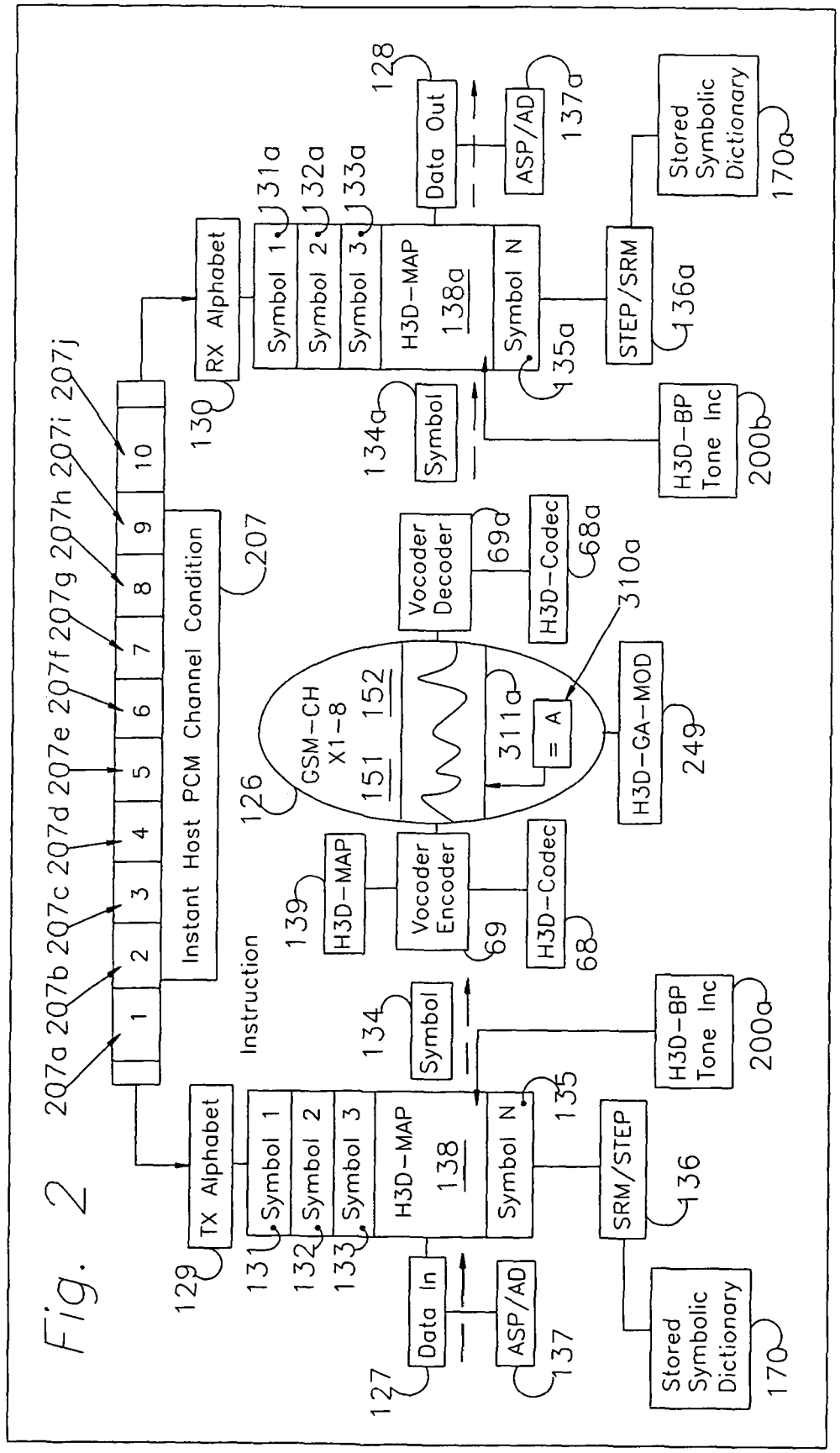
FIG. 2, Depicts a logical Block diagram of the Holophasec 3D Modulation (H3D-MOD) coding procedures according to the invention.

Referring to FIG. 2. In order to better understand the benefits introduced by the invention the virtual in-band Holophasec 3D Genetic Algorithms (H3D-GA) protocol is also a genetic modulation technique that is called Holophasec 3D Virtual Modulation (H3D-GA-VM). The term Holophasec simply means whole or complete 360° phase utilisation of any defined channel space. However in the case of legacy networks the invention can be used to only optimise the two dimensional (2D) Shannon Channel which at this time dominates all forms of communications analogue and digital communication topologies including microcontrollers and the like. However the invention fully optimises these two dimensional (2D) topologies wherever the inventions means and methods are applied. Combined, this unique synthesis creates Holophasec 3D-Genetic Algorithmic-Virtual Modulation (H3D-GA-VM). H3D-GA-VM embodies the unique application of genetic algorithmic optimisation process of digital sample modulation Initialisation that includes dynamic; Waveform Fitness Evaluations, Waveform Selection, Waveform Crossover, Waveform Mutation, and Termination of lossless data communications over a lossless and lossy channel environment. The invention provides the means and methods of unique symbolic dictionary that operates dynamically to provide optimum wave-sample states for in-channel services such as Push-To-Talk Over Cellular (PTT-PoC) that uses H3D-GA-VM modulation to deliver simultaneous voice, data, text, audio file, video files within a defined PTT-PoC User Group during PTT-PoC multi-user communications. The invention also can be applied to the implementation of User Group On Line Indicators (PTT-OLI) and the like using pre-connection MRC-SHPD communication services for multiple applications. This dictionary is built upon the ability of the inventions virtual H3D-GA-VM Modulation algorithms that produce n-dimensional wave state, i.e., wave sample-snap shots that comprise n-dimensional symbolic variations. These novel means and methods produce thousands of symbols for use. In many cases there is provided hundreds and thousands of different two and three dimensional symbols that the English letter "A," or the number "9" for example.

Figure 14:
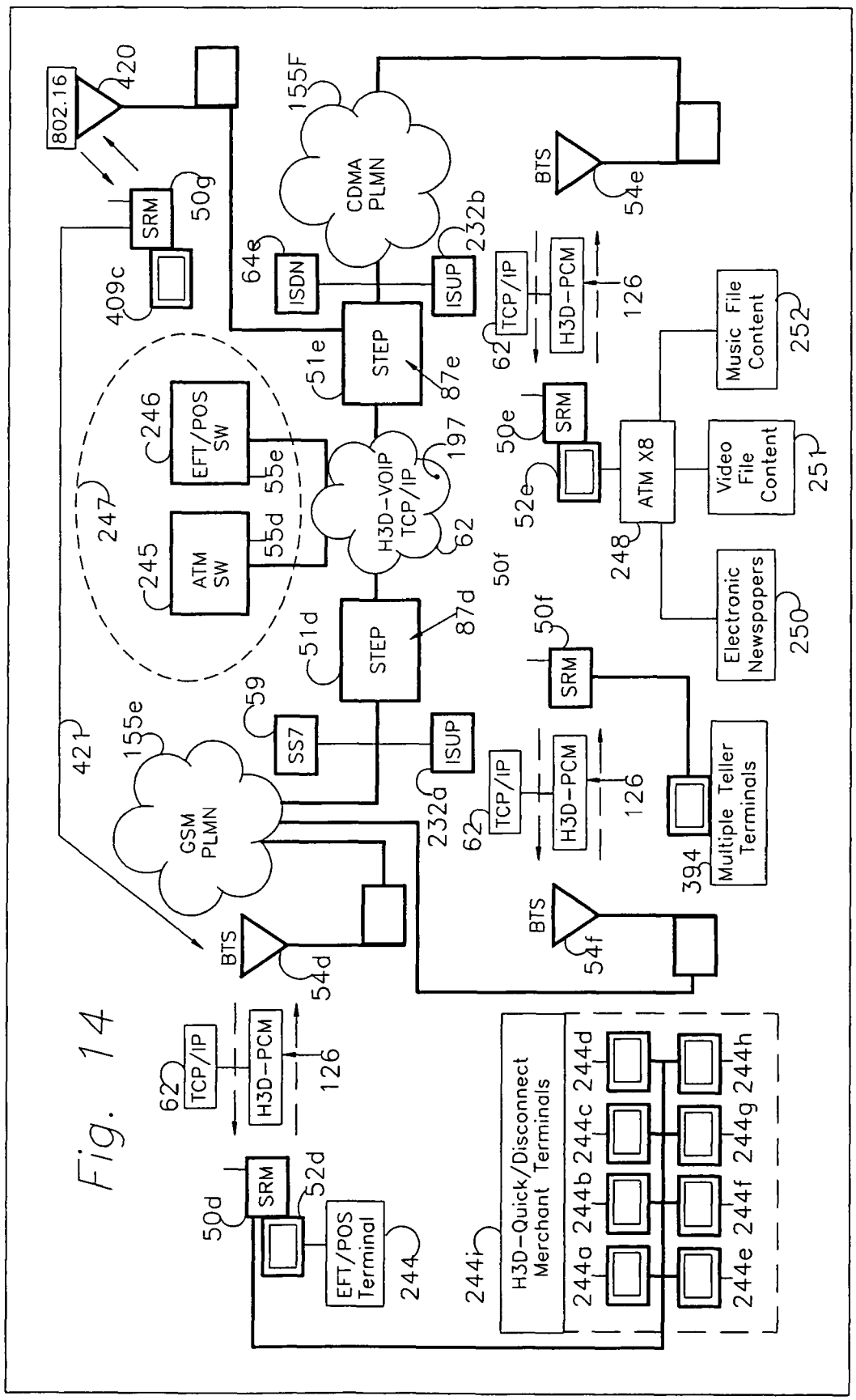
FIG. 14, depicts the SVRO financial transaction network, according to the invention.

Referring to FIG. 14, depicted here is for example the inventions provides unique communication modalities for machine to machine (M2M) communications such as financial communications networks that support automatic teller machine (ATM) 248, merchant-EFT/POS-terminal 244 transaction communications, wireless teller terminals 394 and the like. In fact this novel means and method can be used to optimise any voice or data channel regardless of the operational standard, because it is a completely revolutionary approach to digital modulation and can be integrated within the protocol layers of existing modulation scheme known in the art today. The invention provides Holophasec 3D Genetic Algorithm Virtual Modulation (H3D-GA-VM) 249 as a form of Holophasec 3D Harmonic Symbolic Construct (HSC) generation that produces infinite symbolic dictionaries. These unique dictionaries are based upon infinitely manipulatable symbolic-sample states. For the purposes of deployment over existing wireless and wireline communication network channel topologies the Holophasec three dimensional spatial diversity logic that H3D-GA-VM is based upon is reduced to two dimensions (2D). All analogue and digital communication technology is currently based up 2D logic, therefore all implementations of Holophasec 3D Related Technologies are reduced to two dimensional symbolic protocol constructs in order to apply the inventions protocols, processes and procedures to current wireless and wireline communication systems. So many conventional modulation schemes can be dramatically improved because of special modalities inherent in the inventions H3D-GA-VM modulation means and methods.

Referring to FIG. 1, in addition to the host public land mobile network (PLMN) elements so described, the invention introduces conventional user and network management apparatus, and user apparatus that have been elegantly modified in order to enable the inventions, protocols, processes and procedures. There is provided a SVRO radio module (SRM) 50 and the Symstream Event Transaction Processing (STEP) system 51. Combined, these two primary virtual network components comprised a complete SVRO broadband; terrestrial, and extraterrestrial—wireless and wireline global communications topology. The SRM 50 is comprised of a conventional mobile radio, and special firmware and software modules, that can be configured to enable the seamless operation of SVRO multichannel services over any known mobile cellular (MCR), mobile trunked radio (MTR) network topology.

The invention modifies conventional protocol layers that enable seamless network access of both a STEP gateways system 51 originated and SRM 50 terminated voice service methods, conversely the inventions enables SRM 50 originated and STEP gateway 51 terminated access that masks the virtual integration of lossless symbolic data, text, and multimedia files through multiple circuit switched voice channels, disclosed bearer data channels and teleservice channels that logically operate over a absolute frequency channel (AFC) that is commonly known in the art as a digital traffic channel (DTC). The invention applies modified; user radio management protocol stacks and host mobile wireless network management protocol layers that enable the elegant manipulation of primitive mechanisms that embody the virtual modification of; (a) conventional PCM voice channel service requests, (b) user voice and data service request authentication via, (c) host network PCM voice channel assignment (d) control channel functions that relate to user service layer via multiple traffic channel (TCH) assignment; from the SRM 50 to the serving base transceiver station (BTS).

In FIG. 1, the BTS 54 which includes Base Site Subsystem (BSS) and the Base Site Controllers (BSC) 63 that manages appropriate data links, control links and voice channel links such as E1/T1 channels and the like that are the physical channel links that integrate the serving MSC 53 and or serving Gateway MSC 53 and the publicly switched telephone network (PSTN) 58, (e) user radio management and the like. The inventions protocol stack also enables seamless cut over between mobile cellular PLMN 155 and co-located WI-MAX IEEE802.16 when the SRM 50 functions as a broadband wireless radio component 83 that is an integrated component of a IEEE802.16 or IEEE802.11 Omni & Directional Mesh Network 185 that is detected as shown in FIG. 7.

Referring to FIG. 1, the invention manipulates the host network multichannel; multiplexing, control, signaling, authentication, manipulation of conventional vocoders, re-mapping of in-band TCH voice channel PCM samples, introduction of Holophasec 3D Codec methods that are a product of H3D-Modulation methods and symbolic dictionary generation and propagation methods of optimised wave states. The invention also combines unique remote features access increments, caller I.D. alpha-numeric information, control channel voice and data logical channel assignment algorithms, in order to provide high performance, flexible, efficient and secure multi-channel service to existing narrowband mobile cellular networks. Depicted in FIG. 4, is the logical block diagram of the inventions SVRO Radio Module (SRM) 50. The printed circuit board (PCB) array 67 is comprised of selected conventional electronic components that typically populate a mobile cellular radio PCB and WI-MAX IEEE802.16e radio module. Shown here are the components and progressive logical steps that comprise the software innovations such as the Holophasec 3D Codec 58 that generates H3D-Modulation 249 means and methods as described in FIG. 2. There is also provided the conventional vocoder 69 that enables voice calls and can be used by the invention to propagate optimised lossless-quick-connect/disconnect managed symbolic wave states according to a key aspect of the invention.

In FIG. 1 and FIG. 4, the SRM 50 is interfaced physically and logically with an application specific device (ASD) 52. An application specific device can be an automatic teller machine (ATM) 248, or a single merchant-EFT/POS-terminal 244a The invention introduces selected novel protocol stack structures that are added and integrated into the conventional mobile wireless cellular mobile radio protocol structures such as the central processor, clock, tone, internal bus logic system and human machine interface (HMI) 85. Additionally there is provided modified protocols, processes and procedures that enable the inventions multi-layered multi-functional preferred embodiments. The invention creates and introduces simultaneous propagation of voice, data, text over multiple air interface logical voice-PCM channels, E1/T1-DS0, DS1—voice PCM channels, ISUP-HDLC-LLP switch-to-switch channels and Voice Over I.P. (VOIP) channels and the like that interact seamlessly between the SRM 50 and the inventions STEP 51 system. The SRM 50 is also specially fitted with a specialised multimedia hard drive system 379 and flash memory 379a that enables the storage and playback of multimedia files such as MP3, MP4, video codec files and the like. The SRM 50 can also be fitted with audio and video playback software and hardware componentry that will enable a vast array of application playback and display for any consumer or business application specific purpose.

Figure 8:
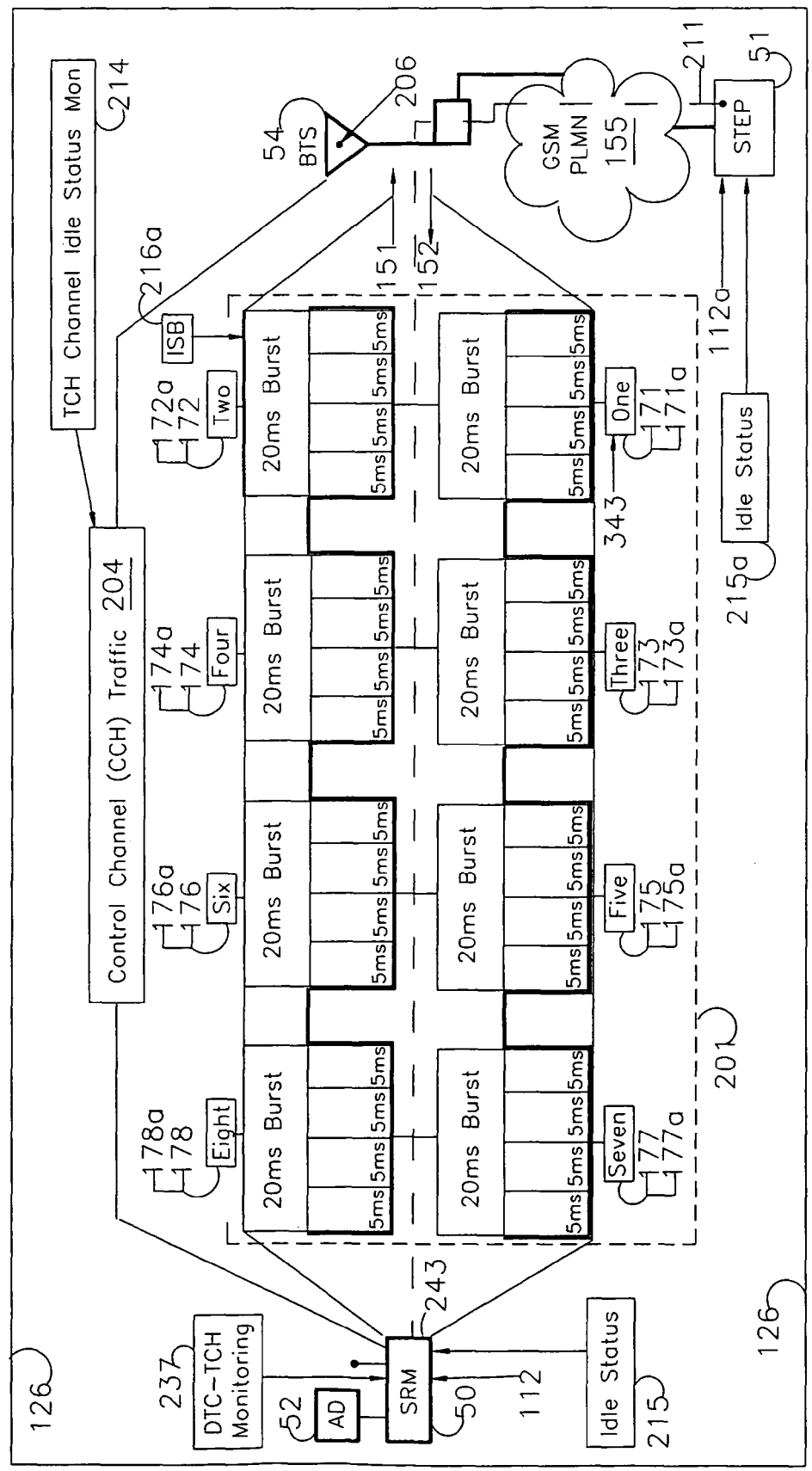
FIG. 8, is a block diagram description of a digital traffic channel (DTC) virtually reformatted for SVRO voice and data communications, according to the invention.

The SVRO virtual network and its special H3D-GA-VM Modulation enables the fast transfer of these multimedia files that are sent from the inventions STEP gateway system 51 to the SRM 50 via forward uplink TCH speech channels that are components of the host mobile wireless cellular GSM and or CDMA PLMN 155 digital traffic channel (DTC) 201, and the like as shown in FIG. 8. The inventions unique H3D-Modulation and multislot-channel protocol stack enables the lowest cost, most efficient and secure means of providing multimedia files such as music files and video files to SRM 50 users throughout the global footprint of Second Generation Mobile Wireless Cellular/Trunked Radio/SMR public land mobile networks. The inventions SRM 50 is fitted with radio and protocol componentry and algorithmic procedures respectively that enable seamless roaming between an SVRO H3D-GA-VM modulation enabled GSM PLMN 155, and a SVRO H3D-GA-VM modulated IEEE802.16 Omni and Directional Mesh network. These WI-MAX IEEE802.16 networks are operating in airports, hotels, shopping malls and entire metropolitan areas around the globe.

Figure 9:
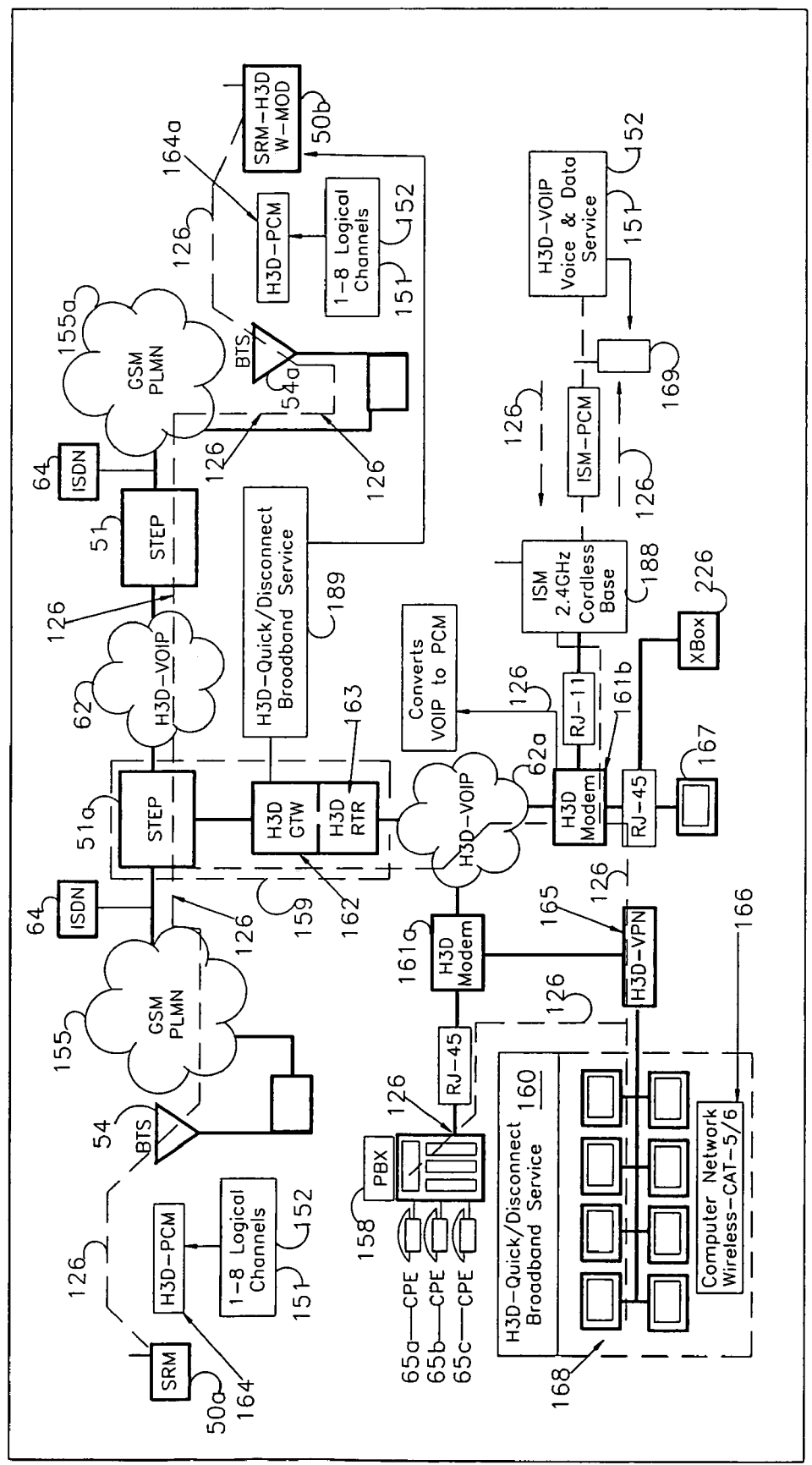
FIG. 9, is a logical block diagram of the SVRO Broadcom network topology, according to the invention.

Referring to FIG. 1, a GSM digital traffic channel is a physical digital traffic channel (DTC) that contains eight logical channel time slots that when virtually converted becomes a SVRO high bandwidth simultaneous multichannel 126 H3D-GA-VM communications medium. The SVRO Channel 126 supports simultaneous bi-directional communications that can be originated from either the SRM 50 or the STEP 51 accordingly. In some application specific cases the SVRO Bi-directional virtual communications channel can originate from a selected ASP 55 that is configured to support the inventions protocols. The invention provides unique variations of voice over internet protocol (VOIP) 62 that works in conjunction with the invention unique PCM sample structures as shown in FIG. 9, according to the fifth aspect of the invention. These eight logical channels are actually eight user channels that are usually assigned to separate users when operating in terms of conventional channel access protocols. This approach is valuable for selected business applications. These channels can be initialised by the invention by a novel dynamic cascading function.

Referring to FIG. 1, and FIG. 2. The invention uniquely applies channel performance through channel symbol optimisation by cooperative Genetic Algorithm crossover, mutation and formation that follows a completely revolutionary form. This method can be applied to all forms of vocoders that exist in GSM radio modules, TS-CDMA radio modules, CDMA IS-95-20001X radio-modules, 3GSM, iDEN radio modules, GPRS radio modules, EGPRS radio modules, UMTS-WCDMA radio modules, satellite user radio modules, cable broadband modems, ADSL modems, the inventions SVRO Broad band-quick connect modems that are used to enhance virtual private networks (VPN) for metallic and fibre optic channels and the like. The invention uses genetic algorithms to further codify and stablise H3D-GA-VM modulation Harmonic Symbolic Constructs (HSC). The invention also introduces Geometric Symbolic Constructs (GSC) samples as a way of mapping the inventions genetic algorithmic wave coding that defines wave-symbol populations in terms of three dimensional fractal-radian-vector formations. These harmonic formations are provided to create a dictionary and simple lookup table that requires little SRM 50 and mirrored STEP 51 gateway system device-protocol computation.

The invention provides a simple harmonic symbolic construct (HSC) waveform lookup table. First, a population of waveform structures is created at random. The invention provides the first harmonic biomimicry that relates to spectral harmonics and the mergence of selected biological functions in terms of how electromagnetic wave formations are optimised and applied to any selected communications channel space. In this case these specialised waveform structures also known as contextual symbols that are transmitted across the chosen channel. The fitness of each symbol is assessed harmonically, and then average fitness of the symbol population is increased by eliminating those entities that are judged unsuitable in terms of how the wave form performs as it is propagated across the channel from a transceiver-emitter to a transceiver-exciter, and how well the exciter accepts and matches symbol with one that is stored. The response, that is the condition of the transmitted/emitted wave symbol reflects the condition of the instant channel. In this way the invention determines which wave-symbols to keep and re use and others that need to discarded or used for other channels that exist in other communication topologies such as other GSM PLMN networks, WI-FI networks and the like that may be configured differently. In this way no generated symbol is wasted.

The ones that are used repeatedly are those that work well in the system by analyzing the harmonic stability of the received wave symbol at the point of reception/excitation. When a harmonic wave symbol is unacceptable the removed symbols are replaced by combining old fit entities; during cross-over, and or by random alteration; mutation, to produce new symbols or children that are optimised in order the perform much better across the same channel and or other channels in other network topologies such as a single microprocessor. In fact the invention chooses which symbols best work across a selected channel topology when communicating with a single application specific device. Application specific devices such as Automatic Teller Machines (ATM), EFT/POS terminals, telematics-telemetry devices, Personal Digital Assistants (PDA), and portable computers and the like. In fact the invention provides a unique method to apply a separate symbol dictionary for each application specific device. The invention also introduces a revolutionary encryption method called Holophasec 3D Encryption.

In this way an ATM machine that is operating far from a MSC 53, 53a and the inventions STEP 51 gateway system can be optimised. ATM machines, EFT/POS devices, and stationary telematics-telemetry application specific systems are fixed in one topological position. When an SRM 50 is installed along with one of the disclosed stationary devices the SRM antenna is positioned to operate at maximum efficiency in relation to the serving base transceiver station (BTS) 54. Each radio channel is unique in that its footprint is shaped by many environmental and network performance related aspects. This process of transmission/emission, subsequent propagation across a selected channel and reception/excitation defines the assessment, removal, and replacement of symbols in order to obtain optimised levels of performance. This process is repeated until an optimal symbolic dictionary is produced. This survival of the fittest-approach mimics the natural selection that occurs in biological evolution which is evident in the biological function. The invention provides the means and method in order to develop a set of symbols that perform well as a method of communication through a selected channel. This method also directly relates to the production of n-dimensional symbolic dictionary variables that generate near infinite; n-dimensional channel symbolic encryption. The invention provides the means and method to continuously generate and dynamically apply symbolic dictionaries and the like to any mobile cellular channel medium that is combined with any WI-MAX IEEE802.16 and or WI-FI IEEE802.11 omni and directional mesh network topology.

How the fitness of symbols or sets of symbols is defined can vary. In very general terms a very fit symbol is one that can be transmitted through the channel and recognised successfully at the receiver with little or no error, while an unfit symbol is one that is often mistaken for another symbol when transmitted through the system. The most direct approach to the process of evaluating waveform-symbol fitness is therefore to simulate using the symbols to communicate through the channel, and measure the probability of error for each symbol or group of symbols. While effective, this method of fitness evaluation can be time consuming, so as a faster alternative the fitness of a symbol can be defined as the minimum difference between the symbol in question and all the other symbols in the dictionary since the difference between symbols meaning the mean square difference between sample points. Certain channel topologies such a fibre optic channels tend to operate within well predicted modalities, while radio channels can perform with much wider variations of performance. This is a satisfactory definition of fitness because the chance of a harmonic symbol being mistaken for another by the receiver is determined by how similar it is to the other symbols in the dictionary. For the point of efficiency no symbol should be discarded, and all should be stored for later use.

While the most straightforward application of artificial evolution to the problem of optimising a dictionary of symbols is to generate a number of different dictionaries and allow them to evolve using the algorithm disclosed with reference to FIG. 2. In this method the inventions algorithm allows each new symbolic-waveform-entity in the evolutionary process to produce a whole dictionary like fractal mechanics that produces infinite variations of self similarity yet with infinite uniqueness. However, this process is both time-consuming and inefficient, because of the very large number of variables involved. Because the performance of any particular symbol is partly determined by the other symbols in the dictionary, a cooperative approach to optimisation is more efficient and utilised by the inventions. In a cooperative genetic algorithm, only single dictionary of symbols is considered, so that each entity is a single symbol, and the symbols must evolve in such a way that they complement one another, or cooperate, to form an optimal dictionary. It is also possible to combine the two approaches, both competitive and cooperative, to allow cooperative evolution within the alphabet and competitive evolution within each symbol. Symbols are presented in both frequency and time domain. However from a three dimensional point of view these same symbols need to considered in terms 360° degrees of phase from the point of view of defined channel top dead centre (TDC) or zero point.

When the optimised alphabet is used for data transmission, each symbol in the alphabet is assigned to represent a piece of data or contextual character. At the receiver, this data is recovered by matching the received symbol with those in the table. This pattern matching can be accomplished by any of a number of well-known methods. These include, but are not limited to, neural-networks of any kind, least mean square difference, maximum harmonic-match likelihood, etc. To compensate for the effects of the channel, in our particular case the GSM 850-900/1800/1900 MHz vocoder, or WI-MAX 802.16 VOIP vocoder, or H3D-VOIP Vocoder, the H3D-Codec as applied to any PCM sampling method such as VOIP within the channel of any communications channel. This is a novel three dimensional recursive protocol that is accomplished by measuring the mean effect on each symbol over a very long period of data transmission from an transmitter/emitter to a receiver exciter. In this way a new alphabet is created that contains, not what the symbols looks like at transmission, but what it is expected to look like on reception. The invention provides the means and method that ensures SVRO symbol integrity from the point of transmitter-emission, as it propagates through the channel to the point of receiver-excitation.

This new harmonic symbolic alphabet is then used by the neural network or other pattern matching mechanism when decoding the incoming symbols. This method of compensation allows each symbol to be equalised differently, which is an advantage for a non-linear or VOIP channel or WI-MAX 802.16 channel. The communication protocol described here, and represented by disclosed figures, requires no modulation as such. In fact, it is as simple as choosing from a look-up table at the transmitter, and addressing a different but corresponding table at the receiver that provides an optimised harmonic match. This has advantages of being low cost, flexible and easy to implement because this method requires minimal computation, for the method reduces computational complexity. The invention applies a unique protocol that manipulates the PCM voice channels voice activity detection (VAD) in terms of a technique designed to avoid transmission when there is no speech. The VAD constantly monitors the signal activity, to determine if speech is present or simply noise. If it concludes that there is no speech, it cancels transmission. This can cause problems for data transmission through the GSM channel, because it possesses noise-like or white noise features. The invention transmits an asymmetrical periodic beat-tone that contains no data but acts as a means of deactivating selected PCM channel filters that tend to impede efficient transfer of the inventions optimised symbolic data structures. These periodic beats are used to better optimise the selected channel in order to maintain VAD activation that also relates to the discontinuous transmission (DTX) mode.

The inventions H3D-GA-VM Modulation and dictionary generation means-protocols processes embodies the process of Initialisation, Waveform Fitness Evaluations, Waveform Selection, Waveform Crossover, Waveform Mutation, and Termination. In order to ensure that the VAD indicates that there is voice present, it is sufficient to dynamically vary the spectral envelope of the signal, over a time scale of approximately 80 ms with this optimised harmonic beat/tone pattern. To implement this under the current protocol, two transmission alphabets can be used, each designed to have different spectral shapes. Of course, this means that two different corresponding alphabets must be used at the receiver synchronously. This scheme is illustrated In FIG. 2. The fourth aspect of the invention introduces a method introduced here in order to propagate data communication through non-linear PCM channels with memory at the conventional vocoder point and the host serving networks trans rate adaptation unit (TRAU) that is located at the serving BTS or at the BSC are in some cases the serving MSC. This approach requires no modulation and little signal processing as such. The data rate achieved depends on the size of the alphabet, and can also be limited by the processing power of the calculating hardware.

Because the algorithm described here of generating an alphabet of signals is stochastic, each evolution is unique, the number of possible alphabets is virtually unlimited and the lends to the inventions massive encryption modalities because of unlimited symbol diversity. This makes it attractive for applications such as secure data transmission for financial communications such as ATM event transmission, and EFT/POS event transmission, pay-as-you go pre-pay debit services, and a vast array of machine-to-machine (M2M) applications since no additional encryption or other security layers are needed. Although the current embodiment considers data communication over GSM PCM voice channel, other possible applications of this technique include data communication over any kind of lossy non-linear channel with memory such as VOIP-TCP/IP channels.

The novel process is as follows: Initialization: set up initial population consisting of in-band-limited symbols, assign probabilities of crossover and mutation, other variables necessary for H3D-GA Fitness Evaluation: calculate fitness of each individual symbol in the population. The fitness reflects how well the symbol is "preserved" after having been sent through the vocoder or a via H3D-Codec Selection: is the process in which fitter harmonic symbols are selected to reproduce offspring for the next generation. Selection probabilities are assigned based on an individual symbol's fitness with relation to instant channel condition. The individual wave-symbols in the population are sorted according to their fitness Crossover: is a process in which new symbols are generated by exchanging features of the selected symbols parents with the intent of improving the fitness of the next generation Mutation: The mutation process ensures the diversity of a population. It is performed by adding a random disturbance to one or several components of a symbol termination: the termination occurs when the target fitness is reached or the certain number of generations has passed. This method is also used as part of the novel protocol, process and procedure that creates the continually improved performance versions of the H3D-Codec. The Holophasec 3D Codec is used to replace conventional vocoder software in relation to dynamic control enabled by the inventions SVRO Radio Module (SRM) for mobile cellular and WI-MAX IEEE802.16 omni and directional array topologies 184 that are interconnected to the SVRO Transaction Event Processor (STEP) gateway system.

Referring to FIG. 1, all telephony subscriber numbers whether mobile or land line based are comprised of similar nomenclatures. For example all subscriber directory or MIN numbers are comprised of NPA-NXX-XXXX number structures. In the U.S. for example the NPA or number plan area (NPA) designates the users originating or home subscriber area code. A serving Mobile Switching Centre (MSC) is physically located in a specific metropolitan or rural subscriber designated area. Each area is assigned a specific area code. If the NPA that was transmitted by the SRM 50 matches the NPA that is assigned to the currently serving MSC 53 then the SRM 50 subscriber is deemed a home subscriber. If the NPA sent by the SRM 50 does not match the serving MSC 53 assigned NPA then the SRM 50 subscriber is deemed a roamer or visiting subscriber. If the SRM 50 user is designated a home subscriber then the MSC 53 routes the SRM 50 REGNOT increment 117 is routed to the MSC 53 and its associated Home Location Register (HLR) 60. An HLR is a rather simple database that stores subscriber information such as current billing status, registration status, current area of operation, current call status such as in-conversation or not, remote feature access status, and other current historical activity details and the like. An HLR and VLR 61 is defined as a service control point (SCP) that operates over a disclosed signaling system seven (SS7) network. An SS7 network 59 is an out-of-band signaling network that is used primarily to carry subscriber information, call routing protocols, and the like.

In some cases an SRM 50 can operate as a roaming mobile subscriber, a home subscriber and a combination of both a roaming subscriber and a home subscriber simultaneously and this depends upon the type of service that is related to what SVRO application that is being utilised and served by the host network. This is completely depends upon the type of service that an SRM 50 is configured to provide to the user. Referring to FIG. 1 and FIG. 4, in this first example the SRM 50 is dynamically configured to transmit a SVRO Data call using the conventional vocoder/encoder 69 and the vocoder/decoder 69*a*, or the H3D-Codec as encoder or decoder 68, 68*a*. Once the SRM 50 is properly authenticated the SRM 50 user can choose to place either a conventional voice call, or transmit and receive lossless data call. The invention is so transparent the serving host mobile wireless cellular network will only "see" a SVRO Data communications event as a conventional voice call. The host network operator will not even detect any significant channel performance differentiations. This is actually one of the key advantages that comprise some of the inventions means and methods. An SRM 50 user can either be designated as a human user, or if the SRM 50 is connected to an application specific device (52) that relates to a machine to machine (M2M) communication then the SVRO Data call is placed based upon automatic autonomous instructions contained in the application specific device (AD) 52 operational software.

In one example of an SRM 50 is integrated with an automatic teller machine (ATM) and a customer inserts his credit card or bank card to perform some related transaction the SRM 50 simply responds to the automatic functions that enable a complete financial communications transaction. When an ATM customer inserts his card into a SVRO enabled ATM, by the time he has completed entering his personal identification number (PIN) the ATM has initialised a SVRO communications event. Once the authentication procedure is complete, the serving MSC 53 instructs the associated base site controller (BSC) 63 causes the associated base transceiver station (BTS) 54 to route a complete point-to-point data call communications circuit between the SRM 50 and the STEP 51 via an assigned reverse air-interface and PSTN channel 118. This conventional wireless mobile cellular public land mobile network (PLMN) PSTN 58 in-band channel path uses conventional TI/E1-ISDN 64 protocol methods. In this case the in-band channel is logically structured to support pulse code modulation (PCM) voice samples. In some application specific cases the inventions STEP gateway system 51 system can also initialise a voice and or data call to an associated SRM 50. An application service provider (ASP) 55 such as a banking system ATM switch facility can easily place a SVRO Data call by setting up the inventions specialised Holophasec 3D PCM data call to an associated STEP 51 system via the world wide web (WWW) 62 TCP/IP-VOIP network 62. The invention can apply its H3D-Codec to isolated virtual private network (VPN) 197 metallic and fibre optic channels in order to maintain the highest security possible. The inventions VPN 197 network also functions as a means to further guarantee delivery of mission critical messaging such as ATM and electronic financial transfer-point of sales (EFT/POS) transaction messaging. Whether a SVRO Data call is originated by an SRM 50 or a STEP 51 the invention applies novel virtual optimisation procedures to the operations of the assigned PCM speech/voice channel.

Referring to FIG. 2. The invention virtually converts these PCM samples to support lossless symbolic data message formats without the need of applying any additional overhead and the like. In fact the invention only applies management tones and that are harmonic beat patterns that disengage echo cancellation and noise suppression at the Interworking Function (IWF) that is a network element functioning within the currently serving host mobile cellular PLMN 155 as shown FIG. 1. Referring to FIG. 2, these channel optimisation tone-beat pattern increments 200*a*, 200*b* do not contain user data but simply are used to minimise certain operational procedures that may corrupt lossless data as it is transmitted within in-channel modalities that optimise lossy voice calls, yet may create anomalies that are deleterious for lossless data transfer across a conventional lossy PCM voice channel. These optimised tones and beat patterns are also used to minimise the operations of a currently serving base transceiver stations (BTS) transrate adaptation unit (TRAU) that typically manages air interface PCM voice channels that are used in nearly all mobile wireless telephony PCM voice channels. Therefore the invention applies selected frequency tones that dynamically turn off in-channel echo cancellation filters, optimise TRAU unit operations and other such voice channel elements, protocols, processes and procedure that can be optimized by the inventions virtual channel solutions. The invention applies optimisation tone-beat patterns 200*a*, 200*b* during the generation and transmission of optimised wave symbols that have been mapped to provide seamless lossless data communications. H3D-BP Tone Increment 200*a*, and 200*b* are an integral component of the inventions optimised wave mapping 138, 138*a* procedures that the SRM/STEP provide when an SVRO Data call is originated.

The SVRO virtual network utilises a specialised SVRO protocol stack that manages the inventions multichannel protocols, processes and procedures. The SVRO protocol stack is installed in a special data storage module 112 that is a key component of the inventions SVRO Radio Module (SRM) 50 as depicted in FIG. 4, and a specialised data storage module 112*a* that is also a key component of the inventions SVRO Transaction Event Processing (STEP) gateway 51 system. The SVRO protocol stack 112, 112*a* integrates and manages the virtual SVRO multichannel access multiplexing system 72, 72*a* as shown in FIG. 4, and FIG. 5, respectively. As disclosed the SVRO multichannel topology combines secure point-to-point circuit based channels with the invention uniquely simplified packet switched technology. The inventions SVRO protocol stack interleaves message content in a logical what-follows-what sequential fashion in order to maintain linear progressing of content delivery to its network destination. Pure packet switched technology assembles message strings in a non-sequential fashion across multiple TCP/IP channels that arrive at its destination out of sequence and have to be reassembled in order to make logical sense of the message.

Referring to FIG. 8, no matter which of the user time-slot-channels one 171, two 172, three 173, four 174, five 175, six 176, seven 177, and eight 178 are selected first during an initial network origination procedure, and which user time-slot channel is selected last to transmit a multi channel message, each channel is a dedicated circuit, not a shared channel. Typically all GSM-TDMA channel standards tend to assign the numerical order of zero to seven which comprises all eight time-slot or multislot channels. For purposes of this disclosure each time slot is designated one through eight. This slight change from the conventional means of designating the time slots one to eight enables a simpler logical description of the preferred embodiments that are contained within this disclosure.

Therefore each user time-slot channel contains a message that to pointed to the same destination; the inventions SVRO Transaction Processor (STEP) 51 gateway system or on the inverse to the inventions SRM 50 respectively. Combined the entire message becomes a packet switched structure over dedicated, secure, non shared circuits. Also the invention eliminates the overhead clutter of receiving out-of-sequence message structures and reassembling the message in order to make logical sense of the contained message. The protocol means and method of the invention insures timely, and orderly arrival of a logically structured message using multiple channels with ease. This is same method applied to all the invention wireless mobile cellular PLMN communication topologies and the inventions wire-fibre-line broadcom services.

Referring to FIG. 1, the SRM 50 and the STEP 51 SVRO protocol stack enables efficient host mobile PLMN channel access and utilisation. As disclosed the SVRO data messaging protocol is divided into packets that are cascaded sequentially using up to eight 151 up-link SYM-REV channels 118, and up to eight 152 down-link SYM-FWD channels 119 as shown in FIG. 1. Unlike GPRS, EDGE, 3G and 3GSM transmission which alternate, the inventions transmissions are continuous until the entire selected user message is completely transmitted and terminated through one to eight isolated channel streams. SVRO enables up to 48 kilo bytes per second, per user SVRO-PCM voice channel 118, 119 under the best radio channel conditions. When all eight channels of a GSM digital traffic channel are virtually assigned the SVRO virtual network method can deliver 384 kilo bytes per second, per user over an existing digital traffic channel that provides up to eight SVRO-PCM voice channels 118, 119 when the H3D-Codec 68 is activated and applied to each SVRO-PCM user channel. This novelty is enabled by the SVRO protocol stack 112, 112*a* as shown in FIG. 4, and FIG. 5 respectively. This performance is dependent upon instant radio channel condition, network element performance, optimised channel coding and SRM 50 capability. Like any packet switched technology the increase in data speed is achieved by using more than one timeslot of the TDMA frame and the assigned coded slot of a CDMA frame somewhat like HSCSD and V. 110. However this form of multiplexing has never been done before using multiplexed speech channels in a mobile cellular wireless communications environment. The virtual allocation of available time slots may vary from one instant to the next. This important aspect has to due with desired data rates required by the SRM 50 user and the STEP 51 operator in association with the application service provider (ASP) 55.

Unlike GPRS, EGPRS, V.110, HSCSD, 3G and 3GSM the SVRO virtual network does not require the addition of the SGSN support node that must be installed at each base site controller (BSC) 63 and mobile switching centre (MSC) 53 in order for GPRS, EGPRS to function. The invention provides better performance at an extraordinarily lower cost than any comparable GPRS, EGPRS, 3G, HSCDS, V.110, and 3GSM network solution. Once installed the STEP 50 system can serve a vast plurality of users through a plurality of mobile switching centres (MSC) 53, base site controller (BSC) 63 and base transceiver stations (BTS) 54 without the need of applying any hardware, firmware or software additions or upgrades to any existing mobile PLMN network elements.

Referring to FIG. 2, in order the better provide high speed data services over one or a plurality of simultaneously connected SVRO packet switched channels the invention also applies selected virtual in-channel modifications that keep the discontinuous transmission (DTX) and voice activity detectors (VAD) from interfering with the inventions single channel and multichannel communications, using asymmetrical beat-tone H3D-T-BP Tone Increments 200a, 200b as shown in FIG. 2. Conventional DTX/VAD protocols tend to impede efficient lossless data transfer from the inventions SRM 50 and the STEP 51 system. These modifications are dynamically applied during each SVRO Data communications event and do not constitute any permanent change to the host mobile wireless cellular network, nor do the inventions methods of optimisation cause any harm to the host network in any way. In this particular case the SRM 50 contains novel protocols, processes and procedures that enable the virtual mapping of optimised wave forms that are produced by the inventions disclosed artificial evolution-genetic algorithms, as shown in FIG. 2.

The invention generates optimised frequency, phase and amplitude combinations that are stable, and do not cause any problems with the conventional operational parameters and equipment specification. Vocoders are essentially a software module that exists within all mobile wireless digital voice telephony user apparatus. The H3D-GA-VM Modulation method does not transmit data through an existing vocoder or the inventions H3D-Codec, it simply creates acceptable lossless waveforms that are part of a specialised wave state dictionary produced by the inventions genetic algorithms. Each specific wave state, or combinations of plural wave states that equate to a conventional contextual character. Referring to FIG. 2, both the inventions SRM 50 and the STEP 51 contain stored symbolic dictionary 170 and 170a respectively that are data bases that hold these unique wave state characters. Each symbolic data base is a mirror reflection of each other. Contained within each data based are a wide range of optimised waveform data characters that may posses the same symbolic meaning. The invention applies two methods that require specialised software modalities that provide optimised wave states for propagation through an unmodified PCM air interface channel, a contiguously linked ISDN/PSTN channel, and a contiguously linked voice over internet protocol-PCM (VOIP) channel topology. The first method entails optimally mapping through the software modalities of (1) a conventional vocoder/encoder 69, 69a is used as a medium for the transmission of optimised wave form states and (2) when the inventions Holophasec 3D Codec (H3D-Codec) 68, 68a is used to transmit and receive symbolic data when one or plurality of logical PCM channels are used by the inventions multichannel protocols, process and procedures that are utilised over a serving host wireless mobile cellular PCM channel 126 PLMN network topology. The invention provides simultaneous voice and data communications over up to eight upstream-reverse PCM voice channels 151 and up to eight downstream-forward PCM voice channels 152 in one SVRO virtual Data communications event. However in order to enable the inventions virtual multichannel communications methods, selected specialised in-band and out-of-band authentication, virtual multichannel-cascading protocols, processes and procedures are applied. The invention integrates a plurality of virtual methods that involve the use of specialised protocols.

Referring to FIG. 8, the SVRO-MIMO: Multiple input-multiple output protocol stack also applies unique methods of utilises existing signaling system seven (SS7) network protocols, processes and procedures that relate to user authentication, automatic roaming methods and the like. The invention also applies unique protocols that enable automatic assignment of user time slot-channels. The SRM 50 and the inventions STEP 50 system monitor all control, signaling and user traffic of all digital traffic channels (DTC) 201 when one or more time-slot-channels 171, 172, 173, 174, 175, 176, 177, and 178 is assigned by the currently serving host mobile wireless cellular network PLMN 155 as shown in FIG. 8. GSM uses eight channels per digital traffic channel (DTC). Each channel has a gross data rate of 22.8 kbps and net rate of 13 kbps in a full rate PCM or non voice logical channel. Each bit frame possesses a time duration 4.6 milliseconds. Each user, including SRM 50 users transmits in every eight time slot of duration 0.575 ms duration over a uplink-reverse channel. The SRM 50 like any mobile subscriber station receives in a corresponding time slot that resides within the logical structures of a downlink forward channel, that was originally assigned by the currently serving base transceiver station (BTS) 54 and base site controller.

The invention also enables virtual assignment of additional time-slot-channels once the SRM 50 is assigned one time-slot-channel via conventional voice call origination and authentication procedures, using the same rotational scheme of every eighth time slot until the entire DTC is utilised by a single SRM 50. The invention does not circumvent or cause any disruption or any interference to conventional digital traffic channel (DTC). The invention utilises all conventional specifications and carefully manipulates various operational methodologies in order to virtually implement the inventions protocols, processes and procedures. Therefore specific conventional DTC parameters are well known to those who practice the art, and do not have to be detailed for purposes of disclosing the novelties of the invention.

Referring to FIG. 8, the inventions SRM 50 SVRO protocol stack causes 112, 112a the SRM to dynamically monitor all DTC 201 user-voice, user-data, control, and signaling traffic. The SVRO protocol stack causes the SRM 50 to monitor specific functions and activities that deal directly with DTC 201 traffic measurements, simultaneous voice calls and the like. For example a typical GSM digital traffic channel (DTC) such as various control channel modalities, paging functions and the like. One of the core aspects of the inventions simultaneous PCM channel assignment is the ability to monitor other user occupancy i.e., of all adjacent TCH channels the operate in the assigned DTC channel during a conventional voice call. The inventions SVRO protocol stack 112, and 112a monitors when other conventional voice channel users terminate conventional voice calls. In this way the SRM 50 novel SVRO protocol stack 112, 112a enables assignment of any idle time slot that (1) has not been previously assigned to another conventional voice or bearer logical channel data user and (2) any user time slot-channel that has been released by a conventional caller. GSM-TDMA requires substantial amount of signal processing for matched filtering and correlation detection for synchronizing with a time slot. The inventions SRM 50 and its contained SVRO protocol stack 112, 112a manages time-slot multiplexing. One SRM 50 can manage a much more efficient and simpler means of multi time slot-channel matched filtering and correlation detection for synchronisation with the serving BTS 54 then when the BTS 54 has to synchronise with possibly up to eight mobile subscriber stations (MSS) simultaneously.

Typically a GSM BTS 54 Transceiver 206 must enable accurate synchronisation with up to eight separate mobile subscriber stations (MSS) that are operating with different power levels, i.e., signal strength levels, multipathing characteristics and the like. In addition the transceiver 206 must synchronise conventional mobile subscriber stations (MSS) that are operating from different physical distances from the serving BTS 54 transceiver 206, this process exacts high levels of time critical processing from the serving transceiver 206. The invention eliminates these technical performance issues. The inventions SRM 50 is always in the same physical position in relation to serving BTS 54, transceiver 206 time slot channel multiplexing in that all assigned time slot-channels basically are managed by the BTS 54 transceiver 206 and the SRM 50 SVRO protocol stack 112, 112a. This method is well known to those who practice the multiplexing art in relation to GPRS, and other mobile subscriber stations (MSS) that operate using multiple time slots over a single DTC 201 such as HSCSD, EDGE technology and the like. However none of these communication technologies use multiple TCH voice channels simultaneously.

The invention is the first to virtually enable the multiplexing of a plurality of voice channel-PCM time slots simultaneously, in conjunction with the novel quick connect/disconnect circuit-packet switched methods of the invention as disclosed. Coupled with the invention in-channel H3D-GA-VM wave-symbol mapping the invention provides the most flexible, cost effective and efficient high band width wireless mobile cellular voice and data service in the world today. The invention enables these novel protocols, processes and services that enable a wide array of user and host wireless mobile cellular carrier applications without the need to modify or add network elements to the host carriers operational topology.

Referring to FIG. 8, for example depicted here is a logically structured description of a typical eight time slot-channel digital traffic channel (DTC) 201 that is currently configured virtually as a SVRO high bandwidth data and voice communications channel 126 that is optimised by unique H3D-GA-VM Modulation wave mapping symbolic structures. These unique structures are generated from harmonic optimisation procedures that detect channel bandwidth limits that are derived from the novel adaptation of artificial evolution-genetic algorithms. The inventions unique genetic algorithms read and respond to instant channel conditions, and immediately apply corresponding symbolic characters that have the best fit to instantly detected channel conditions. Referring to FIG. 7 and FIG. 8, the invention provides for simultaneous communications between a GSM PLMN 155 and an WI-MAX IEEE802.16 185 Omni and Directional Combined Star Topology and Mesh Topology network. A GSM PLMN network is based upon a centralized star topology network and an IEEE802.16 is a distributed Mesh network topology. The invention combines these networks for in some urban environments both networks are operating-simultaneously. The invention applies its unique H3D-GA-VM to GSM, IEEE802.11 and IEEE802.16 network channels. The invention combines these networks in order to be interleaved between IEEE802.11, IEEE802.16 channels and GSM PLMN multi-channels whereby the inventions SRM 50 manages a combined virtual network topology on the user end, and manages the combined network topology on the network management side with the inventions STEP gateway system 51.

The SVRO user is always processed as a home subscriber in relation to the SVRO global network. However each SVRO application user can be either categorized as a home subscriber or a roaming-visiting subscriber in relation to the host wireless mobile carrier's authentication and signaling modalities. In some stationary application specific cases such as ATM and EFT/POS applications, the host mobile wireless cellular carrier can be instructed to configure a special class of service (COS) that will enable the SRM and the STEP to algorithmically enable access to up to eight reverse-uplink logical PCM channels and eight fwd-downlink PCM channels without having to modify or upgrade the host GSM PLMN network in any way. Depending upon certain commercial arrangements the SRM 50 user can be deemed as a home subscriber and a roaming visiting subscriber depending upon the type of application service that is being used at an instant. An SRM 50 user can be defined both a roaming subscriber and a home subscriber. This feature is remotely programmable from the inventions STEP gateway system 51.

Referring to FIG. 1, FIG. 4, FIG. 5, and FIG. 8, if an SRM 50 user is deemed as a roamer or visiting describer in a GSM PLMN, the following conventional protocols, processes and procedures apply in relation to a single and multiple-multiplexed channel communications event. In conventional terms a Home Location Register (HLR) 60, and a Visiting Location Register (VLR) 61 contains all subscriber data required for call handling and mobility management for home mobile subscribers, and roaming mobile subscribers respectively. The HLR and VLR that exists within the network element configurations of all wireless mobile cellular carriers constantly communicate between each other across a wide inter-public land mobile network (PLMN) international network topology known in the art today as the SS7 network 59.

The invention manipulates standard intersystem procedures in terms of algorithmic interactions between PSTN and SS7 network entities that enable automatic roaming, and voice call and user data delivery, such as short message service (SMS) and other related features. The invention elegantly manipulates SS7 Transaction Capability Application Part (TCAP), ISUP user part connection protocols and the like. For example a VLR is a subscriber database that manages user information that is relevant to user currently located in mobile transaction area controlled by the VLR. The VLR also performs selected information management such as assigning a temporary location directory number (TLDN) also known as a Mobile Station Roaming Number (MSRN), and relaying pertinent user registration and call status information to the subscribers HLR 60. The invention applies unique virtual authentication protocols that manipulate mobile cellular intersystem operations which enables procedures necessary to provide to mobile subscribers, certain selected services requiring different interactions between different mobile cellular network systems. Specific SVRO authentication protocols that the invention utilises are a novel method of automatic roaming procedures that are specific to ANSI-TIA protocols used in North, Central and much of South America. ANSI-TIA 41 and GSM Mobile Application Part (MAP) messages are signaling messages that sent over SS7 networks. Messages Registration Notification (REGNOT), Registration Cancellation (REGCANC), Remote Feature Control (FEATREQ), Location/Routing Request (LOCREQ)-(ROUTREQ), Call Data/Routing Request (REDREQ), Call Redirection, Transfer-To-Number Request (TRANUMREQ), Service Profile Request (PROFREQ), Service Profile Directive (PROFDIR), Qualification Request (QUALREQ), Qualification Directive (QUALDIR), Cellular Subscriber Station Inactive (CSSINACT), and other pertinent subscriber authentication related messages have their equivalents in terms of GSM Mobile Application Part (GSM-MAP) use similar messages that perform the same or similar functions.

For explicit disclosure purposes GSM MAP SS#7/SS7 signaling and authentication messaging and related control channel terminology will be used throughout the remainder of this disclosure. However the invention is in no way limiting the scope of its implementation over all other mobile wireless cellular networks such as GSM, CDMA95, TS-CDMA, iDEN MTR, and the like. The inventions SVRO communications network is virtual network or virtual carrier that functions within the network elements of another GSM PLMN carrier network topology. The SVRO communications network that functions within the network elements of a WI-MAX IEEE803.16 network topology or a WI-FI IEEE802.11 network topology.

Figure 26:
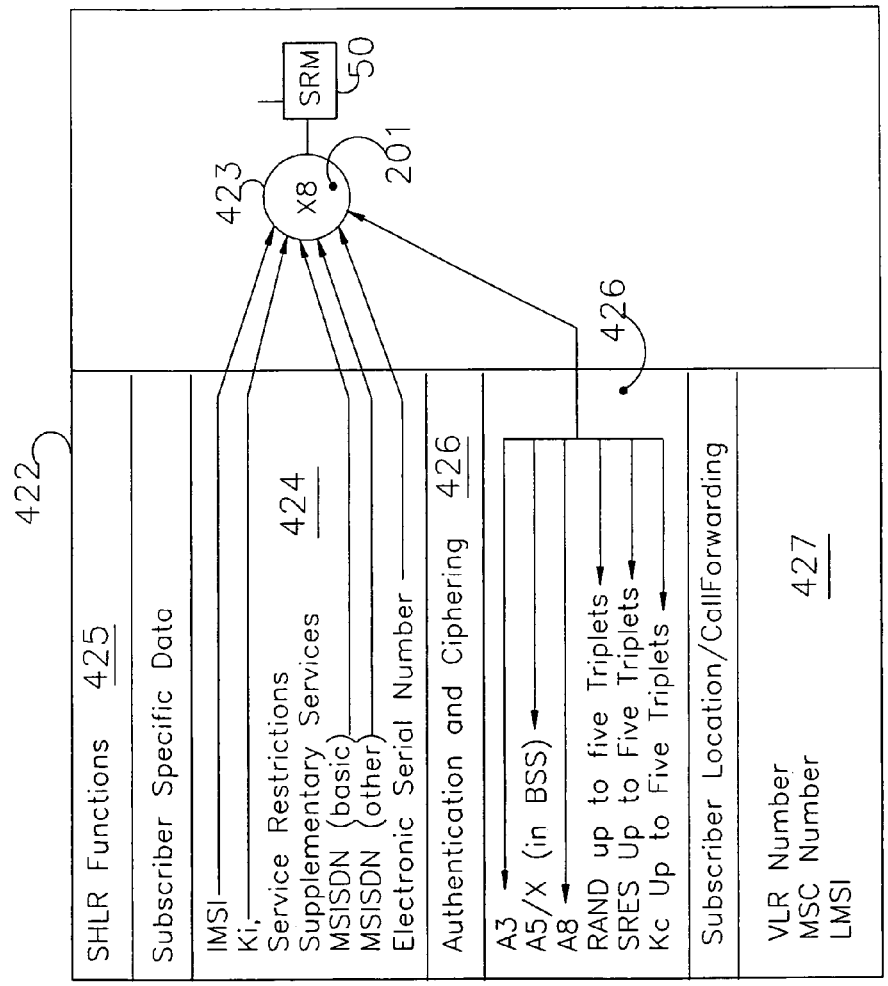
FIG. 26, Depicts a specialised SVRO Home Location Registers data protocol content, according to the invention.

Referring to FIG. 1, and FIG. 26 every GSM PLMN GPA requires access to at least one HLR 60 as a permanent store of data. The HLR can best be regarded as a large database with access times that must be kept as short as possible. The faster the response from the database, the faster the voice or data call can be connected. Such a database is capable of managing data for literally hundreds of thousands of subscribers. Within the HLR, subscriber-specific parameters are maintained, such as the parameter for Ki, encryption, which is part of the security handling. It is never transmitted on any air interface and is known only to the HLR and the SRM's SIM or USIM card. Since the SVRO Network is an independent virtual mobile communications network that operates seamlessly within a conventional GSM PLMN GPA, it is required that it has it's own HLR register known here as the SVRO HLR (SHLR) 66. The inventions SHLR 66 stores the same subscriber data and performs all the conventional functions of a conventional HLR. However the SHLR 66 performs many other functions in order to provide multi-channel service and multi-channel authentication X 8 423 for one SRM 50 that is communicating over an absolute frequency channel known here as a digital traffic channel (DTC) 201 and continually through recursive in-channel algorithms which enable the authentication of up to eight duplex channels by using only one programmable SIM card or Universal SIM card while still satisfying serving Mobile Switching Centre (MSC) authentication and call set up requirements. This method is coupled with the host GSM PLMN GPA special class of service that essentially turns off conventional airtime billing modalities and the like.

The invention uses a variation and modification of the HLR functions and data registers of the SVRO Home Location Register (SHLR) 66. The SVRO HLR 66 is one of the key components that comprise the inventions SVRO Transaction Event Processor (STEP) gateway system 51 as shown in FIG., 5. Referring to FIG. 26, the inventions SHLR 66 or any HLR for that matter is comprised of an array of data registers and its functions are largely governed by timers as are most telephony network elements. These registers hold multiple subscriber information and SS7 network information such as functional communication TCAP scripts, internal instructions and the like. An HLR is a service control point (SCP) that is found in mobile cellular networks and is used to store information regarding a cellular subscriber. The HLR stores information regarding billing, as well as services allowed to the subscriber. In addition to these, the current location of the conventional mobile subscriber station (MSS) and or the inventions SRM is stored in the HLR for retrieval by MSCs and the inventions STEP Gateway System's SW/SSP 87 as shown in FIG. 5 since the SVRO virtual network is functioning as a separate virtual network with its it's own MSCID, SID number and Carrier I.D., SS7 network addresses and the like and this has to with the relation of each SRM's assigned diallable and non-diallable MIN numbers.

The SHLR receives and transmits instructions, subscriber profile updates such as authentication and automatic roaming updates that are contained in what is known as Transactions Capabilities Application Part (TCAP) messages. GSM MAP is an intelligent network that uses the TCAP protocol to invoke feature changes in remote switches and databases such as HLRs and VLRs. TCAP allows features to be activated and deactivated remotely. In terms of GSM MAP-intelligent network TCAP messages include QualificationRequest, QualificationDirective, RegistrationNotification, RegistrationCancellation, LocationRequest, RoutingRequest, RemoteFeatureControlRequest, ServiceProfileRequest, ServiceProfileDirective, TransferToNumberRequest, MSSInactive, RedirectionRequest, CallDataRequest and the like. The SRM only registers once as a visiting subscriber and the inventions SHLR cancels that registration upon completion the inventions MRC pre-connection registration by the SW/SSP that is a component of the STEP gateway system.

The SHLR manages all these conventional authentication and automatic roaming updates and instructions like any other HLR. However the inventions SHLR performs additional functions that enables multiple TCH voice channel assignments to one SRM that is configured with only one Subscriber Identity Module (SIM) or Universal SIM card by simply authorizing the authentication of to up eight reverse uplink full rate TCH channels and eight forward downlink full rate TCH channels simultaneously by allowing eight simultaneous data conversations or one voice conversation and seven data conversations simultaneously. In fact the SHLR 66 provides software modifications that utlise and manipulate received MSCID messages that also relate to BSIC-SID and BTS numbers and the like. The SRM 50 is designed and programmed to only recognise and respond to the dialed STEP (STAN) number via caller I.D. means and methods when it is in fact called by the STEP gateway system. SRMs that are physically and logically interconnected to application specific devices (ASD) such as ATM machines, EFT/POS machines, other unmanned M2M systems, lap top computers, PDA's and the like will only respond or answer when a STAN number is received in the caller I.D string via a forward downlink channel or during an in-channel communication that enables the transfer of new multi-channel subscriber information.

In still another configuration the SW/SSP 87 can function as a tandem switch or sub gateway MSC that handles all out-bound and in-bound multichannel traffic and authentication algorithms in association with the STEP gateway system 51 SHLR 66, and the associated GSM PLMN gateway MSC 53a. In fact the currently serving GSM PLMN MSC 53 handles all mobile related functions such as handoffs, handovers, and voice channel assignments and the like, and the inventions SW/SSP 87 simply handles all the authentication and call routing of the multichannel protocol in association with the SHLR 66. Referring to FIG. 1, and FIG. 5, all SRMs have assigned unique MSISDN-MIN numbers that are associated with a special class of service (COS) that enables the serving GSM PLMN MSC 53, 53a to simply route all SVRO user and signaling traffic to the associated STEP Gateway 51 SW/SSP 87. The SVRO SW/SSP 87 is uniquely configured to serve up to eight forward and reverse channels for each SRM with respect to each voice and data communicative act. The SW/SSP 87 is configured to enable Transaction Capabilities Application Part (TCAP), ISDN User Part (ISUP), High-Level Data Link Control (HDLC) and other primitives that communicate between the serving GSM PLMN 155 Gateway MSC 53a, the SHLR 66 and the like. The invention enables these modifications to be fully interoperable with GSM MAP and or ANSI signaling standards without circumventing or disrupting these signaling network standards.

Figure 25:
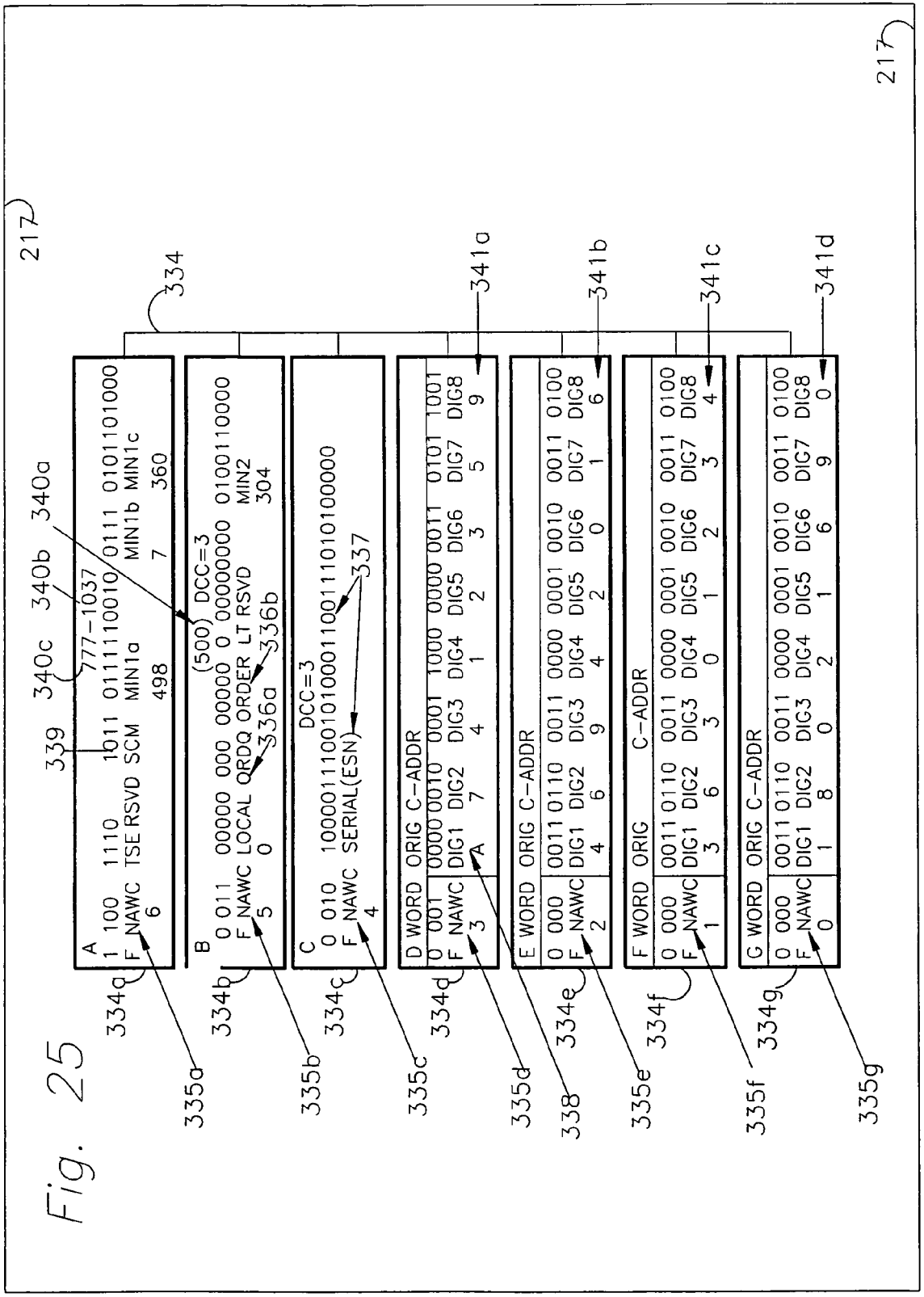
FIG. 25, Depicts an SVRO Remote Access Application Message, according to the invention.

The SHLR receives and transmits instructions, subscriber profile updates such as authentication and automatic roaming updates that are contained in what is known as Transactions Capabilities Application Part (TCAP) messages. GSM MAP is an intelligent signaling network that uses the TCAP protocol to invoke feature changes in remote switches and databases such as HLRs and VLRs. TCAP allows features to be activated and deactivated remotely. In terms of GSM MAP and ANSI-41 intelligent network TCAP messages include the equivalent QualificationRequest, QualificationDirective, RegistrationNotification, RegistrationCancellation, LocationRequest, RoutingRequest, RemoteFeatureControlRequest, ServiceProfileRequest, ServiceProfileDirective, TransferToNumberRequest, MSSInactive, RedirectionRequest, CallDataRequest and the like. The SRM only registers once as a visiting subscriber and the inventions SHLR cancels that registration upon completion of the inventions MRC pre-connection registration by the SW/SSP that is a component of the STEP gateway system. Referring to FIG. 1 and FIG. 25, in still another application specific message the invention uses the remote feature access to notify the STEP gateway system 51 of an SRM's 50 presence in a local SVRO network.

The SRM 50 transmits an SVRO remote feature access application message (S-RAAM) 334. This message is routed through the serving GSM PLMN MSC 53 to the inventions STEP Gateway system 51 SW/SSP 87 which then relays the S-RAAM 334 message to the SHLR 66. Upon reception of the message the specialised SHLR 66 relays the S-RAAM message to the authentication database (ADB) 86b which initialises a message of SVRO Harmonic Pulse Data (SHPD) Message and or SVRO CLID data message to the SW/SSP 87 which contains a local access home subscriber MSISDN-MIN and IMEI number. Once the SW/SSP 87 receives this message it simply relays the SHPD or SCLID message to the serving GSM PLMN MSC 53 or Gateway MSC 53a. Once the serving MSC 53, 53a receives the message it routes the message to the serving Base Transceiver Station (BTS) 54 which in turn transmits the message to the SRM 50 via an user traffic channel. Once the SRM 50 receives the message it connects to the STEP Gateway system 51 and its SW/SSP 87 as a local home subscriber using the updated MSISDN-MIN.

Referring to FIG. 26 the SHLR 66 manages conventional TCAP messages and enables multiple reverse and forward TCH assignments without circumventing conventional GSM MAP Intelligent Network SS7 communications in any way, yet enables additional functionality such as managing multiple channel authentication procedures from one SRM when the Multi-Call is either SRM originated or STEP Gateway system originated. This process occurs when the SRM's SIM card is updated by the STEP gateway system during the pre-connection MRC procedure with a home subscriber MIN number and other information, if the instant registration is the first registration when the SRM is initially detected by a specific GSM PLMN GPA that is SVRO virtual network enabled. The SHLR contains subscriber specific data 424 such as IMSI, Ki, Service restrictions, supplementary services, MSISDN basic, MSISDN other and electronic serial numbers (ESN) 424. The SRM receives an MSISDN MIN number, a phantom ESN number, IMSI number, LMSI numbers and other alpha numeric information that is logically associated with the SVRO HLR 66 and SW/SSP 87 that are components with the STEP Gateway system 51, and the serving GSM MSA PLMN 155. The STEP Gateway system is an installed component array of the serving GSM MSA PLMN 155 and has ranges of diallable and non-diallable MSISDN-MIN numbers assigned to it that are only associated permanently or temporarily with a plurality of SRMs and individual SVRO-SRM channels. Therefore the invention provides innovative authentication and ciphering 426 which include multiple A3, A5, RAND ciphering information, SRES information, Kc authentication and the like. The invention provides conventions VLR numbering, MSC number and LMSI numbering 427 when needed by associated network entities.

Referring to FIG. 1, once the currently serving base transceiver station (BTS) 54, and the serving base site controller (BSC) 63 assign the DTC physical channel in association with the serving MSC 53, the REGNOT 117 is transmitted via assigned DCCH control channel in order to facilitate a network access message-which is a data packet that is forwarded to the currently serving Mobile Switching Centre (MSC) 53. A typical registration notification (REGNOT) increment is a control message that contains numeric information that is typically comprised of a 10 digit mobile identification number/MSISDN (MIN), an eight character electronic serial number (ESN), a 15 bit system identification numbers (SID) and in some cases the 15 character IMEI numbers. This identification increment also relates to the 15 character International Mobile Subscriber Identity (IMSI) and other such conventional registration nomenclature that is well known to those who practice the art. This particular REGNOT increment 177 serves to authenticate the SRM 50 user as a conventional wireless mobile cellular subscriber.

Referring to FIG. 4. The inventions SRM 50 contains a standard and or universal subscriber identification module (USIM) card 73. This SIM card can be used by all GSM, CDMA, IEEE802.11 WI-FI, and or IEEE802.16 WiMAX enabled SRMs 50. Relevant to the inventions means and methods are automatic roaming methods in addition to the disclosed network registration protocols. These protocols are used by nearly all international mobile wireless cellular networks and are included with the network operational standards used by all of these mobile communication network topologies. Whether it is a GSM 900/1800 network operating in Europe, a TS-CDMA network operating in China, a GSM 850/1900 network or a CDMA-IS-95/2000 network operating in the United States, all automatic roaming networks use the same basic messaging primitives, and physical network topology with similar network elements. Similar logical protocols, processes and procedures are also used by the same networks noted here. All automatic roaming networks that support mobile wireless cellular roaming tend to perform the same basic functions that are well known to those who practice the art. Therefore only specific functions that describe the novelty and utility of the invention will be disclosed for purposes here. The invention provides the lowest cost channel-air time rates with participating wireless mobile cellular carriers because of its fundamental efficiency.

Figure 3:
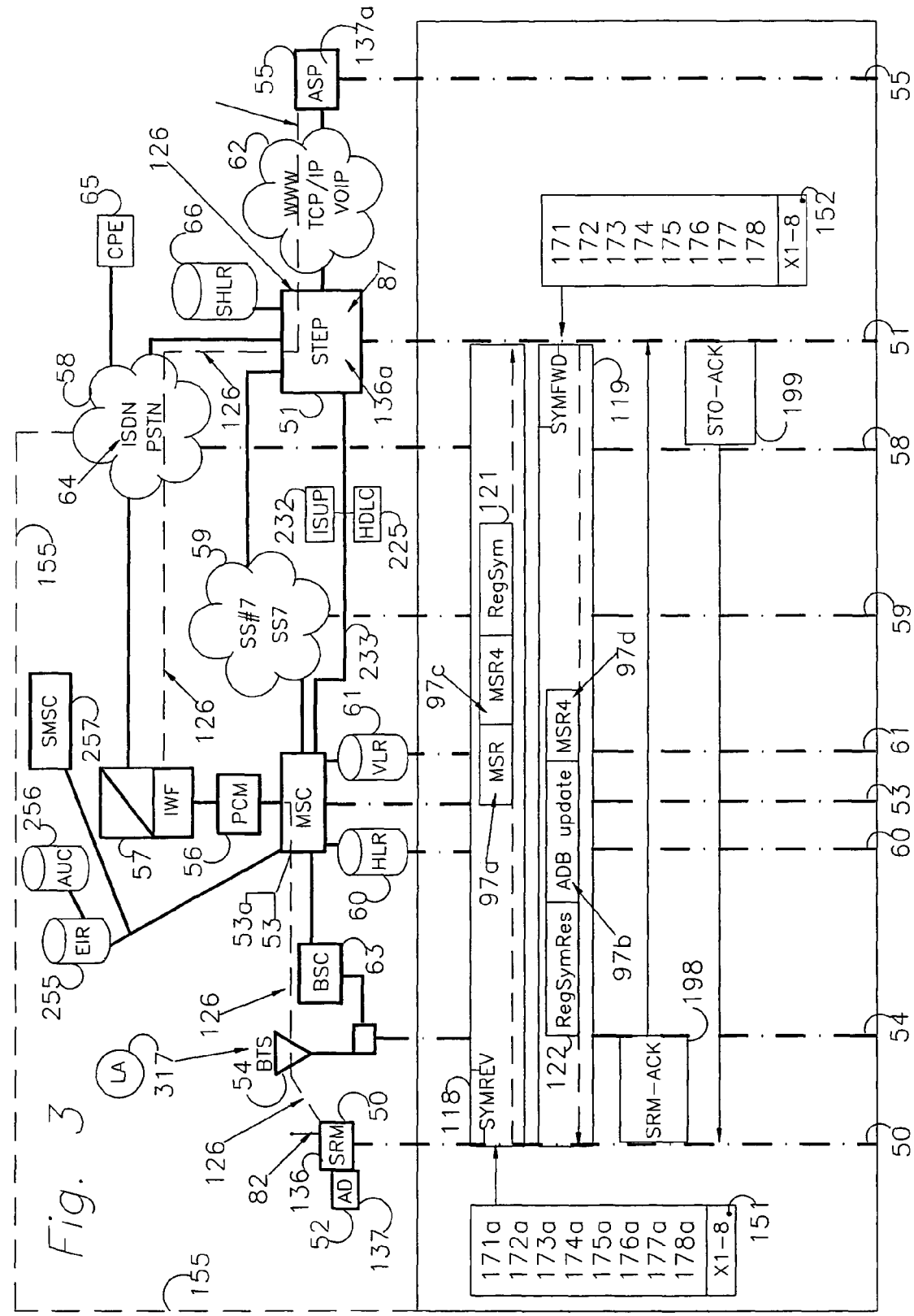
FIG. 3, Depicts a logical block diagram of the multi-channel authentication protocol, according to the invention.
Figure 6:
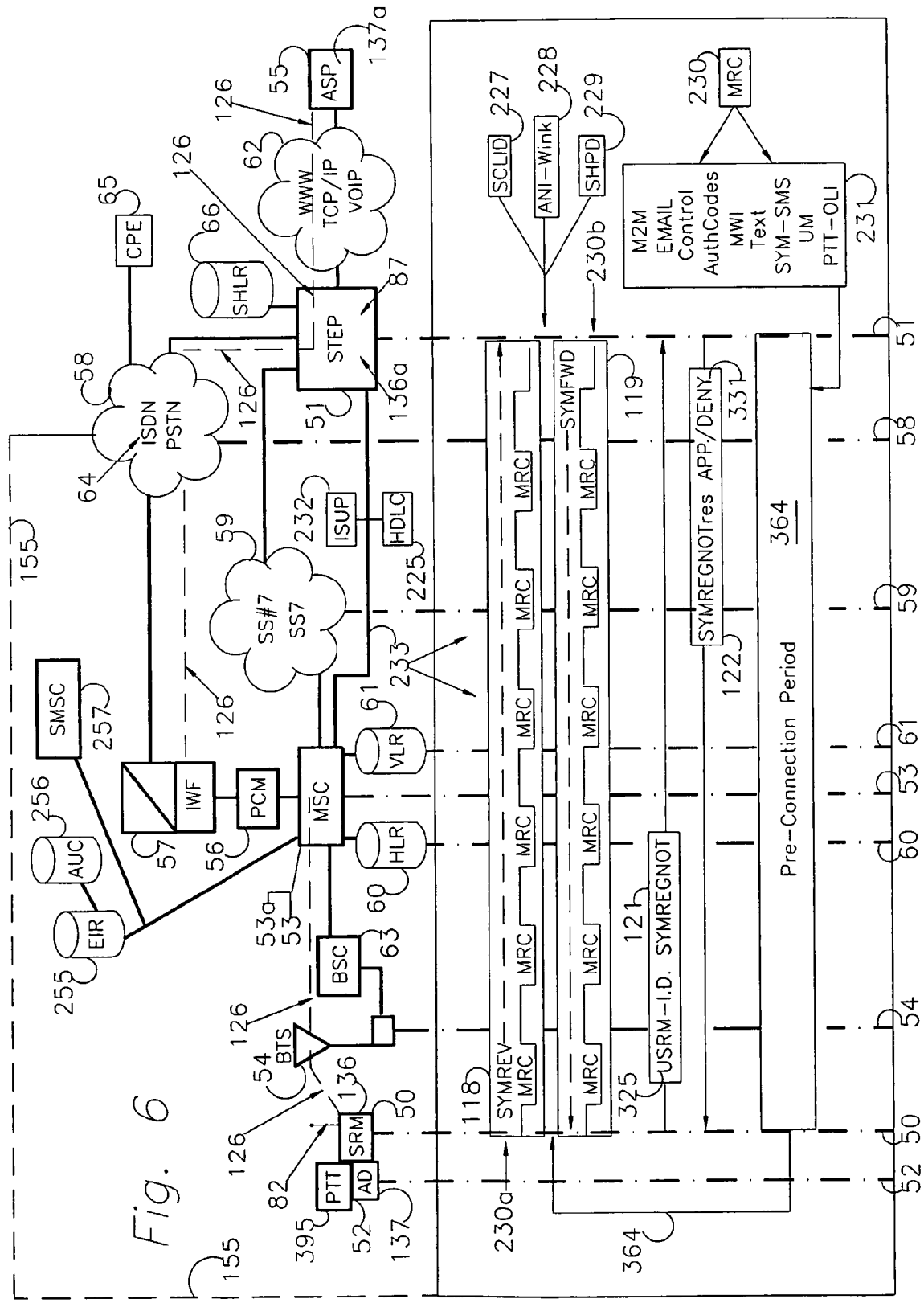
FIG. 6, Depicts a logical block diagram of the multi-circuit path topology with contained SVRO Caller I.D. increment, according to the invention.

Therefore the invention is perfect for delivering content to all multimedia devices such as Apples' iPOD music and multimedia players and all equivalent systems offered by competing manufactures and the like. An iPOD for example can be a physically and logically integrated application device (AD) 52 as shown in FIG. 1, FIG. 3, and FIG. 6. Referring to FIG. 4, the invention supports virtual and physical docking with content devices such as the MP3, MP4, players Apple iPod and wireless gaming platforms such as Sony PSP. The SRM 50 will feature an array of connectivity options. The SRM 50 will support USB 2.0, and Firewire connectivity formats for wired connections to the PlayStation 2, XBOX, and PC and will employ 802.11b wireless LAN, DECT, ISM, and or Bluetooth-Frequency Hopped Spread Spectrum (FHSS) in order to connect to other application specific wireless devices. The SRM 50 will enable IR Remote-SIRCS and IrDA infrared connections in addition to RS-232 85, Universal Serial Bus (USB) 85a and ISO 85b.

In FIG. 4, for example the inventions SRM can support seamless H3D-GA-VM modulation over voice channels, WI-MAX IEEE802.16 and also roam into a 3G network such as UMTS and or CDMA1X, and utilise its packet switched topologies for various application specific services that is algorithmically pointed to the inventions STEP gateway system via TCP/IP links. The invention can provide combined interleaved channels that support TCP/IP, VOIP over voice TCP/IP over 3G networks in one multimode communication user apparatus during a single communications event. In FIG. 4 the invention is designed to support selected configuration combinations 83 such as (a) GSM and GPRS in one radio module, (b) GSM and 3G in one radio module, (c) GSM, 3G and WI-FI IEEE802.11 in one radio module, (d) GSM, 3G and WI-MAX IEEE 802.16 in one radio module, (e) GSM, 3G and WI-MAX IEEE 802.16, in one radio module (f) GSM, 3G and Bluetooth ISM in one radio module (g) GSM, 3G, WI-FI IEEE802.11 and Bluetooth ISM in one radio module, (h) GSM, 3G and DECT in one radio module (i) GSM and CDMA in one radio module, (j) GSM, WI-FI-IEEE802.11 and TS-CDMA in one radio module (k) GSM, CDMA WI-MAX IEEE802.16 in one radio module (1) GSM, TS-CDMA, WI-MAX IEEE802.16 in one radio module and the like. This is also accomplished simply because the inventions STEP gateway system 51 is designed to support all forms of backend network communications modalities such as 3GPP 430 and Camel 431 network management protocol stacks as shown in FIG. 5.

In FIG. 4, the SRM 50 is depicted in the form of a logical block diagram that simply shows the key radio and protocol layers that are associated with conventional mobile radio operations with specific emphasis on voice sample and channel processing. In addition to the conventional components, processes and procedures there are unique firmware and software modalities that enables the inventions unique processes and procedures as described in logical block forms. There is provided a printed circuit board (PCB) array 67 that contains components that manage the following processes; speech encode 71 procedures, speech decode 71 procedures, channel encoding-interleaving and burst generation 75, and channel decoding de-interleaving-re-formatting 74. Other conventional components contain and include the power amplifier, 79, ciphering 76 protocols and deciphering 77 protocols, channel modulation 78, demodulation 80 and the like. Physical and logical channel interface include an RS-232 port 85 and an quad-band antenna 82.

The invention provides single and multi channel voice and data communication protocols, process and procedures that use modified automatic roaming, authentication, and call flow protocols, processes and procedures. For example when an SRM 50 as shown in FIG. 1, and FIG. 4, first registers with a currently serving GSM PLMN using ESN, MIN-MSISDN, and IMSI identity numbers along with other conventional user information that is contained within the substrate data register layers of a typical SIM card 73. In addition the invention provides a specialised random number data base (RDB) that is designed to simulate the data substrate structures of a typical SIM card 86. This database 86 contains multiple Phantom MIN-MSISDN numbers, electronic serial numbers (ESN) and other information that enables seamless multi time slot-channel authentication in conjunction with a mirror authentication database (ADB) 86a that resides within the pertinent hardware, firmware and software elements of the inventions STEP gateway system 51. Once conventional registration increment has been completed the host GSM carrier the SRM 50 originates a normal voice call from the SRM 50 to the STEP 51. During the origination procedure the SRM 50 transmits selected dialed digits that are assigned to one of a plurality of voice circuits by the serving telephony-PSTN network to the currently serving STEP gateway system 51.

The host GSM carrier simply points the call to the STEP 51 using conventional telephony circuit switched connection modalities well known to those who practice the art. In this case the SRM 50 user has selected a SVRO single channel event that utilises the vocoder to map lossless symbolic data across the host full duplex voice channel designated here as the assigned time slot PCM-channel 118 and 199 respectively. The user in this case is a non-human application specific device 52 such as an ATM machine. Once the SRM 50 is connected to the STEP gateway system 51 the inventions in-channel authentication protocols commence. The invention specifies two ways to authenticate in-channel.

One method is to authenticate after the full connection is made and the other method comprises an in-channel pre-connection method using manipulated MRC/SHPD data and modified caller I.D. increments that relate to on-hook communications of calling number and other alpha numeric character propagation that can occur during an in channel data communications event that transpired between the inventions SRM 50, the application device (AD) 52, and the STEP gateway system 51. Caller ID means and methods can be utilized in applications that perform database lookup for in channel authentication for SVRO customer records. An example of this could be in a banking application. Typically a customer will call in and be prompted to enter in pertinent information to get at their account information. With Caller ID integrated into this, a customer calls in and the application can use the Caller ID to key on his/her record. When the SVRO user's record has been found and he is authenticated and a complete SVRO connection can be completed.

Referring to FIG. 6, the conventional Calling Line Identification (CLID) service is a subscriber feature that is used nearly in all PSTN wireline and mobile PLMN networks operating in most regions of the world. This feature transmits data during the silent period between the first and second ring. The data is transmitted whether the caller is subscribed or not. The caller does have the option of preventing his/her information from being sent if he/she chooses to do so. The Calling Line Identification (CLID) service makes it possible to display a variety of data such as the number, time, and date of the incoming call as well as the name of the owner of the phone. There are two caller I.D. message formats called single data message format (SDMF) and multiple data message format (MDMF). Today MDMF tends to dominate most caller I.D. formats used in the art today. The invention manipulates the SDMF and MDMF formats in order to enable the transmission and propagation of pre-connection application specific data.

The invention enables application data transmission by inserting application specific data during the silent periods that are produced during the inventions quick connect ring cycles. However the invention is not confined to just using manipulated CLID silent periods. The invention creates a manipulated ring cycle (MRC) 230 protocol that also includes specialised protocol that are generated between the inventions SRM 50 and the STEP gateway system 51 during the pre-ring cycle, ring cycle and post ring cycle increments that occur prior to completing a circuit full connection. The inventions unique SCLID 277, M-ANI-Wink 228, and specialised harmonic pulse data (SHPD) 229 is used to manipulate and generate alpha-numeric user, authentication and control information before a circuit-connection is completed. The inventions MRC means and methods also enables a unique always on feature. In the same way a mobile cellular station receives the callers name, and calling number, the invention enables pre-connection communications that includes but are not limited to control information, authentication codes, message waiting indicators, SVRO Short Message Service, Universal Messaging and Push-To-Talk Over Cellular (PTT-PoC) User Group On Line Indicators (PTT-PLI) 231 and the like. Additional application specific messaging includes pay-as-you go debit prepay balance notifications, application specific device heart beat increments, application specific device bi-directional control messages, authentication denial messages and other pertinent messages to a selected SRM 50 from the serving STEP 51 gateway system and visa-versa. Such application systems as Automatic Teller Machines (ATM) stationary and mobile electronic financial transaction-point of sales (EFT/POS) terminals can be managed remotely by simply using the inventions MRC protocols, processes and procedures.

The invention uses no tones, or any multifrequency, polyphonic tones or other such means that may interfere with conventional PLMN 155, PSTN 58 network element operations. Such systems as mobile switching centre (MSC) 53 systems, Gateway MSC and associated systems 53a, base site controller (BSC) 63, interworking functions (IWF) 57, ISDN user part A/B/C/D (ISUP) call control protocols 232 Telephone User Part (TUP), High Level Data Link (HDLC), Synchronous Data Link Control (SDLC), and subsets such as Link Access Procedure-Balanced (LAP-B), Link Access Procedure D-Channel (LAP-D), X.25, SCTB, Transactions Capability Application Part (TCAP) and other related protocols are also not adversely effected by the inventions means and methods. In fact the inventions virtual This protocol manipulates and creates a new virtual symbolic data signaling system called SVRO Caller I.D. (SCID) 227. The protocol manipulates and creates a unique protocol based upon manipulates ANI-WINK, Multifrequency (MF) and other such protocols 228. The invention also introduces specialised harmonic pulse data (SHPD) that uses the manipulated ring cycle (MRC) 230 methods that do not depend upon using modified caller I.D. increments. While the invention uses the silent periods that occur between a plurality of ring cycles, the SRM 50 and STEP gateway system 51 can generate SVRO H3D-Modulated-Harmonic Pulse Data (SHPD) in between these ring cycles and other novel means and methods as well. SHPD protocols are also used for Push-To-Talk Over Cellular (PTT-PoC) User Group On Line Indicators (PTT-OLI) and the like.

Referring to FIG. 1, a SVRO multislot-channel communications event transpires within the novel protocols, processes and procedures disclosed here. When the SRM 50 is energized, it automatically transmits a registration notification (REGNOT) 117 increment to the currently serving MSC 53 via the currently serving base transceiver station (BTS) 54, and the serving baser site controller (BSC) 63. The REGNOT 177 contains the 10 digit MSISDN-MIN 234 number, the eight to ten character Electronic Serial Number (ESN) 235 as shown in FIG. 4 and other pertinent subscriber and other conventional mobile station (MS) control and user information that is contained in the inventions specialised authentication database (ADB) 86a such as the 15 character SID-IMSI numbers, 15 character IMEI numbers and the like that are contained with the data registers of Subscriber Identify Module (SIM) card 73. The SIM card 73 is a removable memory storage device associated with the inventions SRM 50. Referring to FIG. 1, the MSC 53 receives the REGNOT 117 performs a look up algorithm that is associated with the number range of contained MSISDN-MIN number and determines one aspect of the subscriber authentication procedure, the MSISDN-MIN number translation procedure; whether the SRM 50 should be designated a roaming subscriber or a home subscriber coupled with the class of service (COS). In this case the SRM 50 is assigned an MSISDN-MIN number 503-339-0321 that is not associated with the currently serving MSC 53.

The SRM 50 in this particular instance is deemed a roaming subscriber. All MSISDN-MIN number formats across the globe are arranged in the following nomenclature. Number Plan Area (NPA), Office Code (NXX) and XXXX codes. NPAs and NXX codes are assigned to mobile subscriber units based upon the class of service (COS) that the mobile subscriber unit (MSU) is associated. The OX or circuit codes designate a particular node code or point code. There are many government related, business related, and regular consumer class of service (COS). Referring to FIG. 4, the invention applies both regular subscriber MSISDN-MIN numbers 234 when the SRM 50 user selects a regular voice call. A Non-Diallable MSISDN-MIN numbers 111a to each multi-slot-channel enabled SVRO SRM 50. One to eight Non-Diallable MSISDN-MIN numbers can be utilised 111a when the user selects the SVRO Broadband service that originates and connects to a the inventions STEP gateway system using from one to eight Multislot-channels TCH channels that are associated with any conventional reverse uplink and forward downlink GSM digital traffic channel (DTC). The invention stores these selected non diallable MSISDN-MIN numbers in either a special programmable USIM card 73 or a resident volatile Authentication Data Base (ADB) 86a, 86b that is an integral part of the inventions SRM electronic componentry array that comprises the printed circuit board (PCB) 67 and shown in FIG. 5, and FIG. 4 respectively. The ADB 86a, 86b contains all the subscriber data that is contained in the disclosed SHLR functions 422, as shown in FIG. 26. Referring to FIG. 4, a non diallable MSISDN-MIN is created when the number nomenclature is configured to use an NPA and or an NXX that uses a non-standard numeric 0-9 character assignment with the respect to the N number. All telephony number nomenclature is configured in the following numeric array; NPANXXXXXX. In the U.S. for example the N number is always restricted to a number range of 2-9. P, A, and X numbers are all designated 0-9 except in certain class of service (COS) originating categories. Non-diallable MSISDN-MIN numbers have been used in the art in the last few years to facilitate call flow and data transfer over mobile cellular control channels and SS7 network elements. Such M2M telemetry/telematics services as the Control Channel Application Data (CCAD) Microburst network in North America use this method.

In terms of SS7 networks and the out-of-band call set up routing that these networks provide a diallable and non-diallable MSISDN-MIN number acts a routing address that is configured as global, cluster and node codes. The TCAP-ISUP message contains MSISDN that is associated with an ANSI-41 and or GSM-MAP origination point code (OPC) and a destination point code (DPC). For example the inventions has its own set of OPC and DPC codes that is associated with the Number Plan Area (NPA) that is assigned to each SVRO virtual network that is installed and functioning within a GSM PLMN GPA. In fact each SW/SSP and SHLR has its own OPC and DPC code that are associated with each assigned MSISDN-MIN, that is assigned to each SRM. In some application specific cases the regional SVRO operation that includes one or a plurality of STEP gateway systems 51 combined with a plurality if SRMs 50 will operate as virtual carrier with its own assigned carrier I.D.; SID and or IMSI numeric designation in accord with local mobile cellular market operational practices.

Referring to FIG. 1, and FIG. 4, the key advantage for non-diallable MSISDN-MIN numbers 111a for SVRO is that a conventional caller who uses some form of customer premise equipment (CPE) 65 such a regular telephone instrument, a dial up modem, or a conventional mobile subscriber station cannot mistakenly dial one of seven to eight non-diallable MSISD-MIN numbers associated with the SRM 50. Also instill another modality the SRM 50 is programmed to only respond to a dial up from the inventions STEP Gateway system 51, and this enabled using the standard caller I.D. feature that is used in all PSTN and GSM PLMN 155 areas. The STEP Gateway system in some applications as a call forwarding network element when the application specific SRM is configured to accept conventional voice calls from a CPE 65, another SRM or a standard mobile subscriber station (MSS). In all cases, the STEP gateway system processes all incoming and outgoing voice and data calls. The SRM user can only receive conventional voice calls over one of its dynamically assigned multislot-channels.

Figure 10:
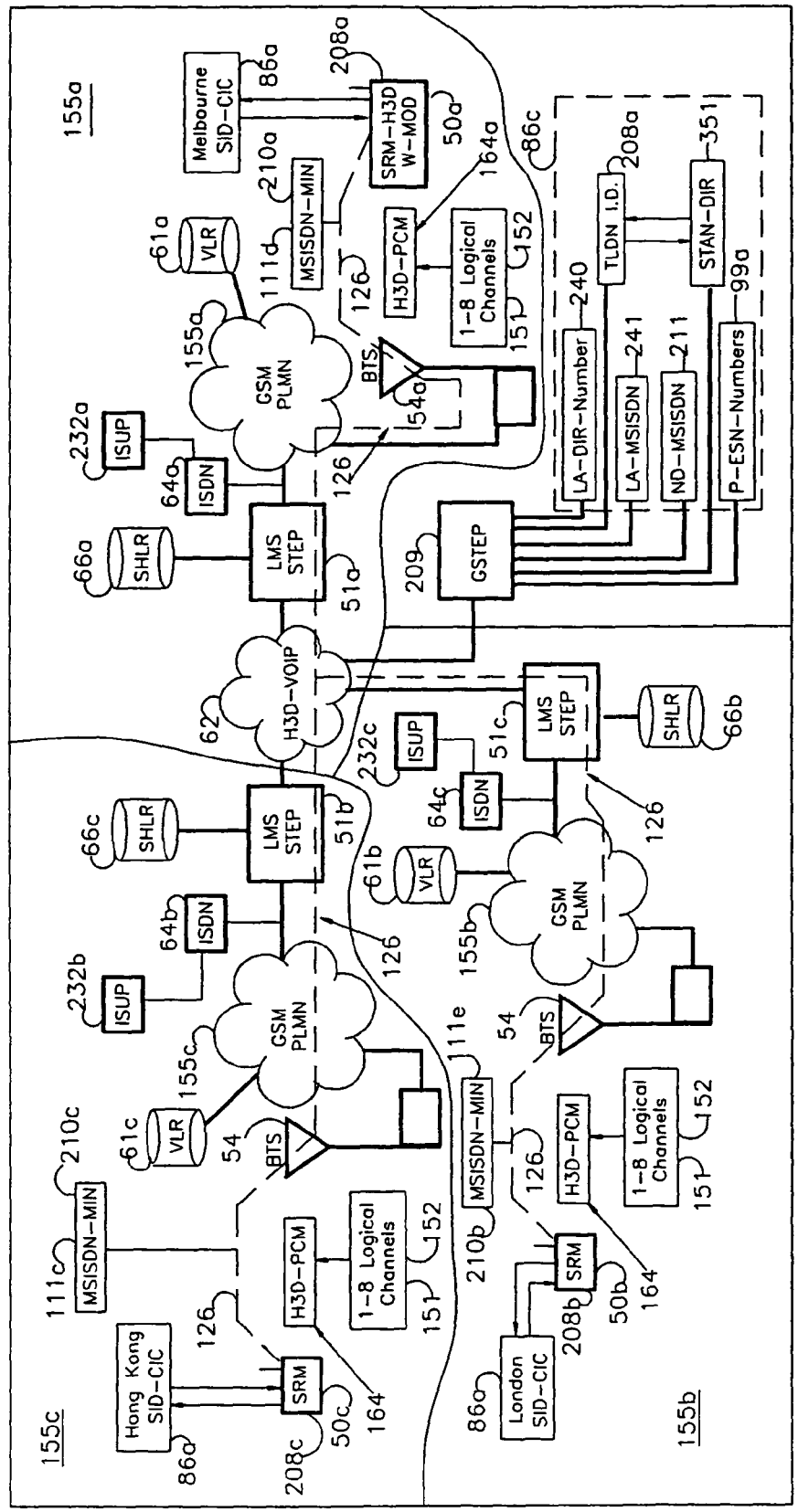
FIG. 10, depicts a logical diagram of the SVRO Global Network Topology, according to the invention.

Referring to FIG. 10, none of the non-diallable MSISDN-MIN numbers and the associated multislot-channels will be accessed from outside the STEP gateway system 51a, 51b, 51c, and the instant associated MSC 53 and gateway MSC 53a. Referring to FIG. 4, FIG. 5, and FIG. 10, an SRM 50 and STEP gateway system 51, that are defined as local market STEP gateway systems 51a, 51b, 51c and the global STEP system 209 contains a Authentication Database (ADB) 86a, 86b and 86c that contains mirrored data storage modules that provide remotely assignable diallable MSISDN-MIN numbers, non-diallable MSISDN-MIN number, local access directory numbers and Phantom electronic serial numbers.

For example in FIG. 10, all SRMs 50, 50a, 50b and 50c will never have permanently assigned non-diallable MSISDN-MIN numbers for the inventions local market STEP gateway system 51a, 51b, and 51c, and Global STEP system 209 utilises a novel global authentication protocol that constantly churns or dynamically reassigns diallable local market; local access directory numbers 240, diallable local access MSISDN-MIN numbers 241, non-diallable MSISDN-MIN numbers 211, and Phantom electronic serial numbers (P-ESN) 99a as shown in FIG. 10. Non-diallable MSISDN-MIN numbers 211, and Phantom ESN numbers 99a a will ever be used to initialise a conventional voice call or used to access an SRM using a dynamically assigned logical channel that may be accessed during a SVRO multislot-channel voice and data communications event. Referring to FIG. 4 and FIG. 5., the Authentication Database (ADB) 86a and 86b respectively constantly communicate with each other during a SVRO multislot channel communications event.

Figure 17:
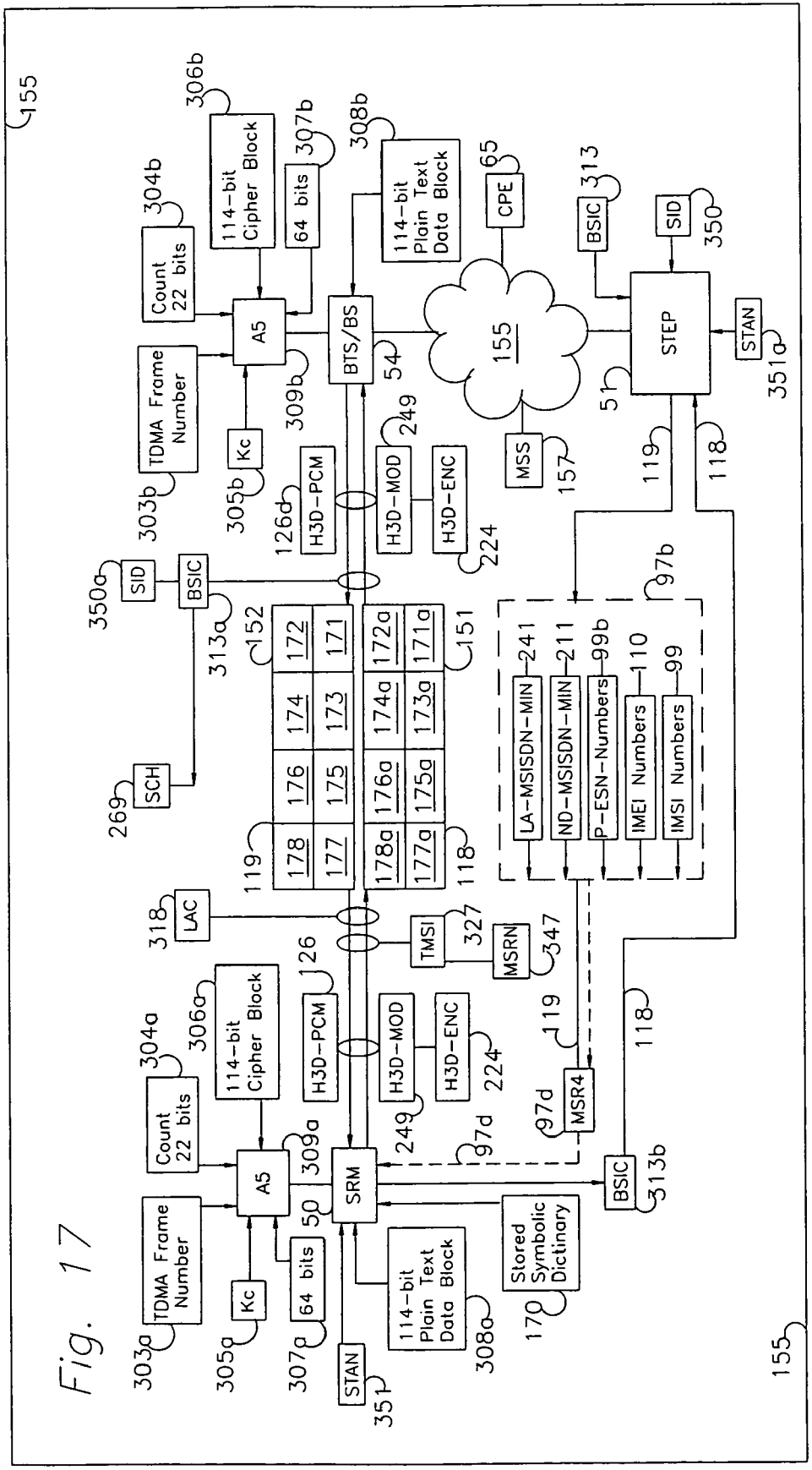
FIG. 17, depicts the logical block diagram of the inventions relation to host network encryption, according to the invention.

The SRM 50 USIM card 73 is a remotely programmable data base that can be updated with newly assigned diallable MSISDN-MIN numbers in logical association with the SRMs 50 specialised authentication database (ADB) 86a. All USIM cards used by the SRM 50 can be remotely programmable from the inventions STEP gateway system during a single or multi-channel communications event. The inventions authentication database (ADB) 86a interacts logically with the mirrored authentication database (ADB) 86b. The SRM 50 authentication database (ADB) 86a receives remotely programmable diallable Local Market MSISDN-MIN numbers 241, non diallable MSISDN-Min numbers 211, Phantom Electronic Serial Numbers, (ESN) 99a, 99b, IMEI numbers 110, IMSI numbers 99 and other authentication related data as shown in FIG. 5, FIG. 10 and FIG. 17. These numbers are sent from the associated STEP 51 authentication database (ADB) 86b via the wireless mobile cellular public land mobile network (PLMN) 155. as shown in FIG. 5. This unique protocol serves to provide complete flexibility in terms of SRM 50 identity for the purposes of providing constantly changing identification, along with flexible and low cost automatic roaming capabilities. Since an SRM 50 will only work over a host mobile wireless cellular network such as a GSM system that is connected and configured to operate solely with the STEP gate system 51, 51a, 51b and 51c there is simply no use for anyone trying to use the SVRO network unlawfully. These automatic update protocol actions transpire during every registration and service request that is transmitted from the SRM 50 to the currently serving STEP gate way system 51 via mobile wireless cellular PLMN 155.

Referring to FIG. 3, during the first channel connection algorithm the SRM selects a three multislot channels and transmits a Multislot Service Request (MSR) 97a in addition to the first channel that has been assigned and is now in use for a total of four multislot-channels as shown in FIG. 8. Referring to FIG. 4, and FIG. 5. The SRM 50 protocol stack 112 interacts logically via the specialised digital traffic channel (DTC) overhead monitoring module 237, the SRM authentication database (ADB) 86a and the resident SIM card 74 data base. During a conventional registration protocol and an originating voice call the SRM will utilise the originally assigned diallable MSISDN-MIN number that was programmed by the SRM 50 into the USIM card 73 by the local market mobile cellular carrier that first instantiated mobile service. This is necessary because this is the serving home system that originally authorised SVRO services. During this conventional call the SRM 50 will use the originally assigned ESN number that was assigned by the SRM manufacture and that was originally used during initial SVRO service set up. However the SRM 50 was originally designed with a volatile ESN number data register that is part of special authentication data base 86a that is dynamically accessible from the inventions STEP gateway 51 system via the network topology, and the assigned virtual SVRO channels that are designated by the mobile cellular carrier that manages the currently serving GSM PLMN 155.

A serving SS7 network and its associated ANSI-41 or GSM Mobile Application Part (GSM-MAP) protocols will allow non-diallable numbers to pass between the invention STEP 51 and its associate SVRO Home Location Register (SHLR) 66 that is a central component of the inventions STEP gateway systems. A non-diallable MSISDN-MIN number can also be a part of a subscriber profile of any conventional home location register (HLR) 60, visitor location register (VLR) 61, MSC 53 or gateway MSC 53a that is designated service switch point (SSP) as one of the key SS7 network elements. These essential network elements do not discriminate between non-diallable and diallable MSISDN-MIN number nomenclature.

There are also ways of blocking in bound callers based upon specific originating and terminating class of service (COS) configurations that can be set by the host mobile wireless cellular carrier and in tandem with the inventions STEP gateway system 51. For example any outside caller who mistakenly dials a non-diallable MSISN-MIN number will be automatically blocked. The caller will hear a fast busy tone increment in his CPE 65 earpiece which indicates the reception of an unacceptable dialed origination pattern. The invention also provides novel approaches to dramatically reducing roaming and long distance charges for each SRM 50 user. The invention creates a unique global call flow topology, the progressive protocol steps are as follows. Depicted in FIG. 10 is the SVRO Global virtual network topology divided into three geographic intersystem-operational areas, Melbourne Australia, Hong Kong and London. The call flow topology for a single channel or a multislot channel protocol service event essentially operates in the same manner. For example the inventions SRM 50a, 50b and 50c represented here show how one SRM can roam from Melbourne Australia 202a, to Hong 202b and to London 202c then back to Melbourne and continuously be deemed a home subscriber during multiple bi-directional communication data events. The auto roaming protocols, processes and procedures are as follows, the SRM user instantiates the power up sequence of his SRM 50a, and the SRM 50a detects serving GSM PLMN 155a System Identification Designation Number-Carrier Identification Code (SID-CIC) 86a, 86b and 86c SID-CIC number or equivalent is the metropolitan or rural subscriber area that is also known as Mobile Subscriber Area (MSA) number that uniquely identifies each PLMN operational area. The SID-CIC is typically broadcast from the currently serving GSM BTS 54a via an SCH channel that indicates to the SRM 50a which network it is attempting service access. Referring to FIG. 4, the SRM 50 which is physically and logically structured that same as the SRM 50a, there is contained within physical and logical structures of the SRM is a STEP access number database 202 that logically holds all known local market STEP access numbers 51 a such as the Melbourne STEP. These STEP numbers are logically associated with the GSM PLMN 155a that is currently serving the SRM 50a as shown in FIG. 10. These numbers are updated every time an SRM accesses any local MSA (LMS) STEP 51a, 51b, 51c. The Global STEP 209 maintains all access numbers such as Local Access Directory numbers 240, Local Access MSISDN numbers 241, Non diallable-MSISDN numbers 211, global STEP Access Numbers 351 and phantom Electronic Serial Numbers (ESN) 99a. When the SRM is instantiated and powered up with either a human machine interface or by application specific automatic machine language procedures, it automatically detects the SID-CIC number that is associated with the carrier for in most cases it is broadcast over all Absolute Frequency Channels (AFC) via logical channels such as BCCH, paging channels and the like.

The inventions SRMs detect these SID-CIC codes and algorithmically associate a stored STAN-DIR 351 number that enables access to a currently serving STEP Gateway system 51a, 51b, and 51c that is interconnected to an associated Local MSA STEP gateway system. Referring to FIG. 1 and FIG. 6. when the SRM user first registered with the Melbourne GSM PLMN he was momentarily deemed a roaming mobile however the invention provides a novel feature with respect to how maintain each SVRO subscriber as a home subscriber. In some cases a Melbourne SRM 50 originally purchased his SRM and the service in Melbourne. Therefore he is deemed a home subscriber both by the GSM PLM GPS, and the SVRO virtual network. Therefore the Melbourne SRM user can immediately connect to the Melbourne STEP Gateway system and access voice and multi-channel data services. However if the user has just returned from over seas the and operated SVRO services in other GSM PLMN GPA areas he will have register with the serving GSM PLMN as a roamer only momentarily.

The invention introduces bidirectional manipulated ring cycle (MRC) 230a and 230b data that can be transmitted bi-directionally between the SRM 50 and the inventions STEP gateway system 51 before a complete connection is established. The invention introduces SVRO Harmonic Pulse Data (SHPD) 229 that is created from specialised harmonic single and polyphonic frequency, amplitude and offset phase variables that do not interfere with normal telephony in-band and out-of-band switch functions and the like. However like caller I.D., it can be transmitted via in-band channel between the SRM 50 and STEP gateway system 51 during the silent periods of the a normal periodic or the inventions fast periodic ring cycle. The silent period has been used to transmit caller I.D. calling party directory, and or mobile identification numbers from a conventional mobile station (MS) to a customer premise (CPE) 65 telephone instrument. The invention modifies this means and method of 'on-hook' data transmission for the purpose of identifying the SRM 50 via its MSISDN-MIN number, its electronic serial number (ESN) IMEI number and the like. Also, during this MRC pre-connection period the invention transmits this data in the form of H3D-GA-VM modulation means and methods. This enables a high level of encryption. The inventions MRC data can be transmitted via manipulated Caller I.D. increments, manipulated offset ANI-Wink 228 tones, and all other in-band pre-connection harmonic pulse intervals that allow for in-channel bi-directional transmission of alpha numeric data that does not interfere with conventional PSTN 58, ISDN 64, ISUP 323 or data in-channel and out-of-band SS7 59, ANI-WINK-Multifrequency (MF) transmissions. The inventions enables the ability of sending alpha-numeric data and text information either in in-band T1 in the form of dual tone multifrequency (DTMF) or multifrequency (MF) signals, or out-of-band with ISDN PRI based services such as AT&T's INFO or Sprint's Real Time ANI or equivalent as part of the inventions MRC call set up pre-connection data.

Vital to the inventions means and methods of MRC data is the ability and utility of transmitting GSM, CDMA, TS-CDMA and iDEN MTR SIM card and Universal SIM (USIM) card 73 updates from the STEP Gateway system 51 that is an important component of each SRM 50 as shown in FIG. 4. Referring to FIG. 1, FIG. 4, and FIG. 6. During the pre-connection period MRC data 230a, 230b cycles the inventions STEP gateway system transmits an updated local 'home' subscriber MSISDN and MIN number and other pertinent control data to the remotely programmable SIM-USIM 73 card that is a component of the SRM 50. Immediately upon reception of this data the SRM 50 re-instantiates, and re-registers as a local SVRO User. This important feature enables a vast array of application specific functions, and features for the SRM user. The inventions pre-connection SHPD data enables such application specific functions as Machine to Machine (M2M) telemetry, telematics data, Electronic Mail, SRM control management, Authentication Codes, Message Waiting Indicators, Text data, SVRO Universal Messaging, SRM protocol control data, Push-to-talk On line Party indicators (PTT-OLI) 231 and the like. In FIG. 6, this novel SHPD 229 pre-connection bi-directional data can be SRM 50 originated via the SVRO Reverse Channel 118, and it can be STEP gateway 51 originated via the Symbols-Stream Forward Channel 119 during one SHPD pre-connection communication event. In fact the invention can apply SHPD pre-connection data over eight reverse and eight forward TCH/Traffic channels simultaneously. SHPD data is transparent to GSM, CDMA PLMN network elements such as MSCs, BSCs, IWF and the like.

Referring to FIG. 8, this logical block diagram depicts eight multislot logical channels 171, 172, 173, 174, 175, 176, 177 and 178 that comprise the logical structures that are defined as originating increments; multislot voice user channel assignments upon completion of initialisation of the inventions SRM 50 that is accomplished by assigning voice channel multislot-channels in an exponential cascading fashion. A core feature of this method is based upon the random availability of user multislot-channels, when the associated control release of a TCH channel via control channel 204 is instantiated, when a conventional caller concludes his call, and the BTS/BSC sets the TCH channel to idle status 215a mode. This occurs when this user TCH channel is released and begins bursting zeros via instantiation from selected control channels 204 that operate within the logical bounds of each user traffic channel. In some cases the entire digital traffic channel virtually can become a SVRO multislot channel 126 When an SRM 50 initialises from one and or up to eight origination increments in a progressive-multiplexed cascading function until all assigned virtual circuits are occupied and pointed to the associated STEP Gateway system 51 via the currently serving public land mobile network (PLMN) 155. The invention supplies broadband last mile connectivity and broad band width over existing second generation (2G) networks in this way.

In reference to FIG. 1, the serving PLMN that is interconnected to an associated MSC 53 and or gateway MSC 53 via PSTN; ISDN PRI circuits; frame relay circuits, and USUP 232 enabled circuits respectively that operates directly within the topology of a serving carriers inter-switch communications cloud. In some application specific cases a selected SRM 50 will always be deemed a roaming mobile subscriber, in other cases the same roaming SRM 50 will be deemed a home subscriber even when the same SRM 50 operates in a visited GSM PLMN Plan Area. This is particularly important with respect to mobile applications and the like and enables local caller rates, eliminates expensive long distance rates and the like. The importance of this approach also enables simple distribution of SRM modules 50 through the world without the need of performing any regional specific modifications when SRM modules are deployed throughout a specific public land mobile network plan area(PLMN) 155.

The invention enables operation over GSM and other comparable mobile cellular networks such as CDMA2000, UMTS-IMT-2000, GPRS, EGPRS, Voice over I. P. networks and the like. In fact the inventions virtual authentication means and methods virtually mimic GPRS, EGPRS, 3GPP multislot-channel user authentication methods. The invention applies simple yet effective virtual manipulation of GSM-MAP-Wireless Intelligent Network (WIN)-Phase One, Phase Two, Phase Three and the like. Where necessary the invention utilises elegant manipulations of CAMEL protocols as well. Third Generation (3G) systems such as UMTS and the like use CAMEL enables worldwide access to operator-specific intelligent network (IN) applications such as prepaid, call screening and supervision. CAMEL is the primary GSM phase 2 plus enhancement for the introduction of the UMTS virtual home environment (VHE) concept. The invention uses the CAMEL approach to enable seamless transition of GSM (2G) networks into the Third Generation (3G) operational and the WI-MAX-IEEE802.16 world without the huge cost associated with upgraded a GSM 2G network using conventional systems and associated network elements that comprise a typical infrastructure upgrade that uses hardware and software components of GPRS, EDGE, EGPRS, UMTS-Wideband CDMA, CDMA20001X and the like.

The invention simply matches or exceeds the over air interface and supportive network performance claims of all these 3G and WI-MAX IEEE802.16e 4G solutions. The concept behind VHE is platform that enables the flexible service definition that enables the dynamic collection of application specific service creation tools that enables the host mobile wireless cellular carrier to modify or enhance existing service and/or define new services in association with the new common control signaling system seven (CCS7) protocols, the CAMEL application part (CAP). The invention exploits these advantages be creating a highly flexible signaling and multi-slot-TCH channel call routing mechanism that uses digital voice channels to transmit, i.e., carry high speed lossless symbolic data that is based upon the inventions Holophasec 3D-GA Modulation (H3D-GA-MOD).

Referring to FIG. 17, the invention enables the simultaneous assignment of up eight reverse uplink 118 TCH speech channels 171, 172, 173, 174, 175, 176, 177, and 178 and up to eight forward downlink 119 TCH speech channels 171a, 172a, 173a, 174a, 175a, 176a, 177a and 178a, using one SIM card and or USIM with one bonifide home subscriber account and or one roaming subscriber account. In some cases the invention utilises TCH half rate channels, in these instances the invention can utlise 16 reverse uplink channels and 16 forward downlink channels. There is a high degree of bi-directional transmission activity that takes place between the SRM 50 and the currently serving BTS 54. In GSM the SRM 50 uses the BTS/BS Identity Code (BSIC) 313a to distinguish between another adjacent BTS and Base Station Subsystem (BSS) array and another neighboring GSM MSA PLMN BTS and BTS Base Station Substation array. This BSIC code also uniquely identifies the serving GSM PLMN 155 from another neighboring GSM PLMN that also broadcasts its own SID number. The invention uniquely utilises this BSIC and SID 350 code in order that the SRM 50 knows exactly which associated STAN DIR number 351 to dial upon completion of (a) GSM PLMN registration notification along with the disclosed (b) MRC pre connection registration and SIM-USIM card MSISDN-MIN update protocol, processes and procedures. All BSIC codes 313 and MSA SID numbers 350 are stored at the Global STEP and are relayed to all MSA STEP gateway systems 51 for constant updated additions and changes. Every time an SRM 50 registers with the currently serving STEP gateway system and (a) bi-directional MRC pre-connection data is performed and or (b) any other, in-channel communication is performed, all relevant STAN 351, 351a numbers are updated. All relevant SID numbers 350 and BSIC codes 313 are stored in a special data base that is embedded in each SRM 50 as shown in FIG. 4.

Referring to FIG. 17 conventional GSM communications over the voice channel are completely encrypted. In addition the invention introduces much higher levels of encryption and security because of the n-dimensional alphabet that can be generated and assigned to each individual SRM 50. Conventional GSM encryption involves the following steps. FIG. 17 shows the encryption method used in GSM along with others important features. Data is encrypted at the transmitter in blocks of 114 bits by taking 114-plain text data bursts 308b, 308a and performing an "exclusive Or" logical function operation with a 114-bit cipher block 306b. The decryption function at the SRM 50 is performed by taking the encrypted data block of 114 bits and performing the same "exclusive Or" operation using the same 114 bit cipher block 306a that was used at the transmitter. The cipher block used at both ends of the transmission path for a given transmission direction is produced at BTS-BS 54 and the SRM by an encryption algorithm called A5 309a, 309b. The A5 algorithm uses a 64-bit 307a, 307b cipher Kc 305a, 305b produced during the authentication process that takes place during a conventional call set-up, and the 22 bit 304a, 304b TDMA Frame number count 303b, 303a which takes decimal values from 0 through 4194304 and has a repetition of about five hours which is close to the interval of the GSM hyperframe. The A5 algorithm produces two cipher blocks during each TDMA period, one for the uplink path or reverse channel 118 and one for the forward channel or downlink path 119. The invention utilises a unique extension of this conventional encryption means and method by "piggy backing" on the A5 algorithmic with its own 64 characters electronic serial number, in that when one A5 cycle shifts the mathematical result and a new H3D-GA- VM character or complete language base can be updated and downloaded during the next the SVRO in-channel registration update. This method can be applied automatically and an all inclusive numeric shift key method, or performed separately as an independent algorithmic procedure. The invention H3D-GA-VM can also be updated every five hours automatically when the A5 method invokes its change. This can be algorithmically tied to the automatic assignment of new H3D-GA-VM algorithmic dictionaries as well.

Figure 11:
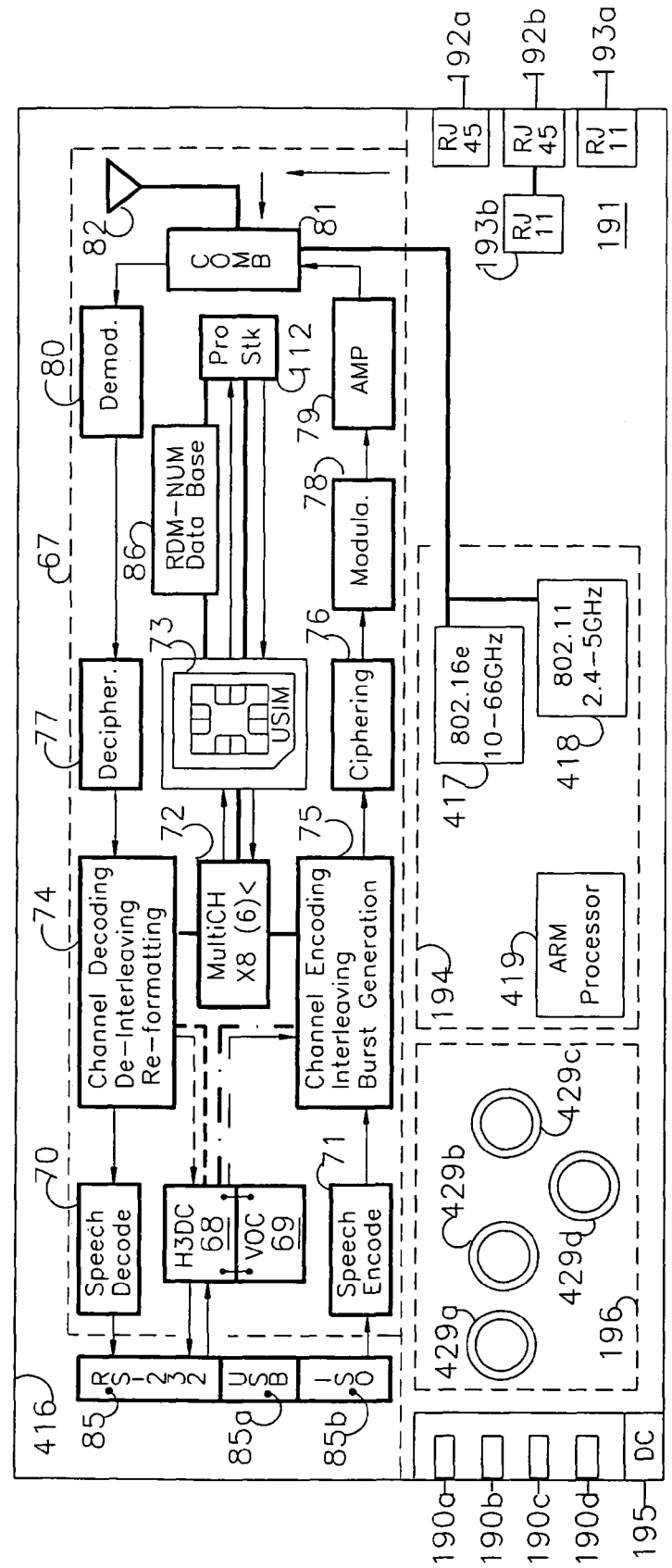
FIG. 11, depicts the logical block diagram of the SVRO Broadcom Modem, according to the invention.

The invention combines this conventional means and method and adds a revolutionary level of encryption where each SRM can have its own Holophasec 3D Genetic Algorithmic Virtual Modulation Language (H3D-GA-VM). In fact for this novelty is ideal for high security wireless communication applications such as financial transaction action communications, military communications, law enforcement communications and the like> The invention provides the means and method of changing the applied H3D-GA-VM language each time the SRM 50 and the STEP gateway system 51 performs an in-channel registration as shown in FIG. 1. Regardless of the type of network signaling and authentication means and method, the invention elegantly manipulates MSISDN-MIN authentication methods, 15 character International Mobile Equipment Identity (IMEI) numbers, 15 character International Mobile Subscriber Identity (IMSI) and the SRM 50 electronic serial numbers (ESN). This is algorithmically done in order to enable multislot channel usage over an eight time slot GSM digital traffic channel (DTC), A CDMA IS-95/2000 a TS-CDMA digital traffic channel and the like. Referring to FIG. 1, the invention provides the means and method of treating existing unmodified absolute frequency digital traffic channel (DTC) multislot-channels as virtually manipulated dedicated symbolic data circuits when the service class set up is functional for one to eight simultaneous voice calls from a single SVRO Radio Module (SRM) 50. This is accomplished from both a reverse uplink channel 118 times eight multislots 151, and a forward downlink channel 119 times eight multislots 152 and the like. The serving mobile wireless cellular network will "see" the SRM 50 as operating over an assigned digital traffic (DTC) in the same way as eight separate user mobile stations (MS). However the invention enables this virtual solution whereby the serving mobile wireless cellular carrier need only issue one SIM card 73 and or USIM as shown in FIG. 4, and FIG. 11 that depicts the SVRO SRM 50 and the multimode modem 416 respectively. Both FIG. 4, and FIG. 11 depict essentially the same device that can be produced in different configurations for a vast diversity of application specific purposes and functions. However the SVRO Modem has additional power requirements that can be interfaced with line voltage, therefore a power supply array 196 is embodied that contain multiple power capacitors 429a, 429b, 429c, and 429d and other related components. Like any modem the invention provides power indication lights 190a, channel synchronisation 190b, transmitters synchronisation 190c, and receiver synchronisation 190d. The modem also includes ingoing and outgoing landline cable interfaces such as input RJ 45 192a from computer, and a combined RJ-45 192b, RJ-11 193b input from computer, and an output RJ-11 to wall input interface 193a. There is also an ARM processor 419 that enables high resolution human machine interface (HMI) activities and the like.

In some application specific cases the inventions means and methods seamlessly transmit up to eight different MSISDN-MIN, ESN number, IMSI and IMEI numbers during one SVRO multislot communications event. The invention uses up to eight dedicated multiplexed digital air interface and T1 voice circuit switched channels in such a way that mimic GPRS and 3G host networks that use TCH traffic channels and fibre TCP/IP time slots. However the inventions applied virtual network methods operate more efficiently, and still deliver wireless SVRO broadband performance and operate more efficiently, with a far greater magnitude of security and reliability at a lower cost than any pure packet switched technology known in the art today. In still other application specific cases the invention enables the use of the same set of either diallable or non diallable MSISDN-MIN number along with one designated, ESN number, IMSI and IMEI number when from one to eight reverse and from one to eight downlink TCH speech channels that are assigned to one SRM 50 during a single SVRO broadband communications event over a mobile wireless cellular networks such as GSM. The SVRO virtual network is the best solution that serves wireless financial communication applications, law enforcement communications, military communications, educational purposes such, distance learning, banking through tribal symbols that use specialised personal digital assistants (PDA) instead of numbers and common written language and distance learning and the like as shown in FIG. 26.

The invention provides faster connect and disconnect time and transfer of data from point of origin to point of destination-termination that any network such as GPRS, EGPRS, CDMA2001X, 3G, UMTS-IMT-2000, 4G-OFDM and the like. Referring to FIG. 14, the invention uses pure packet switched topologies over public TCP/IP-VOIP network or virtual private network (VPN) 197 that are used solely for secure financial communications and the like. The ASP 55d, 55e in this case is an bank ATM switch 245 and a bank EFT/POS switch 246 respectively. The application specific points of presence operate within a secure financial communication network cloud 247 that can contain an ATM Switch ASP 55d and an EFT/POS Switch 246. The SRM 50d is physically and logically interfaced with one application specific device such as a EFT/POS terminal 244. In still another specification 244i what is disclosed pictorially is a topology that enables eight merchant EFT/POS terminals. 244a, 244b, 244c, 244d, 244e, 244f, 244g, and 244h that function independent of each other. However each terminal can communicate with the inventions STEP gateway system 51d through one SRM 50d simultaneously because the invention can utlise all eight channels of a GSM digital traffic channel or any multi channel physical layers (PHY) IEEE802.11, and IEEE802.16e. 420. SVRO H3D-GA-VM modulation methods can also be applied the in-virtual channel to a CDMA PLMN 155f and a Physical Layer and or virtual in-channel WI-MAX 802.16 PLMN. In addition the invention can interconnect one or multi-ATM KIOSK Array 248 which enable automatic teller functions that are well known who practice the art.

The inventions SVRO H3D-GA-VM modulations methods can provide the bandwidth over GSM and CDMA mobile cellular PLMN networks to deliver electronic newspapers 250, video file content 251, and music file content 252 and the like. In some configurations the invention provides a multimode SRM 50g that communicates simultaneously over GSM PLMN networks, 155e, CDMA networks 155f, IEEE802.16e WI-MAX networks, IEEE802.11 WI-FI IEEE802.11 networks and Bluetooth Industrial System Management (ISM) devices and mini personal pico and adhoc networks. In fact the inventions SRM can be configured to seamlessly roam between these disclosed networks without any manual adjustment are selection by a human operator. Throughout these networks the invention utilises dynamically applied H3D-VOIP 197 and or standard TCP/IP 62, and or standard H3D-PCM 126 and or a combination of any three of these data and voice sampling methods during one SVRO communications event over a single channel or multi-channels respectively, and regardless of the currently serving mobile PLMN network being utilised by the user all SVRO communication samples regardless of type are routed and managed by the inventions STEP gateway system 51*d* and 51*e* whether each sample is switched by and SW/SSP 87*e* and 87*e* respectively or a specialised packet switched server that is an integral component of each STEP gateway system.

Referring to FIG. 1, FIG. 3, FIG. 4 and FIG. 5. An SVRO multislot-channel communications event comprises novel in-band Multislot-Channel Service Request 97 digital voice channel assignment protocols, novel call routing protocols, and authentication methods that are physical and virtual functional protocols unique in the art. The SRM 50 is treated by the currently serving GSM PLMN as essentially another conventional subscriber. The SRM 50 is subject to the same identification procedure as any mobile station (MS). Like any other mobile station (MS) the SRM 50 performs an initial single channel registration, authentication procedure, and air interface channel and associated circuit assignment.

Figure 15:
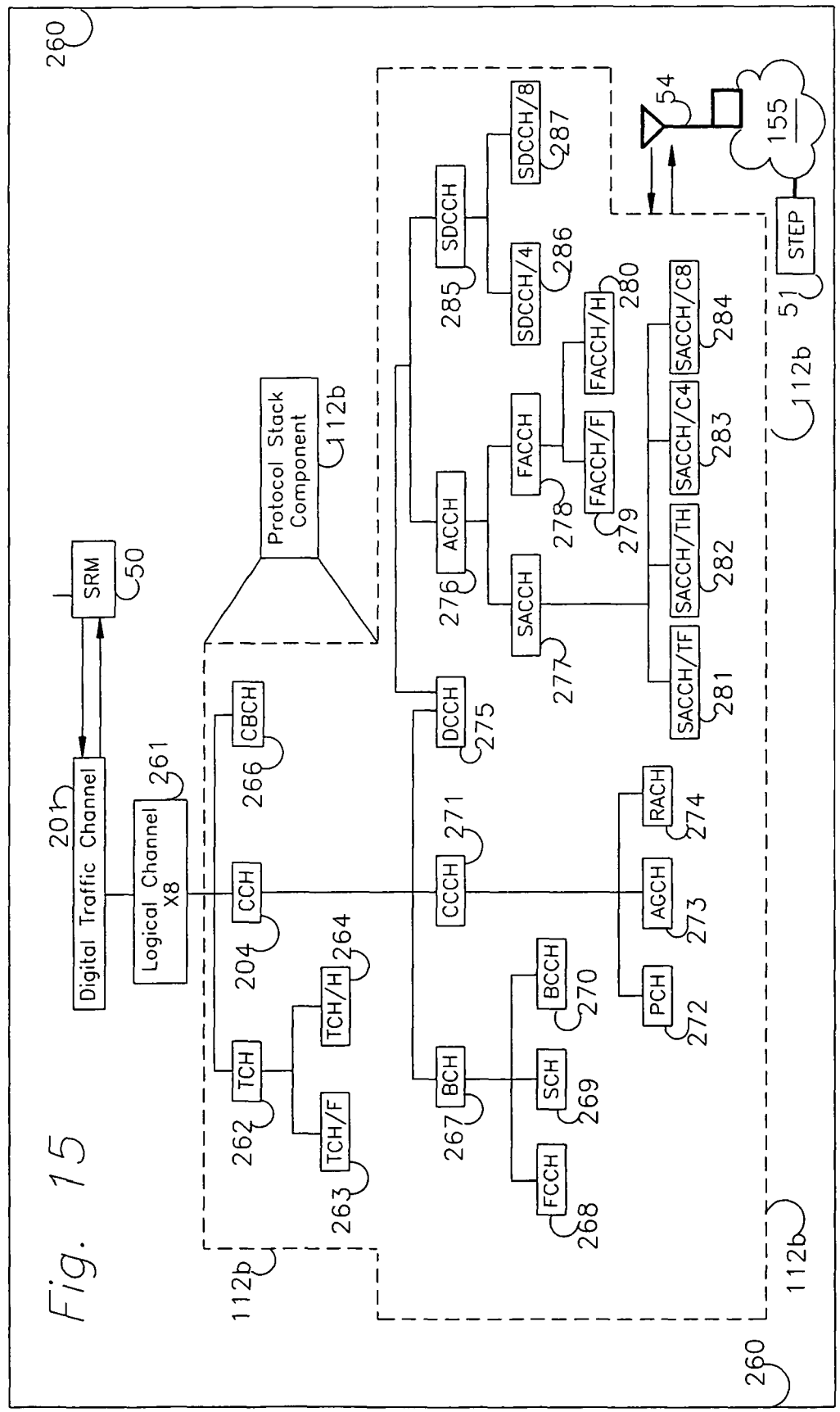
FIG. 15, depicts a host mobile GSM system control channel topology, according to the invention.

Referring to FIG. 15, depicted in this rendering is a digital traffic channel (DTC) logical tree topology 260 that logically contain all known GSM control channel arrays. The digital traffic channel (DTC) 201 is a physical frequency channel that contains up to eight time multislots 261 that carry two general types of communication, user traffic and control information. User traffic is carried by the logical traffic channel (TCH) 262, and control traffic is carried by a plurality of control channels that operate within the control layers of each time slot. Eight time slots comprise the invention multislot-channel communications over a single absolute frequency digital traffic channel (DTC) 201. The following logical user and control channel structures are described as follows. Referring to FIG. 1, a large amount of information is transmitted between the SRM 50 and currently serving base transceiver station (BTS) 54, a base site controller (BSC) 63 also known as a base site subsystem (BSS) that controls one or a plurality of base transceiver stations (BTS) 54 and the like. The logical channels that operate within the frequency state bounds of the digital traffic channel (DTC) 201 carry user information that is comprised of voice and data information and control signaling data. Depending on the type of information transmitted, different logical channels are used. These logical channels are mapped onto the physical digital traffic channel (DTC) 201 time slots as shown in FIG. 8, 171, 172, 173, 174, 175, 176, 177 and 178 respectively.

Referring to FIG. 15, For example digital speech is carried by all eight logical channels called the one of eight traffic channels (TCH) 262. In the GSM system no radio frequency (RF) carrier or time slot is assigned beforehand for the exclusive use of any particular task. As previously disclosed there are two basic logical channel types in the GSM physical channel: TCH 262 and control channels (CCH) 204 within the logical frames of a GSM physical digital traffic channel (DTC). Logical Traffic Channels (TCH) 262 are used to carry either digitally quantised speech or user data such as asynchronous 9.6. data, G3 Fax data, packet assembler/disassembler data, High Speed Circuit Data (HSCD) and other teleservice data the like. The invention introduces a third virtually applied alternative defined here as Holophasec 3D Modulation (H3D-GA-MOD) that provides of deploying equivalent 2.5G, 3G and 4G performance while enabling the rapid virtual deployment through regions in the world that have solid GSM 2G networks that are well penetrated throughout a given topography. The invention can virtually apply H3D-GA-Modulation to GSM, WI-FI-IEE802.11, and WI-MAX IEEE802.16e simultaneously.

The invention elegantly manipulates various aspects of these control channels in order to achieve seamless authentication, multislot channel TCH 262 and control channel CCH 204 assignments from one SRM within the operational constraints of one digital traffic channel (DTC) that becomes a SVRO carrier 126 that is part of the network topology of a mobile wireless public land mobile network (PLMN) such as a GSM mobile communications system. TCH 262 support two support two information rates full rate (TCH/F) 263 and half rate (TCH/H) 264. TCH/F 263 carries user speech at 13 Kbps, TCH/H carries user speech at 4.8 kbps and 2.4 kbps. There are three types of control channels Broadcast Control Channel (BCCH) 270 that is carried over the broadcast channels (BCH) 267, Common Control Channel (CCCH) 271 and dedicated control channel (DCCH) 275. The BCCH 270 channels are point-to-multipoint unidirectional channels. These channels are used for such functions as correcting assigned mobile DTC physical channel frequencies, frame synchronisation and over all control channel (CCH) 204 structure. These broadcast channels are downlink/forward only channels. Other channels that belong to BCCH 270 group forward control channel (FCCH) 268 and the synchronisation channel (SCH) 269. The FCCH 268 is the downlink point-to-multipoint channel. The FCCH channel 268 carries information for the frequency correction of the SRM 50 or any other conventional mobile subscriber station (MSS). This channel is required for the correct operation of the radio subsystem and allows the SRM 50 to accurately tune to a channel of the base transceiver station (BTS) 54.

The FCCH 268 sends all zeros in its burst generation to represent an unmodulated carrier within the channel structure of all eight multislot-channel as shown in FIG. 8, 171, 172, 173, 174, 175, 176, 177 and 178 respectively. When one or more of these depicted multislot-channels is idle the SRM 50 specialised protocol stack component as shown in FIG. 4, 112, FIG. 5 112*b*, and FIG. 15 respectively, detects the idle state of one to eight of the multislot-channels based on the propagation zeros by one or plurality of FCCH 268 transmissions, the SRM 50 sends a multislot-channel request (MCR) 97*a* to the associated STEP gate system 51 as shown in FIG. 3. upon completion of first channel assignment during post registration procedures. In this case the desired data payload coupled with the transmission rate that supports timely delivery of the information requires a total three channels that will support an aggregate data speed from 60 to 130 Kbps. This performance is crucial for providing low cost last mile broadband data services throughout the developing world. For example in this case the SRM 50 was assigned timeslot channel six 176 as shown in FIG. 8 that will either carry conventional voice or the inventions Holophasec 3D Modulation (H3D-GA-VM) scheme. If the user requests two more time slots and two other time slots are idle and broadcasting zeros via the FCCH 268 within the logical bursts of these channels, the SRM 50 which actively monitors busy/idle bit status via its specialised DTC-CH monitoring 237 algorithms as shown in FIG. 4, will "grab" that channel for the transmission of H3D-GA-VM from the SRM 50 the STEP gateway system 51. all relevant control channel traffic (CCH) 204 functions within each of the time slots 171, 172, 173, 174, 175, 176, 177 and 178 respectively that are associated with an assigned digital traffic channel (DTC) as shown in FIG. 8, and all control channel functions are monitored by the SRMs DTC monitoring means and methods.

Figure 16:
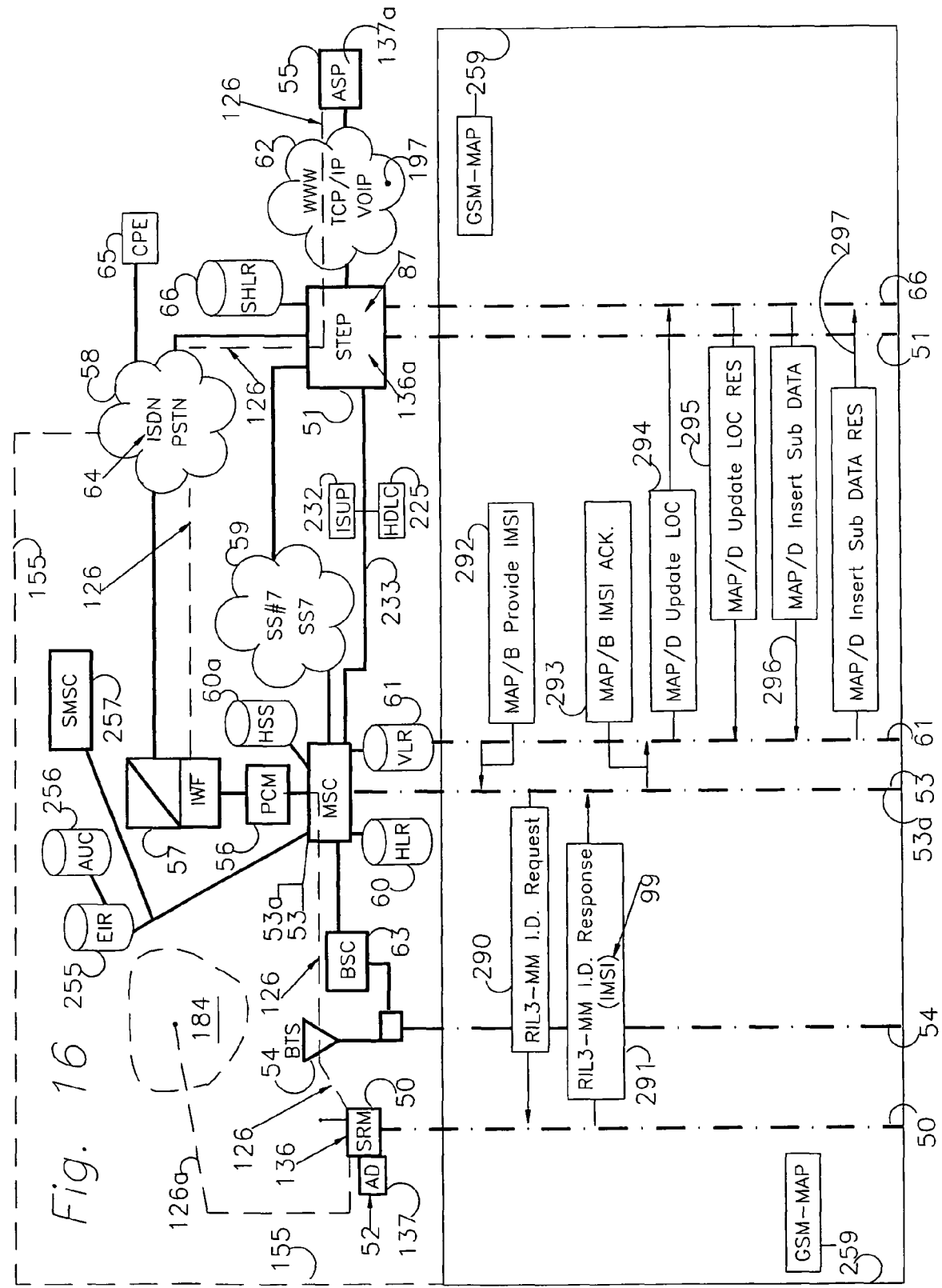
FIG. 16, depicts the logical block diagram of a modified GSM MAP authentication algorithmic procedures, according to the invention.

Referring to FIG. 15 The SRM 50 is as disclosed sometimes deemed a roaming mobile or a home SVRO subscriber simply because of the MSISDN-MIN combinations that are supplied by the any serving mobile wireless cellular carriers such as a GSM mobile network provider PLMN 155. Referring to FIG. 5, the SRM 50 in conjunction with the associated STEP gateway system 51 perform selected authentication procedures that cause automatic registration and assignment of the next two channels time slot three 173 and time slot seven 177 with the associated-currently serving mobile wireless cellular carriers Visitor Location Register (VLR) 61. That is the same VLR 61. The STEP gateway system 51 contains a specially modified SVRO Home Location Register (SHLR) 66 as shown in FIG. 3, FIG. 5. and FIG. 26. In FIG. 3, FIG. 4 and FIG. 5, upon reception of the Multislot Service Request (MSR) 97a from the inventions protocol stack 112 located in the SRM 50 and the STEP gateway system 51 protocol stack 112a sends specialised host mobile wireless cellular registration and authentication instructions to the SHLR 66 via the STEP gate systems VPN channel topological structures 203a, 203b, 203c, 203d, 203e, 203f, 203g, 203h, 203i, and 203j. The SHLR 66 sends appropriate GSM MAP protocol script communications as shown in FIG. 16. to the currently serving VLR 61. During the same time domain the STEP gateway system 51 sends Authentication Data Base (ADB) update message 97a from the STEP gateway system 51 specialised Authentication Data Base (ADB) 86b that contains currently available diallable-MSISDN-MIN numbers 96, non-diallable-MSISDN-MIN numbers 111b, Electronic Serial Numbers (ESN) 99, International Mobile Equipment Identity (IMEI) numbers 110 and International Mobile Subscriber Identity (IMSI) numbers 313 that are used to enable proper and acceptable authentication updates with the currently serving VLR 61 and the like. Referring to FIG. 3, the ADB update message is sent to the SRM 50 from the associated STEP gateway system 51 before any attempt to assign additional multislot-channels that is initiated by the SRM 50 and STEP gate system 51 protocol stack 112b and 112a as shown in FIG. 5 and FIG. 4 respectively.

Referring to FIG. 15, FIG. 17, the Synchronisation Channel (SCH) 269 carries information for frame synchronisation of the SRM 50 and identification code of the currently serving BTS 54. The SCH 269 has a 64-bit binary sequence that is previously known to the SRM 50 that is assigned during the initial registration and origination procedures. The SRM 50 achieves the exact timing-synchronisation with respect to the a GSM frame that contains the time slots, by correlating the bits with internally stored 64 bits. The SCH 269 carries the serving BTS 54 code Base Site BTS Identification Code (BSIC) 313, 313a, 313b and reduced frame number (RFN) in accord with the conventional GSM specification to the SRM 50. The common control channels (CCCH) 271 are point-to-multipoint bi-directional channels. They are primarily used to carry signaling information necessary for accessing SRM 50 management functions. These channels are used to establish connections between the SRM 50 and (BTS) 54 before a Dedicated Control Channel (DCCH) 275 is to the SRM 50. There are two downlink channels that propagate from the BTS 54 to the SRM 50, and one uplink DCCH channel 275 that propagates from the SRM 50 to the serving BTS 54. The downlink channels are the Paging Channel (PCH) 272 and Access Grant Channel (AGCH) 273. The PCH channel 272 is used to page the SRM 50. The AGCH 273 is used to assign the SRM 50 to a specific DCCH 275. The Random Access Channel (RACH) 274 is an uplink channel that propagates from the SRM 50 to the currently serving BTS 54 and used to request assignment of a DCCH 275. DCCH channels are used for signaling and control after origination/call establishment. There are two types of DCCH channels 275, Stand-alone Dedicated Control Channel (SDCCH) 285 and Associated Control Channel (ACCH) 276. The SDCCH 285 is a DCCH 275 whose allocation is not linked to the initial allocation of a multislot—TCH 262. The SDCCH 285 is used for authentication of each SRM 50 potentially used Multislot-channels 171, 172, 173, 174, 175, 176, 177 and 178 respectively also known as TCH channels as shown in FIG. 8. The SDCCH 285 is also used to provide location updates, and for assignment to TCH channels. The Associated Control Channels (ACCH) 276 are also of two types, Slow Associated Control Channel (SACCH) 277 and Fast Associated Control Channels (FACCH) 278. The SACCH 277 is always associated with the TCH 262 or SDCCH 285. The SACCH 277 is used to carry general control information. The FACCH 278 is similar to a blank-and-burst channel is that user information is precluded while data is being sent, The FACCH 278 is primarily used to transmit handover orders.

Referring to FIG. 15, shows all logical channels that are used in the GSM DTC 201. The only other control channel variations have to do with full rate and half rate transmission rates. Additional control channel operational modalities such as SDCCH/4 286, SDCCH/8 287, FACCH/F 279, FACCH/H 280, SACCH/TF 281, SACCH/TH 282, SACCH/C4 283, SACCH/C8 284 and the like are used to transport the inventions novel virtual authentication and control protocols, processes, and procedures as any other control channel and TCH frame combinations. These control channel attributes relate to how the GSM DTC 201 can operate in other full rate convolutional code or half rate convolutional code. The user data and control data formats remain essentially the same regardless of whether the GSM carrier invokes full rate or half rate operational modalities. Subject matter such as allowed logical combinations and the like are well known to those who practice and do not need to be disclosed for purposes here.

Figure 13:
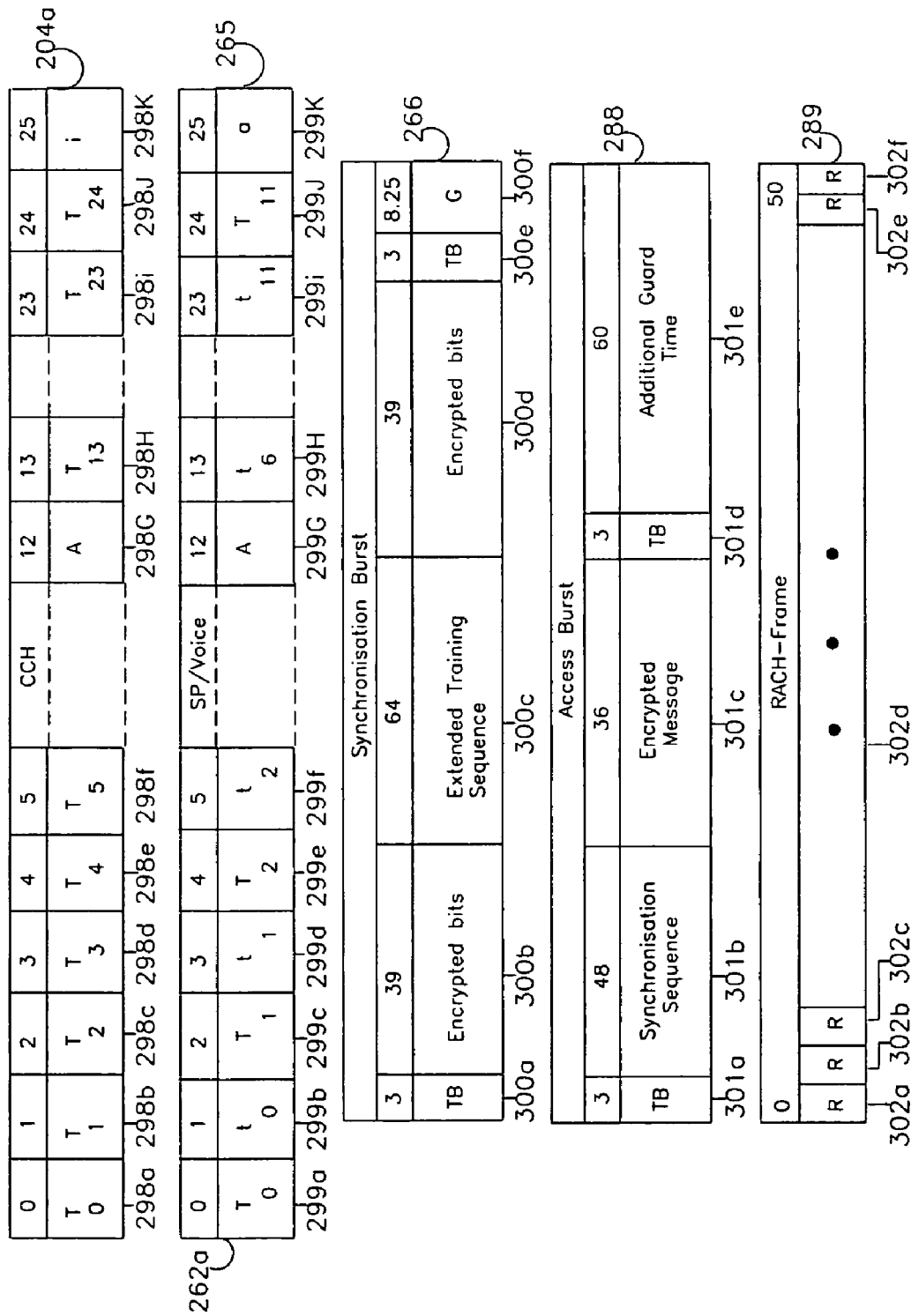
FIG. 13, depicts the SVRO virtual network utilising a plurality of satellite networks, according to the invention.

However logical channel combinations that are virtually adapted which involve, multislot-channel assignments, and relevant authentication protocols are used. In FIG. 15, the available forward/downlink channel frequency, e.g., BTS 54 to SRM 50 and reverse/uplink channel SRM 50 to BTS 54 are divided into 200-kHz referred to as Absolute Radio Frequency Channel Number (ARFCN) i.e., physical frequency DTC 201 channels. As disclosed each of the eight potential user channels utilise the same defined DTC and occupies a unique time slot-that possess a time domain of 0.57692 ms. Referring to FIG. 13, the GSM network system uses five different types of bursts: normal burst, synchronisation burst, frequency correction burst, access burst and dummy burst. A normal burst is used to carry symbolic data information on logical traffic channels (TCH) 262a and control channels (CCH) 204a, except for RACH 274, SCH 269, and FCCH 267. The BCH 267 and CCH 275 forward control channels are implemented only on certain Absolute Radio Frequency Channel Number (ARFCN) channels and are allocated time slots in a specific manner, each user occupies a unique time-slot or time domain per GSM frame. Like any conventional mobile subscriber station (MSS) the inventions SRM 50 can monitor adjacent DTC channels and other adjacent BTS stations as well BCH channels 267 and CCH channels 275 that may contain logical information necessary for the seamless operation of SVRO services. These time-slots are also known as Multislot-channels 171, 172, 173, 174, 175, 176, 177 and 178 respectively. Each user multislot-channel is also known as a TCH channel 262 and/or CCH 204 as shown in FIG. 8. Each time slot consists of 156.25 bits our of which 8.25 bits are used for guard time and 6 are the start and stop bits that are used to prevent overlap with adjacent time slots. This guard time allows the SRM protocol stack to grab/connect to an idle TCH voice channel after the invention utilise synchronisation burst, frequency correction channel burst, the access burst and GSM-MAP authentication by the STEP gateway system 51 SVRO Home Location Register (SHLR) as shown in FIG. 16. Referring to FIG. 13, and FIG. 17, the synchronisation burst 266 is used for time synchronisation of the SRM 50. This burst contains long synchronisation sequence of 64 bits 300c.

The encrypted 78 bits 300b-300d are used to carry information of the GSM TDMA frame number 303a, 303b along with the BTS identification code (BSIC)-(SID). The GSM TDMA frame 303b is broadcast over an SCH 269 as shown in FIG. 15, in order to protect user information against eavesdropping. This is accomplished by ciphering the information before transmitting it. Referring to FIG. 13, and FIG. 17, the algorithm uses a GSM TDMA frame number 303a, 303b as an input parameter for calculating the ciphering key. By knowing the GSM TDMA frame number 303a, 303b, the SRM 50 will know what kind of logical channel is being transmitted on the CCH 204-204a time slot zero 298a which is the same as time-slot one 171, 171a of a forward-downlink TCH channel, and a reverse-uplink TCH channel respectively. The frequency correction channel burst is used for frequency synchronisation of the SRM 50. The fixed input bits are all zeros, causing the modulator to deliver unmodulated carrier with an offset of 1625/24 kHz above the nominal frequency.

In FIG. 15 and FIG. 16 this important aspect is used by the invention to synchronise all multiplexed-multislot-channels with the physical and time position of the SRM 50 as it operates within a single physical digital traffic channel (DTC) 201 and its logically contained TCH 262 and CCH 204 channel burst. The invention does not require the BTS 54 to compensate for the normal physical distance of up to eight different mobile stations (MS) that are communicating from different physical-topographical locations that may inflict different multipathing, fading and other anomalies on the radio signal. When this occurs the BTS 54 must perform much timing correction work to keep in some cases up to eight separate mobile stations that are operating from different topographical-vector positions relative to geographic position of a BTS 54, and each 60° degree and or 120° degree sector antenna array. When the SRM 50 uses all eight time-slot-channels the BTS 54 does not have to compensate for timing of multiple mobile stations for it is only necessary to perform small compensations between each time-slot as the SRM 50 accesses and uses more than one TCH-Time-Slot at a time. The invention enables better multi-time-slot interleaving performance and virtual channel management because of the simplicity of the protocol stack. The invention uses concatenated small-bursty packets and does not overly tax the GSM Network. Referring to FIG. 13, the access burst 288 is used for random access and has a longer guard period to protect for burst transmission from a conventional mobile station that does not know the timing advance when it first accesses the system. This typically allows for a distance of 35 kilometers from the serving BTS 54 as long as each mobile stays within the focal range of the serving BTS 54 sector/antenna array.

When the SRM 50 accesses multislot-speech/voice TCH 262 channels, they are assigned and connected to the associated STEP gateway system 51, there will be no differentiation of multislot timing because the SRM 50 is always in the same relative physical position with the BTS 54 when it is accessing a plurality of TCH time-slots. Referring to FIG. 15, the SRM 50 and the STEP gateway system 51 perform selected in-channel authentication and GSM MAP out-of-band multichannel authentication before the SRM 50 perform novel virtual speech/voice service access via the control channel (CCH) 204 that are accessible within each TCH logical channel structure. The STEP gateway system 51 simultaneously performs virtual GSM MAP multislot-channel registration and authentication data base (ADB) updates 97a before each additional multislot-speech/voice channel is assigned to the currently operating SRM 50 while using the first TCH speech/voice channel that is assigned and connected to the inventions STEP gateway system 51 as transport means for these essential virtual instructions. The connection is made to the STEP gateway system 51—Switch/SSP 87 via ISUP interswitch connection methods 203a that utilise High Level Data Link (HDLC) 225 protocols. HDLC protocols bi-directionally establish links communicates between the inventions STEP gateway system 51 and the currently serving MSC 53 and/or gateway MSC 53a as shown in FIG. 5 and FIG. 16 respectively.

Referring to FIG. 14, FIG. 15, and FIG. 17 one of the great advantages of using GSM digital speech/voice channels for lossless application specific symbolic data is that it is heavily encrypted. The invention is first to use heavily encrypted GSM TDMA speech channels to transmit and secure financial communications in this way. No one in the art has ever used unmodified GSM TDMA-TCH speech channels for anything other than voice. This aspect is incredibly important with respect to security ramifications in relation to financial communications that support mobile wireless cellular transport of automatic teller machine (ATM) 248 transactions, and merchant terminal electronic financial transaction-point of sales (EFT/POS) 244, 244i transaction over the TCH speech channels while using H3D-GA-VM 249 and H3D-Encryption 224. Digital speech/voice channel data is encrypted by conventional means at the transmitter in blocks of 114 bits by taking 114-bit plain text data block 308a, 308b and performing an "exclusive OR" logical function operation with a 114-bit cipher block 306a, 306b.

The decrypting function at the receiver is performed by taking the encrypted data block of 114 bits 300b, 300d as shown FIG. 13 and performing the same "exclusive OR" operation using the same 114-bit cipher block 306b that was used at the transmitter as shown in FIG. 17. The cipher block 306a, 306b used at both ends of the transmission path for a given transmission direction is produced at the BTS 54d, 54d, 54 and SRM 50d, 50e and 50 respectively, by the encryption algorithm called A5 309a, 309b. The A5 algorithm uses a 64-bit cipher Kc 305a, 305b produced during the authentication process during call set up, and the 22-bit GSM TDMA frame number-COUNT which takes on decimal values from 0 through 4194304 and has a repetition time of about five hours which is close to the interval of the GSM hyperframe. The A5 309a, 309b algorithm produces two cipher blocks during each GSM TDMA period, one for the reverse-uplink channel 118 and one for forward-downlink channel 119. The invention combines this built in security method with conventional financial communication encryption, and then wraps it all around with H3D-GA-Encryption 224 that applies security that compares with quantum encryption levels while using H3D-Modulation 249.

Referring to FIG. 17, the unique synthesis of conventional encryption methods and the inventions novel H3D-Encryption 224 and H3D-GA-VM Modulation 249 methods provide the hardest encryption in the world. The GSM TDMA TCH channel 64 bit cipher key 307a 307b, and 114 bit cipher block 306a, 306b is derived from the TDMA frame number 303a, 303*b*. These numbers are mathematically interpolated with the numerical values of each diallable Local Access MSISDN-MIN, numbers 241, non-diallable MSISDN-MIN numbers 211, IMEI numbers 110, ISMI numbers 99, and electronic serial numbers (ESN) 99*a* that are dynamically assigned to each SRM 50. The SRM 50 is never assigned permanent forms of these crucial identification numbers by the STEP gateway system 51. This unique synthesis provides another level of security control that is enabled by the combined means and methods of the invention. The invention uses multiple digital speech/voice TCH channels 262 during one application specific data communications event. The invention transmits and multiplexes different parts of a complete financial communication method across different channels simultaneously in order to provide the best level of efficiency possible. The invention never repeats the same pattern the same way two times in a row. An eavesdropper could never predict which TCH channel 262 transports a particular part of the message and how, and in what order of assembly-disassembly during the origination and termination process.

Figure 19:
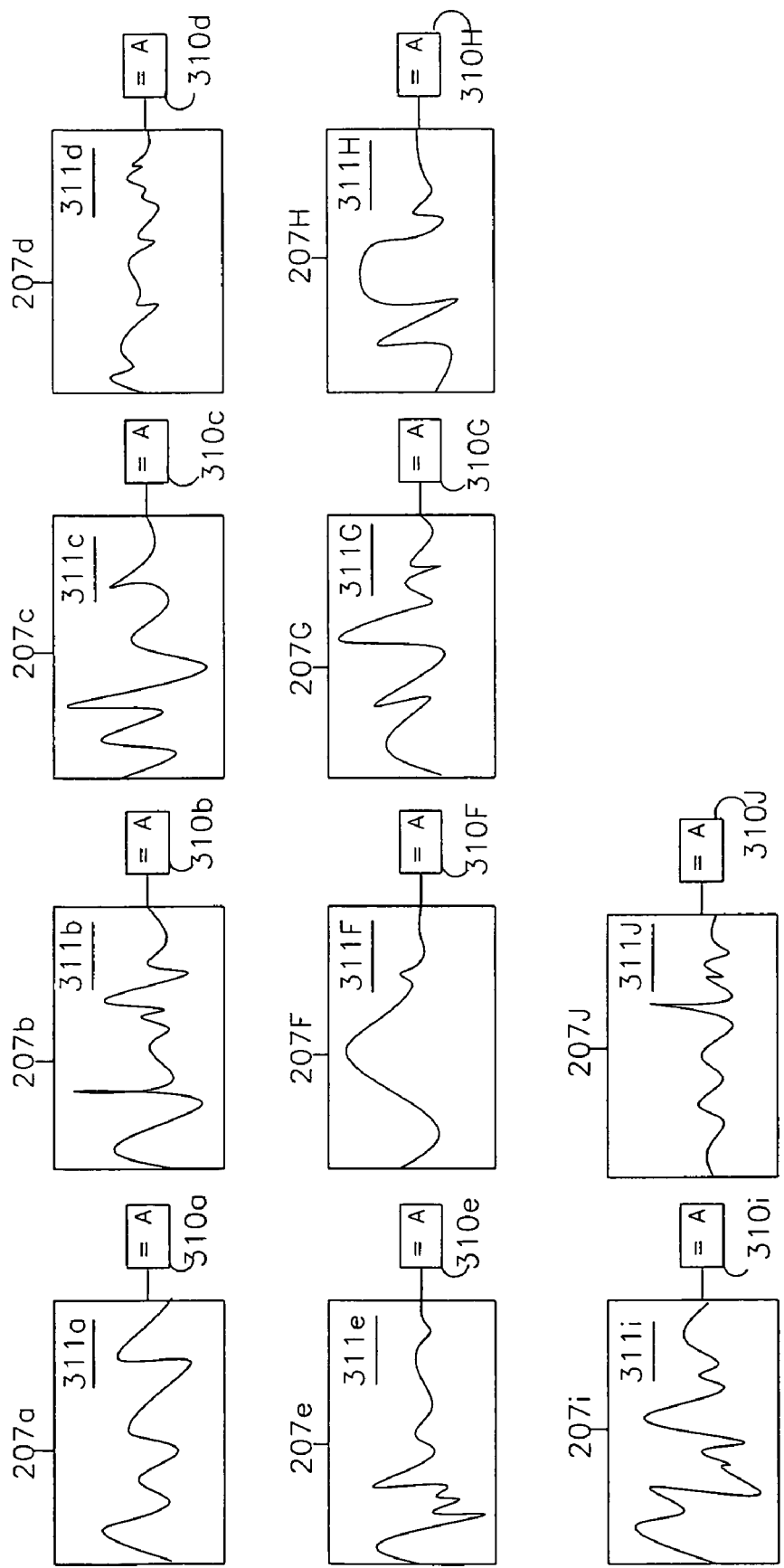
FIG. 19, depicts the H3D-Modulation sample state dictionary method, according to the invention.

Referring to FIG. 2, FIG. 17 and FIG. 19. These three renderings encompass the totality of the inventions encryption means, in addition the invention also utilises various technical trade secret-algorithmic procedures that are hidden within the means and method of the invention. However, FIG. 19 reveals the "product" of these hidden means. Depicted in FIG. 19, are ten different H3D-Stored Symbolic Dictionary samples 311*a*, 311*b*, 311*c*, 311*d*, 311*e*, 311F, 311G, 311H, 311*i* and 311J. Each sample represents the English letter "A" 310*a*, 310*b*, 310*c*, 310*d*, 310*e*, 310F, 310G, 311H, 311*i* and 311J each sample has symbolic weight of from three to six bits for each attributed symbolic character. In fact all contextual characters can equal three bits because of the inventions symbolic language means and methods. This method dramatically increases in channel symbol rate without the need of conventional data compression. In FIG. 2, sample 311*a* represents one of infinite symbolic-sample variations that can represent a three bit letter "A" or any other contextual character that exists in any human or machine language, including any of the Asian Languages, European Languages and the like. The invention can generate any contextual characters that equate to the 256 character full ASCII dictionary and converted to other languages. Also all known numeric symbols 0-9 and or any other mathematical symbolic language can be represented. All selected communication channels have performance limitations that are based upon frequency, phase and amplitude state bound limits. The invention manipulates pulse code modulation (PCM) contextual and control information samples in terms of mapping existing speech samples, and in-channel control/signaling created lossless symbolic data for a full range of application specific purposes.

The invention can manipulate linear phase, frequency and amplitude levels and interrelationships of these parameters that produce an infinite variety of symbolic states. In FIG. 19 there are only 10 examples of H3D-Modulation 249 samples depicted. These 10 examples can be applied for the purpose of optimising channel space under various conditions. Referring to FIG. 19, and FIG. 2, these ten examples can also be applied towards optimising the instant SVRO PCM communications channel condition 207. Channel operational states can be defined in terms of performance and how well selected samples states are used to optimise communication quality. On a scale from a one to ten condition this bracketed framework relates to various operational condition or state bounds. Condition state bound one 207*a* equates to the poorest quality where a channel can still propagate symbolic data, yet it is near the level of instability when the currently serving BTS is about to cause a hand over to another adjacent channel that will serve the instant call better. Condition state bound ten 207*j* is the optimum channel condition. Sample 311 J that currently represents the letter "A" 310J might be used for transmission of this contextual symbol when the channel is functioning under channel condition state bound ten 207*j*, Each channel condition state bound one 207*a*, two 207*b*, three 207*c*, four 207*d*, five 207*e*, six 207*f*, seven 207*g*, eight 207*h*, nine 207*i* and ten 207*j* utlise the best H3D-Dictionary 170 Symbol to represent the letter "A" in terms of the instant channel condition detected by the inventions unique DTC Channel Monitoring 237 method that is an integral function of the protocol stack 112 as shown in FIG. 4. This is but one of the innovations provided by the inventions means and methods.

Figure 18:
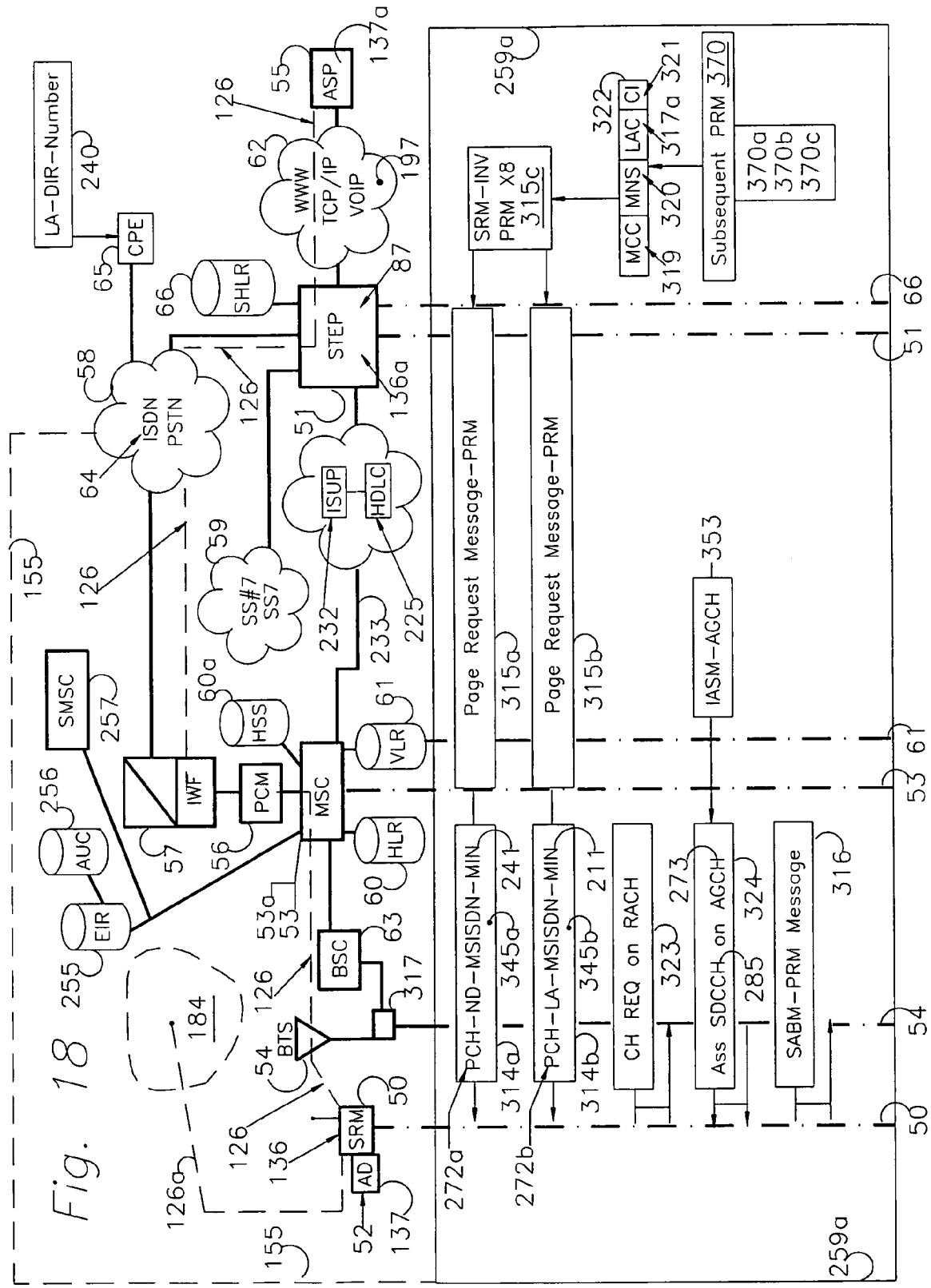
FIG. 18, depicts a host GSM mobile cellular network paging function, according to the invention.

Referring to FIG. 16, FIG. 17 and FIG. 18, SRM 50 Multislot-channel-TCH assignment, along with SRM 50 multislot-channel authentication is described here in accord with the SVRO topological call flow through a currently serving mobile wireless cellular PLMN 155 such as a GSM PLMN. The inventions call flow occurs in two main ways. (A) the inventions SRM 50 can originate primary voice calls and data calls that are always routed i.e., terminated at the associated STEP 51 via the currently serving mobile wireless cellular PLMN 155 circuit switched topology just like any conventional mobile subscriber station (MSS), and (B) the STEP 51 also can originate SRM terminated, primary voice calls and multislot-channel data calls to the SRM 50 via the mobile wireless cellular PLMN 155 circuit switched topology that is coupled with the novel use of the conventional PCH channel paging function. Together both call flow modalities encompass a complete SVRO voice and/or data communications event. The invention also uses standard call release algorithms that are well known to the art. Therefore selected standard call release protocols do not need to be disclosed for purposes here.

All SVRO voice and data GSM, WF-FI IEEE802.11, and WI-MAX IEEE802.16e, traffic is always routed through the associated STEP gateway system 51. There are no exceptions to this important rule. This rule is maintained in order to enable the delivery of the highest security modalities, the most cost effective and profitable commercial modalities and technological efficiency to carrier operators and users. For example even if a caller is using a conventional customer premise equipment (CPE) 65 instrument such as a conventional telephone or a conventional mobile subscriber station (MSS) 157 the caller uses a diallable 10 digit local access directory number (LA-DIR-Number) 240. When this number is dialed the call is routed by conventional means and method through associated PSTN networks elements to the inventions STEP gateway system 51 using switch translation methods that enable a conventional voice connection to an SRM 50 user.

Referring to FIG. 16, FIG. 17 and FIG. 18, a STEP gateway system 51 originated/SRM 50 terminated voice call and/or data call to one or a plurality of multislot TCH speech/voice channels 171/171*a*, 172/172*a*, 173/173*a*, 174/174*a*, 175/175*a*, 176/176*a*, 177/177*a* and 178/178*a* is deemed the first aspect of a complete SVRO voice and or data communications event. The invention uses complete innovation in terms of how the STEP gateway system 51 manages multiple time-slot H3D-GA-VM Modulated data calls over unmodified digital PCM speech time-slot channels. As disclosed in most cases the SRM 50 will always be initially deemed a roaming mobile subscriber by the currently serving mobile wireless cellular PLMN 155. In fact nearly all non diallable MSISD- MIN numbers 211 will be defined by the currently serving mobile wireless cellular network as a roaming subscriber number in some cases and still other cases a home subscriber as long as the MSISDN-MIN number format is associated with the SHLR 66. One of the preferred embodiments the invention provides is a novel utilisation of the paging function of the mobile wireless cellular-PLMN, when a STEP gateway origination voice or data call to an SRM 50 is invoked. The paging function can be used independently from initiating and setting up a voice and/or data call through conventional PSTN 58 and/or USUP 232-HDLC 225 using an T1/E1 line. The invention uses a specialised method by applying novel manipulated forward PCH-paging message 314b, 314a to the invocation of a SRM 50 originated multislot-channel intialisation-origination and quick-connection from the STEP gateway system 51 to a currently designated SRM 50. Referring to FIG. 5, there is provided a specialised Page Request Message Server (PRM) 94. There are two main functions of the PRM server 94. (A) The PRM server 94 receives SRM Invoked Page Request Message (SRM-INV-PRM) 95a. (B) The PRM server 94 initialise SRM Page Request Message (PRM) Invocations 315c in association with the inventions SHLR 66.

Referring to FIG. 5. FIG. 8 and FIG. 18, this specialised (SRM-INV-PRM) function 315c is used to ultimately trigger a PCH-page message 314a, 314b, using specially managed GSM MAP SS7 protocols 259a in association with the SRM 50, the PRM server 94 and the SHLR 66. The SRM-INV-PRM is a transparent function that causes the serving GSM PLMN 155 to connect a total of eight Multislot-TCH channels with associated E1/T1 trunks 233 between the SRM 50 and the STEP gateway system 51 SW/SSP 87. In terms of the serving GSM PLMN network 155 the seven additional TCH voice calls that are set up using one SRM 50 "look" like seven separate voice calls that are mobile terminated and PSTN originated. Since each additional assigned TCH speech timeslot is associated with a paying bonifide user account, it makes no difference to the serving GSM PLMN 155 that the seven additional accounts are "phantom accounts" as long as the metered speech usage in each assigned TCH channel is authorised and paid for as authorised by the inventions SHLR 66 because the SVRO mobile network operates within the topological topography of any GSM PLMN GPA.

Figure 21:
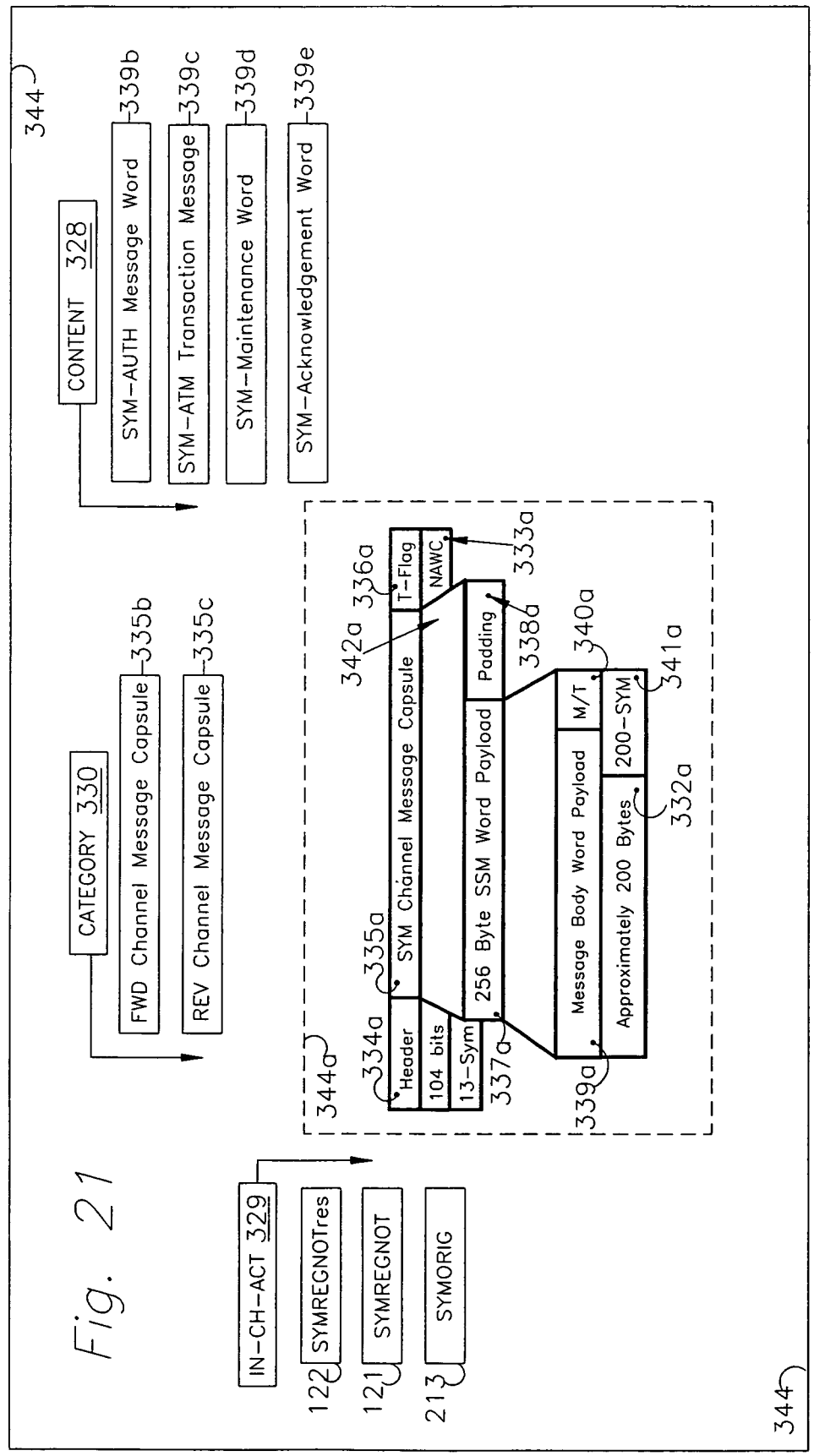
FIG. 21, Depicts the SVRO message capsule formats and usages, according to the invention.

Upon received instructions sent from the SRM 50, after the first assigned or primary channel is assigned and connected, the PRM server 94 instructs the inventions SVRO Home Location Register (SHLR) 66 in association with the SW/SSP 87 to send PRM message 315a, 315b to the currently serving MSC 53 and/or MSC gateway 53a. Once received the MSC 53, 53a in association with SHLR 66 sends a PCH page message 314a, 314b to the SRM 50 for every additional Multislot-channel that was requested from the original in-channel SVRO Registration (REGSYM) 121 as shown in FIG. 3. Contained in this SVRO Authentication Message Word 339b as shown in FIG. 21 is the Multichannel Service Request (MSR) 97a. This particular request three more multichannel time-slots for a total of four. This request is defined as MSR4 97c. This request is sent over the first assigned TCH speech channel time-slot called the primary channel 343 upon completion of the SRM 50 first channel connection to the STEP gateway system 51.

Referring to FIG. 5. FIG. 8 and FIG. 18, the first STEP gateway systems 51 SW/SSP 87 originates to the SRM 50 a circuit connection is when the SRM 50 receives one or a plurality of these local access diallable MSISDN-MIN numbers 211, and or a non-diallable MSIDN-MIN number 241 that are contained within the body content of the PCH-page message. When the SRM 50 receives a PCH-page message from the currently serving PCH channel 272a, 272b selected application specific functions occur. When the SRM 50 is switched on it registers with the serving GSM PLMN networks and then goes to idle status. The SRM 50 periodically scans a list of available PCH 272 channels which is a logical channel that is broadcast via a plurality of Digital traffic Channels (DTC), and locks onto the channel with the strongest signal that is being transmitted from one of the cell sectors that is located at the serving BTS 54. In order to deliver an incoming voice or specialised data call to an SRM 50, a page message 314a, 314b is broadcast on the PCH 272 from the BTS 54 that is currently associated with the SRM 50. The SRM 50 constantly monitors the PCH 272 channels that are associated with the currently serving BTS 54. If the SRM 50 detects its identification code, usually the MSISDN-MIN and other information that is contained the received page message 314a, 314b on the PCH 272a, 272b it responds with a page response message (PRM) 316. The difficulty in delivering a call to an SRM 50 or to any mobile user is knowing which BTS 54 and which sector of that BTS 54 should be paged.

Referring to FIG. 16, FIG. 17 and FIG. 19, one method that is used much less today in the mobile cellular world is to have all BTS that are associated GSM PLMN Area (GPA) transmit pages in order to have the designated SRM 50 respond. This relatively antiquated method was used widely in American Mobile Phone System (AMPS), Total Access Cellular System (TACS) and Nordic Mobile Telephone (NMT) mobile cellular analogue systems. However this global paging method requires the use of to much of the host network resources, and adversely effect the over all performance of the system. In order to maintain efficient paging performance within a safe range, it is necessary to form clusters of BTS and page only the cluster of BTS arrays for the SRM 50 is known to be operating at its application point of use (APU). An SRM 50 APU is defined by the physical geographic location of its operation in relation to the geographic-topographical location of BTS 54 that is currently serving the SRM 50. The inventions STEP gateway system 51 maintains an updated mobile wireless cellular GSM PLMN Geographic Plan Area (GPA) map of every mobile PLMN that serves as a SVRO host virtual network.

BTS installations are defined in terms of location clusters the are geographically designated. These clusters are defined by relative topographical position defined in terms of longitude and latitude coordinates that are provided by global positioning satellite (GPS) called the NAVSTAR satellite network. Throughout the globe all BTS clusters are recorded on geographical maps called plot plans. These plot plans are maintained by each mobile wireless cellular carrier and the relevant governing body such as the Federal Communications Commission (FCC) in the United States and the Ministry of Communications in Australia. Each STEP gateway system maintains up to date plot plans of GSM PLMN GPA in order to better locate operating SRMs in order to better circumvent fraud. The inventions Global STEP gateway system depicted in FIG. 10, maintain a constantly updated mobile wireless cellular PLMN GPA plot plan of every participating mobile wireless cellular system. These BTS geographic plot plans are used to cross check Location Areas and relative SRM 50 topographical and host network topological position in terms of area of current operation. The STEP Gateway system maintains daily operational movements of the SRM in relation to the GPS related position of serving BTS clusters, in accord with received BTS Identity Codes-System Identification Codes (BSIC-SID) and originating Mobile Switching Centre (MSC) Identification (MSCID) that are constantly compared by the inventions authentication data base (ADB) 86*b* as shown in FIG. 5.

Referring to FIG. 3, BTS clusters are referred to in the art as Location Areas (LA) 317. A GSM PLMN Area is divided into Location Area. Each LA 317 is comprised is made up of one or more BTS 54 operational areas. A mobile SRM 50 registers each time it enters a new LA 317. A mobile SRM 50 is free to move around within the topology of a selected LA 317 without reregistering. When delivering voice and/or data call to an SRM 50 only one LA 317 is paged. The BTS 54 sends the BSIC code 313*a* via the SCH 269 to the SRM 50. Upon reception of the BSIC code 313*b* the SRM 50 stores this information in the Authentication Data Base (ADB) 86*a*. The received BSIC message code contains location area (LA) (LAI) identification. LA identification (LAI) includes Mobile Country Code (MCC) 319—3 digits, Mobile Network Code (MNC) 320—2 digits; and the LA Code (LAC) 318—2 octets and in some case the cell identity-BTS 54 code (CI) 321—2 octets. A BTS 54 LA 317 can contain many cell identity codes (IC) 321. The SRM An MSC 53 coverage area contains one or more LA 317. Each LA typically consists of one or more sector cell areas.

When an SRM 50 receives a page 314*a*, 314*b* and the paging request message 315*a*, 315*b* after one of the MSISDN, IMEI, IMTS and ESN combinations has been authenticated during primary channel registration in association with the currently serving SS7, SS#7 network 59 and the inventions SVRO Home Location Register (SHLR) 66. Once registered the designated SRM 50 initiates the TCH speech channel assignment procedure by initiating a TCH speech channel request 323 through the Random Access Control Channel (RACH) 274 as shown in FIG. 15. Referring to FIG. 18, upon receiving the message 323 the currently serving BTS 54 sends an acknowledgement message (ASS-SDCCH on AGCH) 324 over the Access Grant Channel (AGCH) 273 with the same random number that is derived from the disclosed A5 algorithm 309*a*, 309*b* as shown in FIG. 17, and the channel number for Stand-alone Dedicated Control Channel (SDCCH) 285 also shown in FIG. 15 and FIG. 18. Referring to FIG. 18, the SRM 50 sends a Set Asynchronous Balanced Mode (SABM) page response message (PRM) 316 to the currently serving BTS 54.

Referring to FIG. 5, FIG. 17 and FIG. 18, when the associated STEP gateway system 51 sends the paging request message 315*a*, 315*b* the STEP gateway system Switch Signaling Point (SW/SSP) 87 sets up the call flow topology using dedicated circuits such as DS0/DS1 that are logically configured to use ISUP 232 HDLC 225 logical channel protocols to the currently serving MSC gateway 53*a* that routes the call to the currently serving MSC 53. The MSC 53 is interconnected to the serving BTS 54 and associated base site controller (BSC) 63 and Base Station Substation (BSS)-BSC 63 manages the call connection via the serving BTS 54 sector cell to the SRM 50 assigned TCH channel 171 a that is the reverse uplink 151 channel and the assigned TCH 171 that is forward downlink channel 152 as shown in FIG. 17. One important aspect is that when an MSC 53 assigns a reverse uplink 151 TCH speech channel 171*a*, the MSC 53 also assigns a forward downlink 152 TCH speech channel 171*a*. These conventional out-of-band and in-band protocols include DTMF, ANI-Wink, and multiple ISUP/HDLC link layer protocol means methods that are well known to those who practice the art.

Figure 20:
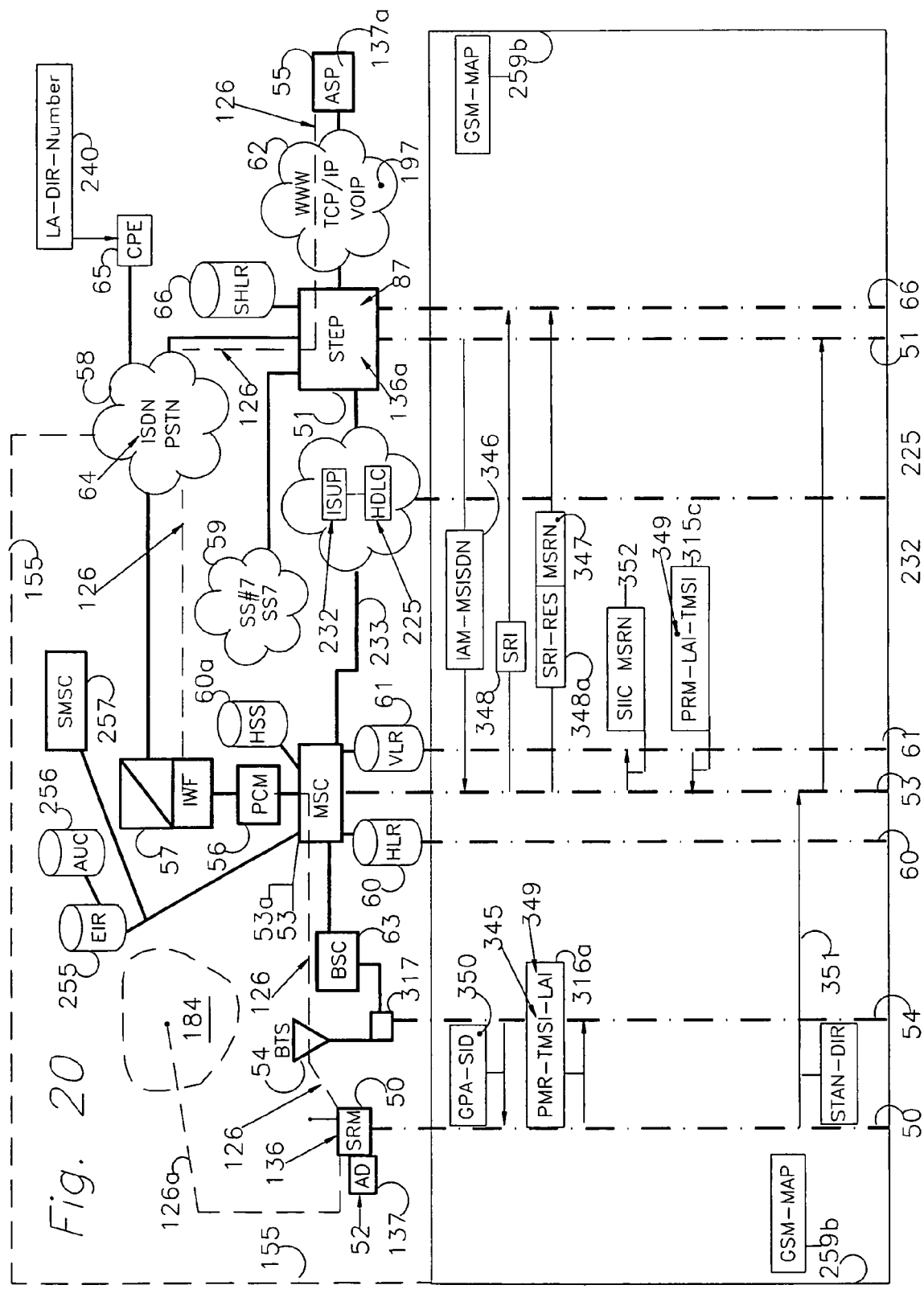
FIG. 20, Depicts the improved financial communication network as applied to GPRS and other 2.5, Third Generation and Fourth Generation networks, according to the invention.

Referring to FIG. 17, and FIG. 20, the SRM 50 is now registered with the serving mobile wireless cellular GSM PLMN 155 either as a roaming subscriber or a home subscriber. The SRM 50 has been assigned a TMSI 327 and MSRN 347 as shown in FIG. 17. An MSRN is also known as a TLDN. In certain signaling and authentication scenarios the MSRN 347 and TMSI 327 are sent during the same authentication operation, still other of these authentication and signaling messages are used in separate GSM MAP functions. In FIG. 17 and FIG. 18, the STEP gateway system Switch/SSP 87 performs the inventions quick/connect which partly entails generating the inventions high speed DTMF quick/connect dial up functional protocol. The DTMF dial up string can use the currently assigned diallable LA-MSISD-MIN 241 which is allocated by the local market mobile wireless PLMN Plan Area to a selected SVRO Regional-Carrier STEP gateway system operator. This LA-MSISDN-MIN 241 number is provided so that the SRM 50 user may receive voice calls from a CPE 65 or a conventional mobile subscriber station (MSS) 157. This LA-MSISDN-MIN can also be used for callers who are accessing the SVRO Virtual Network via the inventions specialised H3D-VOIP virtual network. The STEP gateway system 51 can route voice and multislot-TCH channel data calls through the PSTN 58 while using E1/T1 data channels that support ISDN 64 link layer protocols and the like.

Referring to FIG. 17 and FIG. 20, the STEP gateway system 51 can also route voice and multislot-TCH channel data call through ISUP 232/HDLC 225 link layer protocols using data link channels that are typically E1/T1 based which enables direct high speed connections between the STEP gateway system 51 and the serving MSC 53 and/or gateway MSC 53*a*. In this case the call is routed through ISUP/HDLC channels as the preferred means. The LA-MSISDN-MIN is contained within the Initial Address Message (IAM) 346. The MSC 53, 53*a* sends the Send Routing Information (SRI) message 348 to the SHLR 66 in order to provide routing information for the LA-MSISDN-MIN 241. The SHLR 66 acknowledges reception of the SRI message 348 by sending an SRI response message 348*a* that contains the MSRN 347. The MSRN 347 returned by the SHLR 66 will most likely be the same as the received LA-MSISDN-MIN 241. The MSC 53, 53*a* informs its VLR 61 using a Send Info for Incoming Call (SIIC)/Call Acknowledgement 352 that includes the MSRN 347. The serving VLR 61 responds to the MSC through a Page Request Message (PRM) 315*c*. The VLR 61 only comes into the protocol when the SRM 50 is deemed a roaming mobile. As long as the SRM 50 is deemed a home subscriber the authentication procedures will only involve the SRM 50, The MSC 53, 53*a* the SW/SSP 87 and the SHLR 66. If the SRM 50 is engaged in a voice or data conversation over an assigned channel the incoming call will be blocked, and/or diverted in that the serving MSC 53, 53*a* will route the incoming call to an appropriate announcement or generated set of tones. However all voice and data calls are routed to an SRM 50 that is operating in a serving GSM PLMN-GPA will be managed through the inventions STEP gateway system 51.

The STEP gateways system and its associated Switch/SSP 87 and its associated SHLR 66 act in consort to enable up to eight multiple-data-call channels to one SRM 50. This unique feature is enabled through an elegant manipulation of GSM MAP SS#7/SS7 based signaling and authentication messaging that is managed by the inventions SHLR 66, Switch/SSP 87, SVRO protocol stack 112*a*, 112 which includes multislot-channel/multiplexing 72*a*, 72 protocol layers that are used by the SRM 50 and the STEP gateway system 51 as shown in FIG. 4, and FIG. 5. Referring to FIG. 18, and FIG. 20, once it is determined that the SRM 50 is not engaged in a voice or data call conversation the MSC 53, 53*a* uses the LAI 349 provided by the VLR 61 and or SHLR66 page request message (PRM)(LAI)(TMSI) 315*c* that was previously sent to the VLR 61 and or SHLR 66 to determine which BTS will be page the SRM 50, and this is dependent upon whether or not the SRM 50 is deemed a roaming SRM or home subscriber SRM respectively. In some cases the HLR and VLR act in consort to establish location of a roaming mobile and or a home subscriber. This depends upon how each GSM PLMN GPA is configured. The MSC 53, 53*a* sends the page message 314*a*, 314*b* to the designated BTS 54 to perform the page that either contains ND-MSISDN-MIN 241, or LA-MSISDN-MIN 211 as such. The BTS 54 transmits the TMSI 345*a*, 345*b* of the SRM 50 in the Page Message 314*a*, 314*b* on the PCH 272*a*, 272*b* that is also shown in FIG. 15 as 272.

Figure 12:
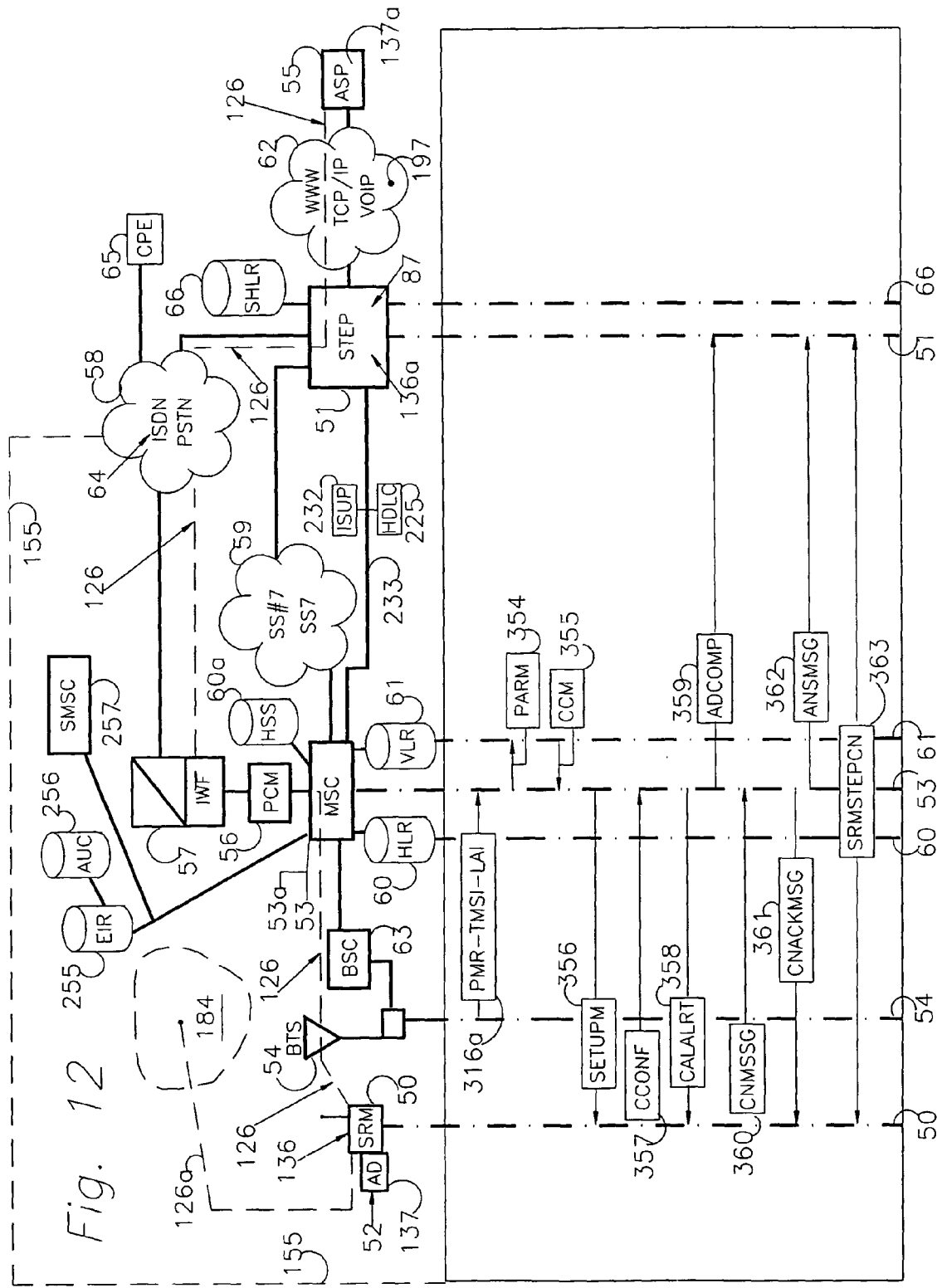
FIG. 12, depicts the modified SVRO Call Handling protocol elements, according to the invention.

Referring to FIG. 18 and FIG. 20, when the SRM 50 detects its TMSI 345*a*, 345*b* on the PCH 272*a*, 272*b* it responds to the BTS 54 with a Channel Request Message 323 over the common access channel, RACH 274 as shown in FIG. 15. Referring to FIG. 18 and FIG. 20, upon receiving the Channel Request Message 323 from the SRM 50, the BTS 54 assigns an SDCCH 285 and sends the Immediate Assignment message (IASM) 353 to the SRM 50 over the Access Grant Channel (AGCH) 273. It is over the SDCCH 285 that the SRM 50 communicates with the BTS 54 and the serving MSC 53, 53*a* until a reverse uplink 118, and forward downlink 119 TCH speech channel is assigned as shown in FIG. 1. Referring to FIG. 18 and FIG. 20, the SRM 50 sends a Page Response Message (PMR) 316*a* to the serving BTS 54 over the SDCCH 285. The message contains the SRM 50 TMSI 345 and LAI 349. Referring to FIG. 12, and FIG. 20, The BTS 54 forwards the Page Response Message (PRM) 316*a* to the currently serving MSC 53, 53*a* as shown in FIG. 12. The serving MSC 53, 53*a* sends a Process Access Request Message (PARM) 354. The serving VLR 61 and/or SHLR 66 responds by sending a Complete Call Message (CCM) 355 to the MSC 53, 53*a*. The serving MSC 53, 53*a* then sends a Setup Message (SETUPM) 356 to the SRM 50 using the disclosed control channels.

In FIG. 12, the SRM 50 responds by sending a Call Confirmed Message (CCONF) 357 to the serving MSC 53, 53*a* via the serving BTS 54 using disclosed control channels and associated Base Site Controller (BSC) 63. The serving MSC 53, 53*a* sends an Call Alert Message (CALALRT) 358 to the SRM 50 via the serving BTS 54 using disclosed control channels and the associated BSC 63. The serving MSC 53, 53*a* sends an Address Complete Message (ADCOMP) 359 to the STEP gateway 51 system SW/SSP 87 via USUP 232/HDLC 225 protocols over a preferred E1/T1 channel link as shown in FIG. 12, and FIG. 20. The SRM 50 answers by autonomous means, and sends a Connect Message (CNMSG) 360 to the serving MSC 53, 53*a*. The serving MSC 53, 53*a* sends a Connect Acknowledgement (CNACKMSG) 361 to the SRM 50 via the serving BTS 54, BSC 63 via disclosed control channels. The serving MSC 53, 53*a* sends an Answer Message (ANSMSG) 362 to the STEP gateway system 51 SW/SSP 87 using ISUP 232 HDLC 225 link layer protocols over an E1/T1 channel link.

The SRM 50 and STEP gateway system 51 SW/SSP 87 begin communicating (SRMSTEPCN) 363 as shown in FIG. 12. This disclosed multiple-Multiplexed connection process can be repeated up to eight times while the SRM 50 and associated STEP gateway system 51 are connected in rapid succession during a STEP gateway system 51 originated Multislot-Channel TCH voice and data communications event; using elegantly manipulated GSM MAP SS#7/SS7 signaling and authentication protocols that are governed by the inventions unique SRM-Invoked Page Message Request (SRM-INV-PRM) 95*a* means and methods, SHLR 66 protocols, and the protocol stack 112, 112*a*. However the SRM 50 originated voice and or data call is disclosed. Referring to FIG. 16, FIG. 10, and FIG. 20, An SRM 50 originated voice and data call setup and connection to an associated STEP gateway system 51 is as follows. Assuming the SRM 50 has registered with the currently serving mobile wireless cellular PLMN 115, the SRM 50 autonomous protocol stack software initiates a quick connection algorithm and generates a rapid DTMF sequence that numerically equates to the currently serving STEP gateway STAN-DIR number 351.

Referring to FIG. 1 and FIG. 25, the inventions quick connect DTMF sequence is sent upon completion of the REGNOT 117 that is sent by the SRM 50 before autonomous protocol functions that begin the Origination 213 voice or data call set up. In some cases the origination procedures may be a specialised use of cellular digital control channels and the international Signaling System Seven (SS7). (SYMRAAM) 217 that provides unique Class of Service (COS) activations that have been previously configured within the switch matrix tables of the associated tandem switch elements that comprise the currently serving MSC 53, 53*a*. The novel application specific SYMRAAM 217 Origination 217 procedure are fully disclosed. In fact this the first instance that a modified mobile cellular origination (MCO), mobile trunk radio (MTR) origination is used to add another layer of application specific messaging that enables simultaneous multichannel pre-connection application specific messaging. In addition the invention introduces the concept of concatenation of SYMRAAM 217 origination packets in order to send more data that is currently available for an earlier technology Remote feature Access Application Message (RAAM). The invention creates SVRO Remote Feature Access (SYMRAAM) 217 also introduces some new applications for usage of the SYMRAAM packet or concatenation of these packets. The invention uses a combination of dialed digits, SVRO Harmonic Pulse Data (SHPD) and modified Caller I.D. on hook and off hook application specific usages. The invention applies the means and methods of modified caller I.D. ring interval messaging.

Figure 23:
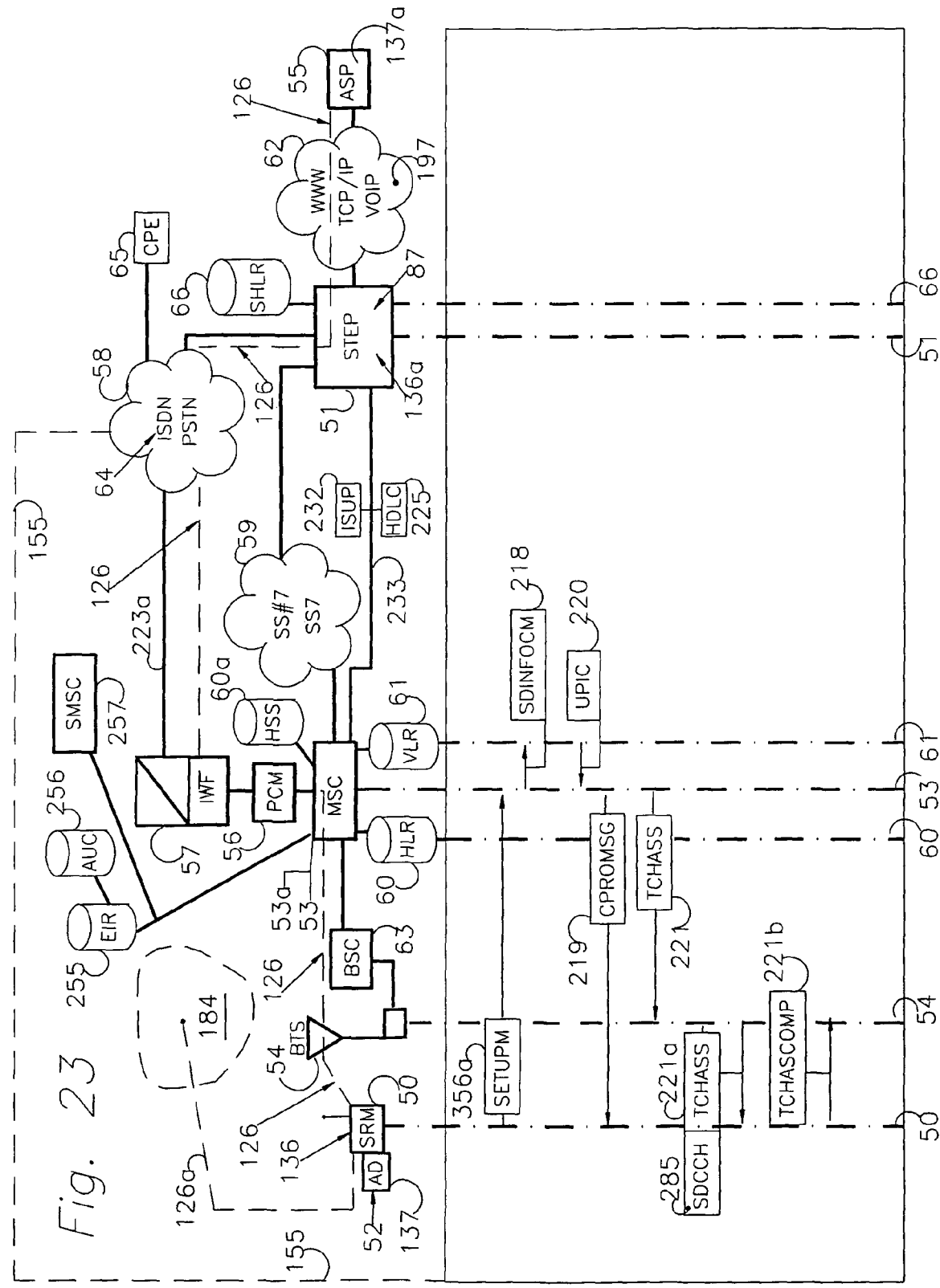
FIG. 23, Depicts the SVRO Radio Module (SRM) originated multislot-channel event, according to the invention.

Referring to FIG. 1, and FIG. 25, upon initializing the Origination procedure the SRM 50 sends the SETUPM 356*a* to the currently serving MSC 53 and MSC Gateway 53*a* after it begins ciphering the TCH speech channel in association with disclosed modified control channel protocols, processes and procedures that are shown in FIG. 17 that enable the application multi-TCH user channel utilisation by one SRM 50. Referring to FIG. 1, and FIG. 23, The SETUPM 356*a* message contains the dialed digits that equate numerically with the associated STAN-DIR 351 as shown in FIG. 10 In some application specific cases the SYMRAAM 217 packet will be utilised as a GSM SETUPM 356*a*. In some cases these packets will be concatenated in order to apply longer strings of pre-connection application specific messaging.

Referring to FIG. 1, FIG. 23 and FIG. 25, in some application specific cases the STAN-DIR 351 will contain dialed digits that use a star (*) or hash (#) as the first numeric character 338 "A" digit is simply a truncated hexadecimal class of service (COS) invocation order that used to invoke a SYMRAAM 217. In FIG. 25 the entire SYMPACKET 217 is depicted. The packet is comprised of seven words 334*a*, 334*b*, 334*c*, 334*d*, 334*e*, 334*f* and 334*g*. Contained within these seven words are control, service and application specific messaging. For example Word A 334*a*. Contained within the A word is the assigned mobile identification number (MIN) 777-1037 without the Number Plan Area (NPA) number. Also contained within this number is the station class mark (SCM) 339 is the numeric number that defines the class of service (COS) which in fact relates to the whether the SRM 50 functions as a half-rate codec or full rate codec system. In fact the invention functions well in terms of its data rate and how fast an application specific message arrives to its point of presence (POP) on the currently serving GSM PLMN 155 as shown in FIG. 1. The invention is designed to operate efficiently and transport application specific data service whether when the network operates in full-rate and/or half-rate codec performance and voice service parameters. Referring to FIG. 25, the B Word 334*b* contains the Number Plan Area (NPA) 340*a* which is set to 500, or 03, 3, 4 or any other diallable or non-diallable three digit, two digit or one digit NPA. Also contained in the B Word are the service order 336*b* and order Directive qualitative function 336*a* that is set by SRM to either be a registration or and origination order. In this case the order is set to origination which means that this packet of seven words accompanies this as the origination order and or application specific message used for machine-to-machine application specific messaging and the like.

Upon receiving the SETUPM 356*a*, the serving MSC 53, GMSC 53*a* requests the associated SHLR 66 or VLR 61 to provide appropriate User Profile information in accord with the GSM MAP parameters that includes the called STAN-DIR number and the service indication. In this case the service request is for conventional voice/speech service. This unmodified and duly assigned speech channel will transport H3D-GA-VM Modulation that in fact carries the H3D symbolic data that is derived from the H3D-GA-VM Dictionary. The MSC 53, GMSC 53*a* sends Send Info for Outgoing Call Message (SDINFOCM) 218 to the associated SHLR 66 or VLR 61 as shown in FIG. 23. Referring to FIG. 1, and FIG. 23, upon receiving the (SDINFOCM) 218, the SHLR 66 or VLR 61 checks for call and user profile account status that may be entered into its own data storage tables.

The VLR 61 or SHLR 66 returns the information that has previously communicated within the SHLR 66 that originally sent the SRM 50 user profile to the serving MSC 53, 53*a* or VLR 61 upon successful GSM MAP manipulation provided by the inventions modified virtual GSM MAP Multislot-Channel authentication protocol, this action is dependent upon whether the SRM 50 is a roaming mobile or a home subscriber. This modified protocol supports the inventions unique Multislot-Channel Cascading protocol that was performed by the STEP gateway system 51 during initial in-channel SYMREGNOT 121 processing that also contained the Multislot Service Request (MSR) message 97*a* as shown in FIG. 3. This MSR message 97*a* was transported by a Message Capsule 344*a* that is categorized 330 as a REV Channel Message Capsule 335*c* that carries SYM-Authentication Message Word 339*b* shown in FIG. 21, which is In Channel Action Message 329 defined in this case as a SYM-REGNOT 121 that is carried in the Message Body Word Payload 339*a* during an In-Channel Communications Event.

Referring to FIG. 1, and FIG. 23, the VLR 61 or SHLR 66 allows the Origination to proceed by sending a User Profile Interrogation Complete (UPIC) 220 to the serving MSC 53, 53*a*. The serving MSC 53, 53 sends a Call Proceeding Message (CPROMSG) 219 to the SRM 50 via the serving Base Site Controller (BSC) 63. The MSC 53, 53*a* allocates an available T1/E1 trunk 233 to the BTS 54 in a protocol-connection association with the serving base site controller (BSC) 63. The MSC 53, 53*a* sends a TCH speech Channel Assignment (TCHASS) 221 to the BTS 54 supplying it with the trunk number that is the designated circuit channel such as a DS0/D21 TDM circuit channel. Simultaneously the TCHASS 221 that is allocated and the requests a TCH speech channel assignment for the SRM 50. The serving BTS 54 allocates a the TCH channel designated in FIG. 8 as TCH channel One 171, and sends a TCH Channel Assignment (TCHASS) 221*a* to the SRM 50 over the SDCCH 285 also shown in FIG. 15.

Figure 24:
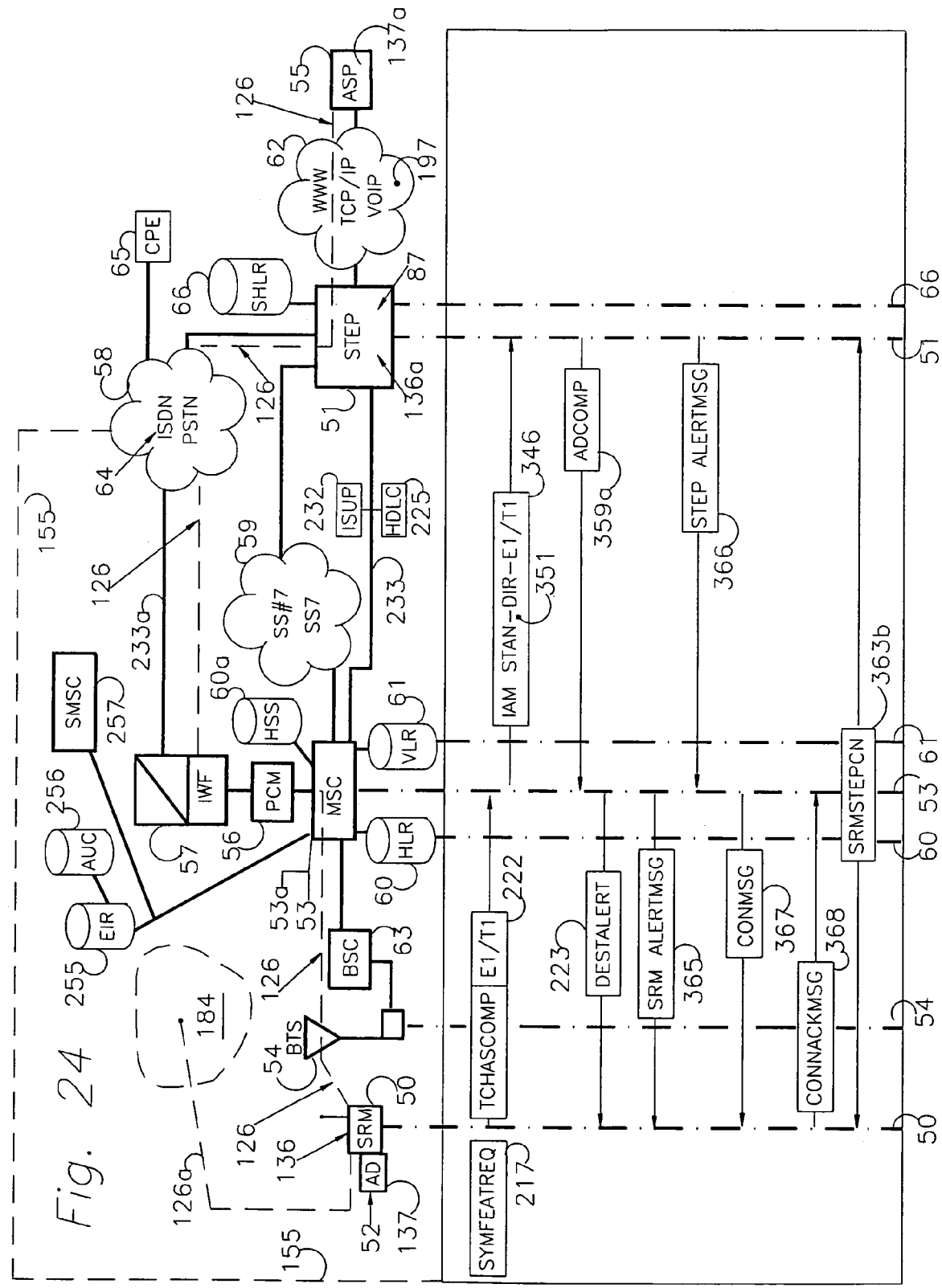
FIG. 24, Depicts SVRO speech/data Call connection protocols, according to the invention.

Referring to FIG. 1, and FIG. 23, the SRM 50 tunes to the previously assigned TCH speech channel and sends a TCH Assignment Complete (TCHASCOMP) 221*b* over appropriate control channel to the currently serving BTS 54. Referring to FIG. 23 and FIG. 24, The BTS 54 connects TCH channel One 171 as shown in FIG. 8, and FIG. 24, to the assigned E1/T1 circuit/trunk 233 and the serving MSC 53, 53*a*, deallocates the SDCCCH 85 and informs the MSC 53, 53*a* with an E1/T1-and TCH channel One 171 Assignment Complete-to-Trunk Message (TCHASCOMP)(E1/T1) 222. At this point a speech/voice path via the T1/E1 trunk 233 is established between the SRM 50 and the serving MSC 53, 53*a*. In some application specific cases the conversation route path can be pointed through the Interworking Function (IWF) 57 and associated ISDN 64/PSTN 68 links. This route path is directed through a plurality of PSTN switches and is subject to many potential technical performance anomalies. However in this case the connection is pointed through the direct tandem switch connections supplied by the ISUP 232 HDLC 225 cloud because this instant connection offers better data throughput performance and provides a much higher security quotient, with less protocol link layer complexities. Yet the connection between the SRM 50 and associated STEP gateway system 51 and its associated SW/SSP 87 is not complete.

The serving MSC 53, 53*a* sends the Initial Address Message (IAM) 346 to the SW/SSP 87 that is an associated virtual network element of the STEP gateway system 51 that operates within the ISUP 232 HDLC 225 cloud provided by the serving GSM PLMN GPA 155. This IAM message 346 includes the STAN-DIR 351 number and the E1/T1 circuit path 233 designation. The SW/SSP 87 sets up the SVRO Data/Voice call and notifies the serving MSC 53, 53*a* with an Address Complete Message (ADCOMP) 359*a*. The serving MSC 53, 53*a* sends to the SRM 50 a Destination Alert Message (DESALERT) 223. The SRM 50 receives "hears" alert tones from the ISUP 232 HDLC 225 cloud and the associated SW/SSP 87.

Referring to FIG. 6, at this crucial moment the inventions can optionally apply SVRO Caller I.D. Data (SCLID) 227. The SRM 50 can originate 230*a* and generate, or the STEP gateway system 51 via the SW/SSP 87 can originate and generate 230*b* the inventions unique manipulated ring cycle (MRC) 230 based upon the type of specialised page function the SRM 50 receives which can trigger the novel SVRO Harmonic Pulse Data (SHPD) 229 communication protocol, process and procedure. SHPD 229 is another form of H3D-GA-VM Modulation that creates this novel means and method of bi-directionally sending pre-connection application specific symbolic data. Pre-connection MRC 230 SHPD 229 Symbolic Data includes Machine-to-Machine (M2M) telemetry/telematics data, electronic mail, in-channel control, multi message, Full ASCII text, SVRO Short Message Service and Universal Messaging 231. SHPD 229 can also be used to deliver Multislot Service Request (MSR) 97*a* message capsules in order to invoke the acquisition of additional TCH speech time-slots and corresponding E1/T1 trunk circuits during the inventions pre-connection communications using SHPD 229. Referring to FIG. 3 and FIG. 6, in fact the SRM 50 can send its SYMREGNOT 121 message that includes the Unique SRM I.D. 325, an MSR request such as the MSR4 request 97*c* to the STEP gateways system 51 and await the SYMREGNOTres 122 that contains access approved or denied notifications 331. This novel pre-connection 364 activity can occur before any host mobile wireless cellular GSM PLMN air time is calculated. Also during this pre-connection 364 period a full connection is not necessary. A full bi-directional SVRO Communication event can be completed during this momentary pre-connection period 364. Therefore in this case, the full connection proceeds as follows.

Referring to FIG. 24, after the SRM 50 receives a Destination Alert Message (DESALERT) 223, the serving MSC 53, 53a sends an SRM 50 Alert Message (SRM ALERTMSG) 365 to the SRM 50 via control channel paths. When the SRM 50 hears the last completion tone of the SRM ALERTMSG 365 and goes "off hook" i.e., opens circuit path, the STEP gateway 51 SW/SSP 87 informs the MSC 53, 53a of the open circuit status with a STEP gateway system Alert Message (STEP ALERTMSG) 366. The serving MSC 53, 53a informs the SRM 50 the connection has been established via the Connection Message (CONMSG) 367. The SRM 50 sends a Connection Acknowledgment (CONNACKMSG) 366 to the serving MSC 53, 53a. The SRM 50 and the STEP gateway system 51 via the SW/SSP 87 now have a complete SRM 50 originated connection to the STEP gateway system 51 (SRM-STEPCON) 363b. Referring to FIG. 1, once connection has been established the SRM 50 and STEP gateway system 51 SW/SSP 87 begin originating and generating synchronisation signals over the uplink reverse channel 118 and downlink forward channel 119 respectively.

Upon completion of either the pre-connection SVRO Authentication procedure or after the disclosed in-channel post connection SVRO Authentication procedure, the SRM 50 and/or the STEP 51 gateway system send SVRO Message Capsules 344 as shown in FIG. 21. Referring to FIG. 21, and FIG. 14, In this case the SRM 50, 50e, 50d is physically and logically connected to an Application Device (AD) 52, 52d, 52e ATM machine 248 or EFT/POS merchant terminal 244, or any other application specific device (ASD) 52 an sends a message capsule that is configured to carry a 256 byte payload SVRO Message Body Payload 339a. This payload is defined here as an SVRO ATM Transaction Message 339c. The SVRO Message Capsule 335a is comprised of a packet header 334a, a packet tail-flag 336a and the like. The SVRO Message Capsule 344a is always carries the same byte capacity and the like. However this Message Capsule carries variable length padding 338a that acts as filler data when the Message Body Word 339a is less than the prescribed 200 bytes 341a. In the case of an ATM 248 or EFT/POS terminal 244 transaction the Message Body Payload 339a is about 133 bytes. Therefore, 67 bytes in the Message Body Payload 339a is padded data 338. Within the tail flag 336a portion there is a data file that contains characters that indicate to the SRM 50 or the STEP gateway system 51 of how many or the Number of Additional Words Coming (NAWC) 333a. Referring to FIG. 1, and FIG. 21 therefore when a STEP gateway system 51, 51d, 51e SW/SSP 87, 87d, 87e receives a SVRO Message Capsule 335a that indicates that there are no more Message Words Coming (NAWC=0), the receiving SRM 50 or SW/SSP 87, 87d, 87e knows to sends an SRM Acknowledgement (SRM-ACK) 198 Message Capsule or a STEP gateways system 51 originated STEP Originated Acknowledgment (STO-ACK) 199. Both are defined here as SYM-Acknowledgement Word 339e. Both words can contain all sorts of SRM and STEP originated control words, and application specific messages. SVRO is designed to waste nothing in the channel so that even in two dimensional perspective H3D-GA-VM modulation is truly Holophasec.

This complete ATM/EFT/POS financial communications transaction that occurs between the SRM 50 originated and terminated as the STEP gateway system 51 creates a voice/data call time domain measurement of under 1.8 seconds, this includes the inventions novel quick connect/disconnect; synchronisation and acknowledgement protocols. The STEP gateway system 51 originated voice/data call also generates a time domain measurement of under 1.8 seconds. The inventions over all Multislot-channel protocol is coupled with the H3D-GA-VM Modulation that clearly enables the repeat of the, heretofore disclosed STEP gateway system Originated and/or an SRM Originated virtual network connection, by a factor of eight multiplexed connections over the reverse and forward TCH speech channels and connected trunked channels for a total of 16 or 32 fast packet switched connections based on whether TCH channels are operating in TCH full rate or TCH halfrate.

Referring to FIG. 16, FIG. 4, and FIG. 5, the invention provides a unique protocol stack 112, 112a that operates with many database functions and other components that exist within the embodied logical content of the SRM 50 and STEP gateway system 51, that enable a revolutionary Multislot-channel assignment means and method: exponentially cascaded high speed packet switched connection over up to eight uplink reverse channel air interface speech TCH channels; and eight uplink forward channel air interface TCH channels multiple connections between the SRM 50 and STEP gateway system 51 SW/SSP 87 using multiple trunked E1/T1 circuits that pass from the serving BTS 51, base site controller (BSC) 63 through the serving MSC 53, 53a that can easily switch up to 16/32 combined E1/T1 circuits that are connected between the SRM 50 and the STEP gateway system 51 associated SW/SSP 87. Since each channel uses the inventions quick/connect disconnect protocol, coupled with the inventions disclosed H3D-GA-VM Modulation means, the invention provides the most efficient, cost effective, secure and reliable fast packet switched, and low event time domain latency then any virtual communications network in the world today. The inventions network is performs better than any 2.5G, 3G, and proposed 4.G network that is designed to be applied to 2.G networks along with massive financial burden and host network reconfiguration.

The SRM 50 selects the most relevant STEP Access (STAN) directory Number 351 that is retrieved periodically from its own internal authentication data base (ADB) 86a, as shown in FIG. 4, that was sent from the serving STEP gateway system 51 ADB 86b as shown in FIG. 5, that is currently communicating with the SRM 50 as shown in FIG. 1, over the currently assigned downlink FWD speech TCH channel 119. In this particular case the selected TCH 119 is first TCH speech channel that is assigned during this instant multislot TCH channel 152 voice and data communications event. For example during the first TCH multislot quick connection protocol activity, and upon completion of the in-band SVRO SYMREGNOT 121 action that has occurred over the assigned reverse uplink channel 118 as shown in FIG. 1, FIG. 3, and FIG. 21 a specialised In-Channel Action Message 329 defined here as a SYMREGNOTres 122 SVRO Authentication Message Word 339b is used. This message word 339b is a constituent part of a plurality of SVRO Message Capsule Arrays 344 as shown in FIG. 21, that is sent to the SRM 50 from the STEP gateway system 51 over the downlink FWD channel 119 and the associated E1/T1 trunk 233 as an action result message.

In this case the first available Control & TCH channel six 176a, 176 that was bursting idle bits; SCH-BCCH strings of zeros, the SRM 50 synchronises with the associated Synchronisation Channel (SCH) 269 which carries information for frame synchronisation of the SRM 50. The SCH channel transmits a 64-bit binary sequence that is previously known to the SRM 50 and also assigned by the currently serving BTS 54 and associated base site controller (BSC) 63 as shown in FIG. 1. One important aspects of GSM is that a user TCH that is in idle status is neither a speech or a asynchronous data channel until it is assigned to the SRM as a result of receiving a Voice Service Request increment. In FIG. 8, the invention manipulates GSM MAP protocols up to eight/16 times in a stair cased exponentially cascaded process during a single SVRO Symbolic Data Communications event that require the utilisation of three more TCH channels depending up which remaining TCH channel goes to idle status during the Active Multislot-Multiplexed protocol process monitoring such as TCH Channel Idle Status Monitoring 214 and detects when each TCH channel indicates idle status 215, 215*a* by apparatus and software means that is controlled by the inventions SRM 50 and STEP gateway system componentry. One important note here is that a TCH/Full Rate or TCH/Half Rate channel is neither a speech or a asynchronous data channel until a conventional mobile station (MS) or SRM 50 requests a channel. Therefore the term speech channel simply means the intended and then assigned channel category in terms of its application specific service layer category when the SRM 50 access the currently serving mobile GSM PLMN 155.

Referring to FIG. 3, FIG. 5, and FIG. 16, once the SW/SSP 87 received this MSR 97*a*/MSR4 97*c* and detects that the SRM 50 requires three more Phantom MSISDN-MIN, IMEI, IMTS, LAI and ESN number combinations, the SVRO protocol stack 112*a* interrogates the Authentication Server 254 and retrieves three more MSISDN-MIN, IMEI, IMTS, LAI and ESN number combinations in accord with the MSR4 request message 97*c* and inserts this information into Authentication Date Base Update Message (ADB Update) 97*b* that also contains the (MSR4) response 97*d* as part of the (RegSymRes) message 122 that is sent to the SRM 50 during the initial in-channel SYMREGNOT 121 procedure that completed the bi-directional connection TCH channel One 171*a*, 171 associated E1/T1 trunk channels 233 that utilise ISUP232 HDLC 225 logical communication protocols as shown in FIG. 3. Referring to FIG. 16, simultaneously the SHLR 66 sends a MAP/D Insert Subscriber Data (MAP/D Insert Sub DATA) 295 into the serving SHLR 66 and or VLR 61 user profile data base. The SHLR 66 and or VLR 61 responds with a MAP/D Insert Subscriber Data Response message (MAP/D Insert Sub DATA RES) message 297. This inserted subscriber data contains only the MSISDN-MIN, IMEI, IMTS, LAI and ESN number combination that is designated for the next Multislot TCH channel Six 176, 176*a* and corresponding trunk connections.

The only similarity between the first MSISDN-MIN, IMEI, IMTS, LAI and ESN number and the second set of subscriber numbers now designated for Multislot-Channel Six 176, 176*a* is the LAI. The ciphered key that is used by the second authentication procedure is based upon the new MSISDN-MIN, IMEI, IMTS, LAI and ESN number that was previously inserted into the serving SHLR 66 and or VLR 61 user profile during the insert subscriber profile action performed between the SHLR 66 and the serving VLR 61 if the SRM 50 is deemed a roamer, in the case that the SRM 50 is all ready known to the SHLR 50 as a home subscriber, the SHLR 66 manages the associated and appropriate TCAP message to the serving MSC 53, 53*a*. Since the SRM 50 is operating with one BTS 54 in the same LAC the LAI information will be essentially be the same. The SHLR 66 can send all three additional MSISDN-MIN, IMEI, IMTS, LAI and ESN number combinations to the serving VLR 61 and inserted into a roaming subscriber user profile along with additional Phantom Subscriber Data (PSD) as part of three (MAP/D Insert Sub DATA) 295 messages that are sent in rapid sequence. Again, if the SRM 50 is all ready deemed a home subscriber this action is not necessary. Or a single (MAP/D Insert Sub DATA) 295 can be sent one at a time which contains one MSISDN-MIN, IMEI, IMTS, LAI and ESN number combination to the VLR. Again if the SRM 50 is deemed a roaming mobile the SHLR 66 will automatically allow up to eight or 16 channel assignments in associating with the serving MSC 53, 53*a* and the SW/SSP 87 that is a component of the STEP Gateway system 51. This action differentiation depends upon how the host mobile wireless cellular-GSM PLMN MTA operator needs in terms of overall system bandwidth management. Normally the invention will select a one-at-a time scenario in order to save associated SHLR 66 and or VLR 61 user profile entries for other conventional activity that is associated with other conventional mobile subscriber station (MSS) users.

Referring to FIG. 4*a*, now that the SRM 50 has received three additional MSISDN-MIN, IMEI, IMTS, LAI and ESN number combinations The SRM 50 Digital Traffic Channel (DTC) monitoring system 237 "listens" to the traffic activity in order to detect when one or a plurality if TCH user channels are available within the time frame of the currently assigned DTC channel. The SRM can listen to the DTC and recognise TCH channel activity based on its first authentication-ciphering procedure that occurred between the BTS 54 and the SRM 50. The SRM 50 acts quickly in order to allocate the next TCH channel when another conventional caller releases the channel, or there is detected an idle TCH channel at the point of initializing the second Multislot-TCH channel acquisition.

Referring to FIG. 4, and FIG. 8, The DTC monitoring system 237 detects that a Second TCH channel 172 is now sending Idle Status bits (ISB) 216*a* that are broadcast over one of the logical control channels over the BCH group 276 as shown in FIG. 15, such as the Forward Control Channel (FCCH) 268, Broadcast Control Channel (BCCH) 270, SCH 269 and the like as shown in FIG. 15. These logical channels are mapped on the physical channels. In the GSM system there are eight time-slots or TCH multislots within the assigned TDMA frame. Also an important novelty of the invention uses the fact that the GSM system there is no Radio Frequency (RF) carrier or time-slot is assigned beforehand for the exclusive use of any particular task. All forward DTC channels broadcast any paged messages that are sent in order to deliver a voice call. The invention uses this feature in a completely innovative and novel way. Referring to FIG. 3 and FIG. 5, now that the SRM 50 is all ready communicating over the first assigned TCH channel as disclosed, and MSR4 request 97*c* as been received by the STEP gateway system the SW/SSP 87 in association with the Authentication Server 254, The PRM server 24, and the protocol stack 112*a* sends the SVRO Registration Response (RegSymRes) message 122 that includes Authentication Data base (ADB) 97*b* and the MSR4 response 97*d* the specialised Page Request Message Server (PRM) 94.

Referring to FIG. 3 and FIG. 5, simultaneously when the (RegSymRes) message 122 was received by the SRM-INV-PRM 95*a* input side of the PRM server 94 a special Internal Page Request Message (IPRM) 369 was sent to the specialised SHLR 66 via internal VPN channels via the SW/SSP 87. The SW/SSP 87 instructs the SHLR 66 to invoke a second 370*a* Page Request Message (PRM) 315*a*, 315*b*. The SRM 50 quickly resynchronizes the specialised Channel Encoding-Interleaving software component with the synchronised pulse rate as delivered by the Synchronisation Channel (SCH) that comprises part of the protocol of each TDMA frame in order to prepare for the acquisition of the next idle TCH channel.

This action causes the serving GSM PLMN 155 initialise and complete the next STEP gateway system 51 originated TCH speech channel call in the exact same method that we previously disclosed. The serving GSM PLMN 155 treats this action as if the SRM 50 was another conventional mobile subscriber, and technically treats the SRM 50 is just another conventional mobile subscriber stations (MSS).

Referring to FIG. 18, the SRM 50 is now synchronised. The STEP gateway system 51 awaits the second TCH channel connection order that is sent by the serving GSM PLMN 115 as previously disclosed by sending Subsequent Page Message (SPM) 370. The SPM 370 can be the second 370a, the third 370b and the fourth 370c SPM in order to provide seamless connectivity to the SRM 50 as shown in FIG. 18. The SPM message 370a Page Request Message-PRM 315a, 315b is the same PRM 315a, 315b that was originally sent during the STEP gateway system 51 originated and SRM 50 terminated call that was previously disclosed. The only difference between the original or primary PRM message 315a, 315b is the MSISDN-MIN, IMEI, IMTS, LAI and ESN number combination that was sent during the disclosed ADB 86, 86b update action.

This protocol action occurred over the first assigned TCH speech channel. Referring to FIG., 8, this same STEP gateway system 51 originated procedure is repeated three consecutive times until all four TCH time-slots, Six 176a, 176, Five 175, 175a, and Four 174a, 174 are allocated, connected and utilised to perform the desired application specific communicative function, in association with the subsequent PRM 370 actions so disclosed. The invention also provides novel fail safe means and methods. For example during the specific time-domain that transpires when one TCH speech is deemed idle and the STEP gateway system 51 performs the disclosed second, third or fourth TCH speech channel allocation, another conventional mobile subscriber station (MSS) user may attempt to use the DTC/TDMA frame to place a voice call. This activity may be PSTN terminated or mobile terminated. Regardless, if this is the case and the serving GSM PLMN network attempts to page the SRM 50 and there is no response from the SRM 50 the associated STEP gateway system sets a PRM message failure time out protocol that automatically invokes another Page Request Message (PRM) and causes the procedure to repeat until a subsequent TCH speech channel is allocated and utilised by the SRM 50.

Additional important protocol details are as follows. Referring to FIG. 3, FIG. 17, FIG. 8, and FIG. 16, upon connection the SRM 50 and STEP gateway 51/SW/SSP 87 transmits synchronisation signals over the SVRO reverse uplink channel 118, 176a that are originated by the SRM 50, and the SVRO forward downlink channel 119, 176 that is originated by the STEP gateway system/SW/SSP 87 over TCH speech channel Six 176a, 176. Next the SRM 50 sends an optional in-band SVRO-Registration Notification (SYMREGNOT) 121 to the STEP gateway system via assigned switch routing procedures designated by the SW/SSP 87 for authentication over any subsequent TCH speech channel Once the SW/SSP 87 has assigned the route path to the authentication server (AUTH-SERV) 254. Contained within the symbolic content of the SYMREGNOT 121 message is the BSIC-SID code 313b along with other subscriber profile information such as the 64 character SRM Identification Number (USRM-I.D.) 325 as shown in FIG. 4 and FIG. 1. The in-band SYMREGNOT 121 is sent to the STEP gateway system 51 authentication data base 86b and recorded. This SYMREGNOT 121 message is sent via internal virtual private network channel (VPN) topologies. These VPN topologies that include duplex channels 203a, 203b, 203c, 203d, 203e, 203f, 203G, 203H, 203i, 203J and the like as shown in FIG. 5.

Upon reception of the SYMREGNOT 121 at the authentication server 254 the internal authentication system protocol performs a user profile account look up increment by sending an account look up request (ALPRP) message to its own internal subscriber storage files. Contained within the SYMREGNOT 121 that is received by the authentication server 254 is the SRM user's last assigned subscriber profile update message (SUBPROFUD) message. This control message contains all pertinent account information. A duplicate of this comprehensive subscriber profile is also stored in the inventions SVRO Home Location Register (SHLR) 66. This key subscriber profile account information includes the subscriber's name, address, and application point of use (APU). The APU file details the subscribers application subscription category; the region the SRM was issued, application type, and APU related BTS geographic plot plan area of service operation most visited, LAI indicators and the like. Additional information includes SVRO Global Network Class of Service (SYMCOS) profiles that includes; roaming restrictions and the like. The subscriber profile includes account class type (SYM-ACT). This subscriber profile part (SPP) includes whether are not the subscriber uses SVRO prepaid debit pay-as-you-go services or a billed account and the like. One of the primary application specific functions that the SVRO Virtual. Network (SSVN) serves are financial related communications. Therefore knowing the operational habits of SRM 50 user is of paramount importance.

SVRO Application types relates to the type of application specific system that the SVRO Network serves. Application specific systems include ATM machines, EFT/POS terminal, and all known M2M applications. The invention also serves enterprise applications such as business related communications and group messaging and the like. There are various consumer application classes that relate to content download. This class includes video file downloads, music file such as MP3, MPEG 4, ACC files and the like. Subcategories include broadcom application (SYM-BR-COS), voice over I.P. class of service (VOIP-COS), long distance class of service (LD-COS), operation class restrictions and the like. The subscriber profile also includes all assigned SVRO ND-MSISDN-MIN numbers, LA-MSISDN-MIN, 10 digit regional directory number access file, Phantom ESN numbers, IMEI numbers, IMSI numbers that were assigned to the SRM 50 during its last operation cycle. A SVRO operation cycle is defined as the time period elapsed between the last serving mobile wireless cellular network out-of-band registration, in-band SVRO Registration, and last power off increment. This file also includes voice and data call activity, host network access attempts, universal messaging-SMS usage, multislot-channel access restrictions and other service related activity.

Contained with the subscriber profile are all SVRO Quality of Service (SYMQOS) reports which include SRM performance activity. This category includes battery charge rate activity, radio module channel performance, dropped call statistics and other related aspects such as trouble reports. This file also includes SVRO SRM maintenance updates, H3D-GA-VM dictionary updates, H3D-GA-VM Modulation Software Release updates, and the like. The profile also includes a file that contains the last GSM PLMN GPA area of operation that is defined by; contained mobile country code (MCC), Mobile Network Code (MNN), Location Area Code (LAC) code and BTS-Cell Identity. The subscriber profile also includes the 64 character SRM Identification Number (USRM-I.D.) 325 as shown in FIG. 4 and FIG. 1. This USRM-I.D. number is stored in a distributed file array that exists within the substrate layers of the SRM integrated circuit array. This subscriber profile data base is also contained within the storage componentry of the authentication server 254 as shown in FIG. 5, and the SHLR 66. Referring to FIG. 1, and FIG. 21 the USRM-I.D 325 is sent as a Registration Message Part (RMP) that is a contextual component of the SYMREGNOT 121 message that is integral to the 256 byte SVRO Authentication Message Word 335c. This authentication message word is contained within one of the four application specific message capsules and control message capsules 344a, 344b, 344c and 334d, that are depicted in FIG. 21.

Referring to FIG. 1 and FIG. 16, the disclosed STEP gateway system originated SVRO full duplex event includes initial host mobile wireless cellular network registration, SRM 50 page location protocols, in conjunction with the inventions unique GSM MAP multi-slot authentication procedure manipulation method. Referring to FIG. 3, once the completion of the SRM 50 and STEP gateway 51/SW/SSP 87 synchronisation protocol link layer procedure is connected and running, the SRM 50 sends a Multislot Service Request (SYMMSR) 97a to the currently serving STEP gateway system 51 via the assigned first TCH channel 171 as shown in FIG. 8 and FIG. 17. Referring to FIG. 1 and FIG. 5, the SYMMSR message 97a is routed to the authentication data base (ADB) 87b that is a register located in the authentication server 254 user profile storage array. An account look up request (ALPRP) is performed that involves a periodic SVRO Global Network Class of Service (SYMCOS) profile interrogation. In this particular case this look up procedure verifies that the user has no multislot-channel access restriction. In this case, the user has requested that all potentially available multislot channel be assigned for this one SVRO communications event.

Referring to FIG. 1, FIG. 3, FIG. 5, and FIG. 16. The invention utilises the complete mobile identification procedure that is used by all GSM PLMN networks. The mobile identification and management method is called the GSM Mobile Application Part (GSM-MAP). Referring to FIG. 1, when the SRM 50 first registers with the currently serving host mobile wireless cellular PLMN 155 a standard REGNOT 117 to the currently serving BTS 54. The BTS 54 and its associated base site controller (BSC) 63 send the REGNOT 117 to the currently serving MSC 53, 53a. Contained within the symbolic content of the REGNOT 177 message is the currently assigned LA-MSISDN-MIN, ND-MSISDN-MIN, IMEI, IMSI and ESN number. This SRM 50 is defined as a roaming mobile based upon the 10 digit MSISDN-MIN number associated with the SRM 50. The serving MSC performs a quick look up and determines that the SRM 50 is a roaming subscriber. Once this determination is made, the REGNOT 117 is sent to the associated Visitor Location Register (VLR) 61. The VLR 61 then received the REGNOT 117 performs a look up procedure, examines its user profile database and does not detect a previous registration user profile by the SRM 50. The VLR 61 subsequently determines that SRM 50 assigned MSISDN-MIN number is associated with a another GSM PLMN GPA different than the currently serving visited PLMN 155.

Referring to FIG. 20, in all operational regions the SVRO Virtual Communications network is assigned its own regional Carrier I.D. that is associated with its associated GSM-GPA-Number Plan Area (NPA) or area code. The carrier I.D. is a GSM PLMN GPA based upon aggregate BSIC-SID codes also is contained within the serving system identification number (SID) 350 that is transmitted over the SCH control channel from every BST 54 during voluntary and forced registration notification events. For example when an SRM 50 registers and detects the MSA-SID 350 that the serving system transmits during registration procedures. Once the SRM 50 receives the GSM Plan Area System Identification Numbers (GPA-SID) 350 it performs a look up algorithm and detects a regional serving STEP access directory number (STAN-DIR) 351 that is stored within the Authentication Data Base (ADB) 86a that is associated with the received SID-GPA 350 as shown in FIG. 4.

Once the proper STAN-DIR number 351 has been accessed, the SRM 50 initialises an origination event as shown in FIG. 20. Referring to FIG. 10, the Global STEP gateway system 209 maintains a global database of all STEP gateway system STAN-DIR numbers 351. Every time an SRM 50 communications with any STEP gateway system in the world, the ADB 86b is updated with any changes or additions to the STAN-DIR 351 access table that is contained within each SRM 50. Therefore no matter where the SRM 50 roams it can always access an associated STEP gateway system that is closest to the SRM 50 and the GSM GPA system of operation. This is a key automatic roaming function that the SVRO Global Network (SSGN) provides.

In some cases a SVRO Radio Module (SRM) 50 is assigned a separate SVRO Virtual Carrier I.D. that is (1) associated with the MSISDN-MIN number that is currently assigned to the SRM 50 as a primary MSISDN-MIN access number and (2) an SS7/SS#7 network to Destination Point Code (DPC) that is formatted in terms of a global, cluster and node address assigned as Service Control Point (SCP) routing number. Every SS7/SS#7 Service Control Point (DPC), Service Switch Point (SSP) and the Signaling Transfer Point (STP) is assigned its own unique Originating Point Code (OPC) and Destination Point Code (DPC). This particular DPC code is associated with the SRM 50 assigned MSISDN number and therefore is assigned to the inventions SVRO Home Location Register (SHLR) 66, The inventions SHLR 66 is an important internal user authentication data base that is physically and logically associated with the STEP gateway system 51. The SHLR 66 is also associated physically and logically with the inventions authentication server 254 and its integral user profile authentication data base 86b as shown in FIG. 5.

The inventions SHLR 66 is programmed to manipulate multiple Mobile Station Roaming Numbers (MSRN) by canceling REGNOT i.e., deleting user profiles from the serving VLR 61. Or the SHLR 66 is programmed to enable and authorise up to eight reverser and forward channels without interaction with the VLR 61 if the SRM 50 is all ready operating as a home subscriber. All of these numbers are repeatedly churned by the inventions Global, Regional and Carrier STEP gateway systems and reused by many SRM 50 subscribers at different times. Another important aspect of the SVRO phantom authentication method is that MSISDN-MIN, directory number allocations are precious mobile cellular-carrier resources and the invention uses these resources with incredible efficiency. In addition the invention uses finite "phantom" ESN numbers that are unique equipment designation numbers that are never issued and duplicated by other mobile radio module manufactures and regional mobile equipment governing bodies. Therefore any unlawful attempt to use phantom LA-MSISDN-MIN, ND-MSISDN-MIN, IMEI, IMSI, TMSI and ESN number combinations is utterly circumvented. Phantom LA-MSISDN-MIN, ND-MSISDN-MIN, IMEI, IMSI, TMSI and ESN number combinations are managed very much like Temporary Location Directory Number (TLDN)-Mobile Subscriber Roaming Number (MSRN) ranges are managed by automatic roaming ANSI-TIA-41 compatible SS7 networks, Temporary Mobile Subscriber Identity (TMSI)/MSRN number ranges are managed by automatic roaming GSM-MAP compatible SS#7 networks and their associated MSC and VLR combinations.

Referring to FIG. 3, the invention manages simultaneous multislot-channel system handovers in a unique and elegantly efficient way. There are two types of handovers, internal and external. When the SRM 50 receives a handover order from the serving BTS 54 on any of the assigned and connected multislot-channel the SRM 50 releases all but the first or primary channel that received the handover order. When the serving mobile wireless cellular system completes the handover internally or externally the SRM 50 in association with the connected STEP gateway system initiates the inventions multislot channel multiplexed/cascading functions until all previous multislot channels that were assigned before the received order are reconnected. However when an internal or external handover order is received via a control channel that is operating within a previously assigned digital traffic channel (DTC), there is no way for the SRM 50 and STEP gateways system 51 to know how many other multislot-channels in the newly assigned DTC will be made available when the internal and/or external handover is completed. There could be seven other users who are engaged in a conversation with all other TCH channels other than the one the serving system assigned to the SRM 50 upon completion of the handover. In this case the SRM 50 and the associated STEP gateway system will standby and await other multislot TCH channels to be released by the system.

Once one or plurality of others channels are released the invention initiates connection procedures until the needed additional multislot TCH channel are assigned by the serving system and connected between the SRM 50 and the associated STEP gateway system 51. This important novel multislot channel handover protocol will only momentarily slow down the over all data session rate. Because SVRO communications are bursty, and designed for specific application functions that serve short packet data delivery in most cases handovers will not occur during a SVRO communications event. Also many financial communications that the invention supports occur with stationary applications such as ATM machines, EFT/POS merchant terminals, M2M applications and the like. It is highly unlikely that many handovers will be required by the serving mobile wireless cellular system. When the SVRO communications system serves mobile applications such as mobile EFT/POS and the like, the effect of handovers on the flow of H3D-GA-VM Modulated data symbols will be minimal. The additional details of internal GSM GPA hand offs and GSM GPA external handover protocols that are not adversely effected to the inventions elegant multislot-channel manipulations. The SRM 50 conjoined logically with the STEP gateway system 51 enables (a) normal voice (b) H3D-VOIP and (c) H3D-Codec for multiple channels.

Referring to FIG. 2, FIG. 4, and FIG. 7, the inventions H3D-GA-VM Modulation 249 with its H3D-Encryption and unlimited dictionary variations, can be applied in one continuous SVRO of applied symbols across vast conjoined GSM, plus-WI-FI IEEE802.11, plus WI-MAX IEEE802.16e piconets, adhoc-scatternets, provided by one user SRM 50 device and the like that in fact originate from an SRM 50 that is configured as a wireless microcellular user device. In fact the invention creates an H3D-GA-VM Modulation 126*a* creates the hardest practical encryption known in the art today. This is particularly important for WI-FI IEEE802.11 variants, WI-MAX IEEE802.16e variants and Hyperlink2 networks that can be utilise and the like. The invention also applies it is unique symbolic dictionaries-to IEEE802.11 variants, Bluetooth frequency hopped spread spectrum ISM, DECT and other such modulations schemes. The invention can be applied to these networks that operate is public places such as airports, shopping malls, train stations, in building scatternets and the like. H3D-GA-VM Modulation 249, 249*a*, 249*b* is the core protocol construct that defines the SVRO bi-directional communications channels 126*a*, 126*b*, 126*c*, 126*d*, and 126*e* that operates within the channel space of each of these user SRM IEEE802.16 WI-MAX nodes 50*g*, 50*h*, 50*i*, 50*j*, 50*k*, 50L, 50*m*, 50*n*, 50*o*, 50*p*, 50*q*, 50*r*, 50*s* that are serve as route and relay base site nodes and the like as shown in FIG. 7. A single SRM 50 can communicate over GSM networks, 802.11 network master base transceiver stations and 802.16 base transceiver stations that are trunked over PSTN data links 58 and public and private TCP/IP-VOIP networks 62.

Each of these nodes can be configured to support IEEE802.16 variants, IEEE802.11 variants, ISM, DECT and the like. The inventions H3D-Modulation 249 can be applied to the PCM modulation used by these nodes in the form of Bluetooth ISM. The inventions H3D-GA-VM Modulation 249 can be applied to IEEE802.16 variants, IEEE802.11 variants as a virtual modulation tunneling protocol that enables the application of voice and H3D-GA-VM Modulated symbolic data that can communicate with a vast plurality of application specific devices. Such devices a personal computers (PC), personal digital assistances (PDA), music files players such as the Apple iPOD, and others that support MP3, MP4, ACC music files and the like. Each node can be integrated physically and logically with machine-to-machine (M2M) application specific devices that provide a vast plurality of telemetry and telematics services and the like.

Figure 22:
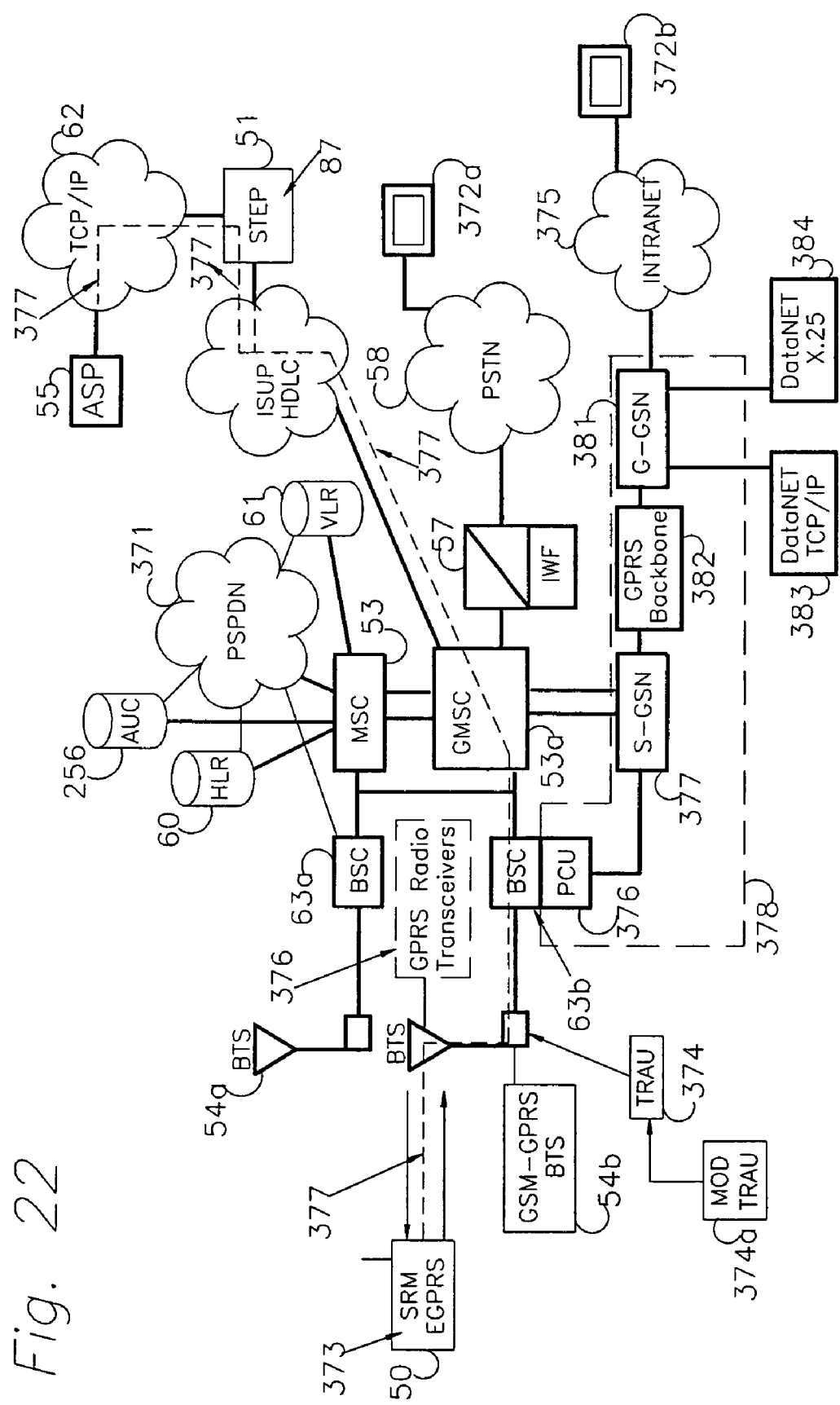
FIG. 22, Depicts the preferred SVRO H3D-Modulation protocol flow over host 2.5G/3G/4G Mobile Wireless Cellular Networks, according to the invention.

Referring to FIG. 22, depicted in this rendering is a GSM PLMN 155 that has been partially modified in order to support the deployment of selected network elements that enable GPRS/EDGE services. Each BTS 54*b* that is designated to support GPRS/Edge services for example must be modified with additional network elements such as additional radio transceivers, the Packet Control Unit (PCU) 376. The PCU 376 is logically associated with the Base Site Controller (BSC) 63*b*. The PCU 376 is responsible for radio related aspects of GPRS when connected to a GSM network and is placed physically between the BTS 54*b* and the Serving GPRS Support Node (SGSN) 377. The SGSN 377 resides at the same hierarchical level as an MSC 53, 53*a* and is another network element that must be added to an existing GSM PLMN 155 in order to provide shared packet data services to users. Another GPRS/EDGE network element is the Gateway GPRS Support Node (GGSN) 378. The GGSN 378 provides functions that are similar to those provided as the Gateway MSC 53*a*. The means and methods of GPRS/EDGE and Third Generation Network packet switched operational functions are well known to those whom practice the art, therefore details not relevant to the novelty of the preferred embodiment are omitted. However certain key elements of these networks must be effectively modified in order to support mission critical application specific services that require timely, secure and low cost delivery of messaging that relates to financial communication transactions, government communications such as remote passport clearances, and other applications that require guaranteed delivery.

GPRS/EDGE and Third Generation UMTS/WCDMA-3G network systems were not originally designed to provide various operational requirements for mission critical application specific wireless services that require dedicated circuit channels or priority delivery mechanisms. Also GPRS EDGE technology cannot be deployed with modifying every BTS, BSC that exists within the topological domain of any selected mobile wireless cellular PLMN. The invention provides simple remedies for this acute problem. Today's 2.5 Generation and Third Generation mobile cellular topologies are shared packet switched networks. Mobile cellular carriers who operate the selected 2.5G and 3G networks cannot guarantee delivery of time critical application specific messages, nor can they provide necessary high levels of security. The invention can simply remedy this problem by applying a hybrid SVRO solution to these shared networks. One of the key elements in all mobile wireless cellular telephony is the Transcoding Rate and Adaptation Unit (TRAU) 374. TRAU protocol is a software entity that performs a transcoding function for speech channels and the rate adaptation (RA) for data channels. The TRAU unit is typically considered as part of the Base Site Controller (BSC) 63*a*, 63*b*. The TRAU unit 374 manages both voice and certain data communications modalities. The invention provides a simple protocol improvement by applying a virtual circuit from the Base Site Controller (BSC) 63*b* this could be implemented by simply providing a software patch. The invention applies a simple improvement to the over all GPRS network communications method. When a GPRS mobile subscriber station (MSS) transmits a packet it is sent to the currently serving GSM-GPRS BTS 54*b*.

In terms of the conventional GPRS network topology GPRS BTS radios relay the received packet that was originated from a conventional GPRS mobile subscriber station (MSS) to the associated BSC 63*b* that is integrated with the GPRS Packet Control Unit (PCU) 376. The PCU 376 sends the packet to the associated SGSN 377 which resides at the same hierarchical level as an MSC 53, 53*a*. From the SGSN 337 the packet is sent through the network topology that comprises the GPRS Backbone 382. From the GPRS Backbone 382 the mobile subscriber station (MSS) originated packet is sent to a Data Network that is TCP/IP based 383 and X.25 384 based. Because a GPRS, EDGE or 3G UMTS network is shared network depending upon instant network load the packet can take several seconds to arrive to its destination. In addition there is no current practical way of providing guaranteed message packet delivery through a shared network without changing the addressing scheme at each TCP/IP network server or routing node that comprises part of the network element of the entire GPRS, EDGE or 3G network until now.

The invention provide the means and method of avoiding having to change an entire GPRS/EDGE or UMTS PLMN addressing scheme. Referring to FIG. 4, depicted in this rendering is the SVRO Radio Module (SRM) 50. The SRM 50 utilises a unique protocol stack previously described within the body content of this disclosure. Part of the protocol stack is that it enables conventional communications over a GPRS network topology. However the invention provides the means and method of combining the protocols, processes and procedures of the SVRO Protocol Stack 112 with the conventional GPRS protocol stack 385. The result of the synthesis is an SRM 50 that is essentially a multimode communications device that can operate seamlessly over many different network topologies. Referring to FIG. 22, For example an SRM 50 can be used to transmit and receive conventional GPRS Class 8 and Class 10 transmission protocols when it roams into a GPRS enabled mobile PLMN network topology. However if the host mobile wireless PLMN is SVRO enabled the SRM 50 user can select either GPRS or SVRO packet radio services. However the invention provides an autonomous system that is designed to automatically select between either GPRS, EDGE or SVRO Service. This autonomous selection method enables some useful services. For example if a user transmits a time critical message the application specific message type indicator that is contain within the message body of the packet or packet header indicates a time critical message the SRM 50 simply sets up a SVRO single channel and/or multi-channel event by quick connecting and transmitting the time/mission critical message the inventions associated STEP Gateway system 51. The instant time critical message packet could be originated from an application specific device (ASD) such as 52*d* EFT/POS terminal 244, and ATM Machine 248 and pointed from the inventions STEP Gateway system 51, 51*d*, 51*e* to an associated ATM switching system 245 and or a EFT/POS switching system 246 that act as network elements for financial application service providers (ASP) 55*d* and 55*e* respectively. Additional applications such as Machine to Machine (M2M) telemetry/telematics systems that relate to motor vehicle tracking, emergency 911/000 services, motor vehicle distress calls, security system reporting, agricultural system management and the like. The entire SVRO virtual network with all its elements is designed to be self adaptive, self correcting, and self optimising very much like a biological organism, and it can be provided now for the benefit of human kind.

Figure 27:
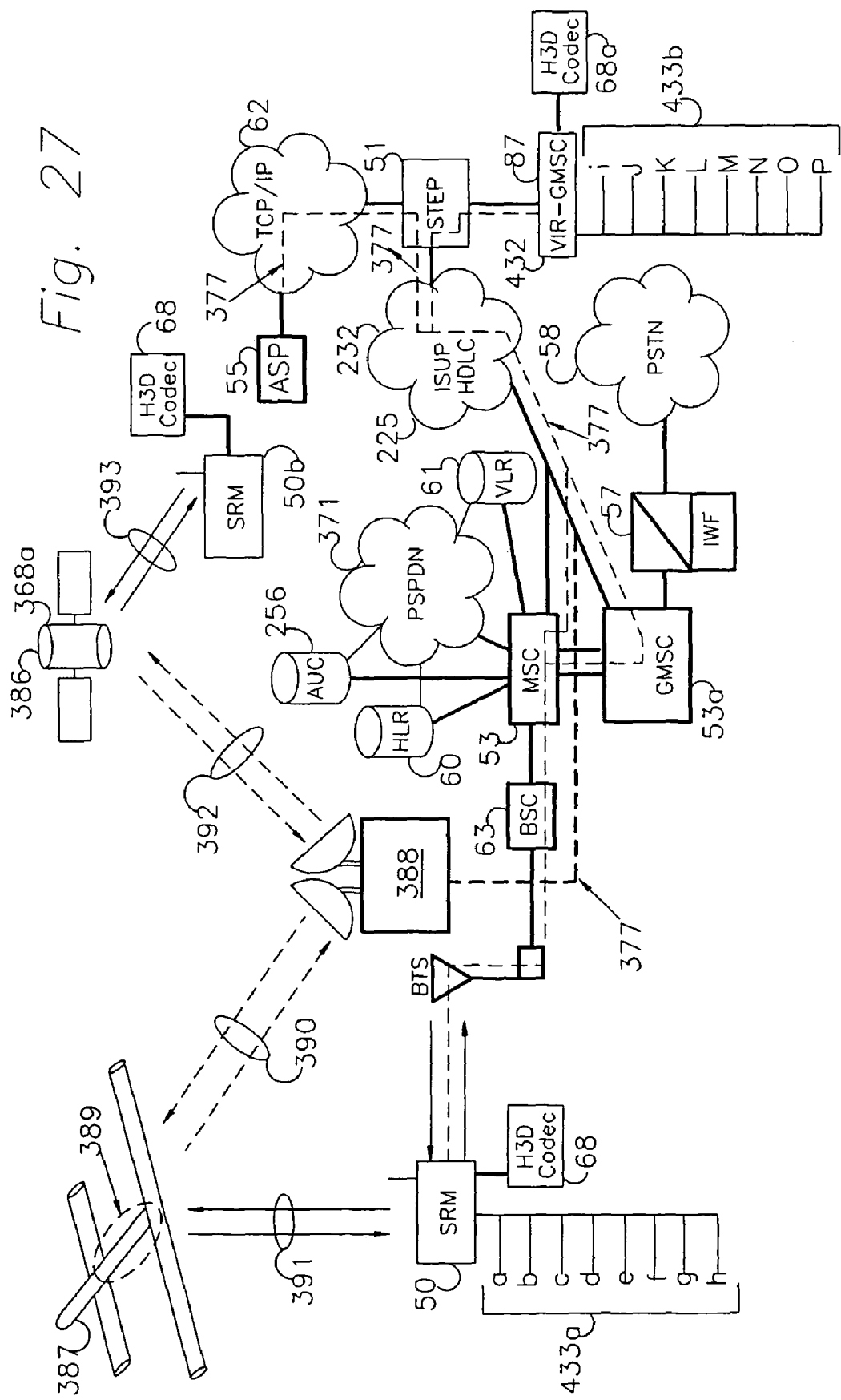
FIG. 27 depicts one embodiment of the invention.

Referring to FIG. 27, The invention provides still another means and method of enabling multi channel communication between the SRM 50 and the STEP gateway 51 system that utlise multiple mobile identification numbers (MIN), MSISDN, IMEI numbers and directory numbers that can be temporarily assigned, rotated and re used by each STEP gateway switch port-map-channel that is a component of imbedded switch/server/SSP 87 as shown in FIG. 5. Each switch port 433*b*, I, J, K, L, M, N, O, P, is assigned either a MSISDN-MIN number or a directory number. Each SRM 50 is assigned a MSISDIN-MIN number 433*b* that can be permanently assigned or algorithmically rotated. Referring to FIG. 27, when the SW/SSP 87 serves as a virtual Gateway MSC each embedded port is classified by the host GSM PLMN as a mobile subscriber. This is quite useful for the SVRO service because many channel performance advantages can be taken advantage of. For example when STEP gate way 51 originated call is routed through the currently serving MSC 53 it uses ISUP 232 and HDLC 225 protocols through an assigned channel topology that is a direct physical and logical channel link that bypasses the GSM PLMN Interworking Function (IWF) 57.

In some cases there are contained within the physical and logical layers of the IWF, are physically and algorithmically in bound and out bound compression and decompression modalities that are used for voice communications between air interface links and landline links. The invention is designed to bypass the IWF 57 in order to eliminate the compression/decompression and or nominal state to compression state procedure that occurs when a voice/data call is originated through the GSM PLMN from a mobile/SW/SSP 87 to an SRM 50 via an IWF 57 gateway and the conventional Gateway MSC 53*a*. Conversely when the SRM 50 performs a voice/data call to the STEP gateway 51 SW/SSP 87 and uses a modified service layer protocol, that enables a data call which bypasses the compression/decompression of the TRAU unit, that is located at the Base Site Controller (BSC) 63, a much better data throughput performance is achieved. Therefore the Holophasec 3D Codec 58 that used by the SRM 50 and the H3D-Codec 68*a* located at the Virtual STEP Gateway SW/SSP 87 and used by each communication port, can have decompressed/clear channels to transfer voice and data information from any point of origination to any point of termination bi-directionally. The invention also enables additional application specific uses for example the inventions means and methods can be utilised to communicate 391 over High Altitude Low Orbit (HALO) aircraft that 387 act as communication base sites 389 that communicate 390 with designated ground stations 368. The SVRO Holophasec 3D Codec (H3D-Codec) 68, 68a and 68a can be utilised to support multiple data communications and voice over once user channel. In still another scenario an SRM 50b can be configured to communicate 392 with any satellite ground station 368 via any geosynchronous (GEO) satellite 368 or low earth orbit (LEO) 368a such as Iridium and the like. A satellite ground station 368 can be linked physically 377 and algorithmically; utilising ISUP 232 and HDLC 225 protocols with the inventions STEP gateway system 51

Additional objects and advantages of the invention will readily occur to those skilled in the art. The invention in its broader aspects is not limited to specific details, representative devices, and illustrative examples shown and described. Accordingly, departures may be made from such details without departing from the spirit or scope of the general invention's means and methods defined by the appended claims and their equivalents.

What is claimed is:

1. A method of communicating data over a communication network the data comprising a plurality of data code words or contextual characters, wherein the method comprises:
    substituting each data code word or contextual character of the data to be communicated with a transmitter symbol representing the data code word or contextual character to convert the data into a sequence of symbols for transmission, wherein each transmitter symbol is selected from a transmitter symbol alphabet comprising a plurality of transmitter symbols, and wherein each transmitter symbol of the transmitter symbol alphabet is a waveform construct assigned to represent a corresponding data code word or contextual character;
    wherein the transmitter symbol alphabet is generated using evolutionary synthesis including calculating fitness of each symbol in the set for transmission over the channel and ranking the fitness of each symbol;
    subjecting the sequence of symbols to voice encoding using a vocoder to encode the data into a plurality of data frames having a same format as voice frames, the data frames to be handled as voice frames for transmission;
    transmitting the data frames as voice frames via a digital communication network;
    receiving the data frames as voice frames;
    subjecting the data frames to voice decoding using a vocoder to decode the data frames into a sequence of received symbols, each received symbol having a waveform construct;
    converting the sequence of received symbols into a sequence of data code words or contextual characters by comparing the received symbols to symbols of a receiver symbol alphabet using a pattern matching technique; and
    wherein the receiver symbol alphabet comprises a plurality of receiver symbols, each having a waveform construct assigned to represent a corresponding data code word or contextual character, and wherein each waveform construct of the plurality of receiver symbols corresponds to the waveform construct of the transmitter symbol representing the code word or contextual character modified to take into account the impact of transmission via the communication network on the waveform construct of the transmitter symbol.

2. The method of claim 1 wherein the waveform constructs of the transmitter symbol alphabet symbols are optimized to maximize symbol separation.

3. The method of claim 2 wherein the waveform constructs of the transmitter symbol alphabet are formed by manipulating phase, frequency and amplitude components of one or more of the waveforms constructs to optimize symbol separation between symbols of the transmitter symbol alphabet within limits defined based on transmission channel characteristics.

4. The method of claim 1 wherein the pattern matching technique used for converting the sequence of received symbols into the sequence of data code words or contextual characters is performed using any one or more of:
    neural network, least mean square difference or maximum likelihood pattern matching techniques.

5. The method of claim 1 wherein substituting to convert the data into the sequence of symbols for transmission comprises a data coding rate based on a size of the transmitter symbol alphabet, samples per symbol and sample rate.

6. The method of claim 1 wherein a plurality of corresponding transmitter and receiver symbol alphabet pairs optimized for different channel operational states are provided, wherein the method further comprises selecting one of the plurality of corresponding transmitter and receiver symbol alphabet pairs for use based on a detected channel operational state.

7. The method of claim 6 wherein data coding rates of one or more of the plurality of corresponding transmitter and receiver alphabet pairs are different from one or more other of the plurality of corresponding transmitter and receiver alphabet pairs, and wherein a data coding rate may be changed based on transmitter and receiver alphabet pair selection.

8. The method of claim 1 wherein at least two transmitter symbol alphabets and corresponding receiver symbol alphabets are provided, wherein each transmitter symbol alphabet is designed to have a different spectral shape, and wherein the method further comprises dynamically selecting the transmitter symbol alphabet and corresponding receiver symbol alphabet to vary a signal spectral envelope in order to activate voice activity detection.

9. The method of claim 8 wherein the transmitter symbol alphabet and the corresponding receiver symbol alphabet are changed periodically.

10. The method of claim 1 wherein the transmitter symbol alphabet is generated using evolutionary synthesis further comprising:
    generating a set of contextual symbols, each symbol having a probability of mutation and selection;
    transmitting the set of generated symbols over a communication channel;
    assigning to each symbol a selection probability based in the symbol's fitness rank;
    reproducing a new set of symbols, each new symbol sharing a feature of a selected symbol;
    mutating a symbol to diversify the set; and
    terminating a symbol when a threshold for the symbol is reached.

11. A data communication system adapted for communicating data via a communication network, the data comprising a plurality of data code words or contextual characters, the data communication system comprising:
    a transmitter to substitute each data code word or contextual character of the data to be communicated with a transmitter symbol representing the data code word or contextual character to convert the data into a sequence of symbols for transmission, wherein each transmitter symbol is selected from a transmitter symbol alphabet comprising a plurality of transmitter symbols, and wherein each transmitter symbol of the transmitter symbol alphabet is a waveform construct assigned to represent a corresponding data code word or contextual character, and further wherein the transmitter symbol alphabet is generated using evolutionary synthesis including calculating fitness of each symbol in the set for transmission over the channel and ranking the fitness of each symbol;

the transmitter further to subject the sequence of symbols to voice encoding using a vocoder to encode the data into a plurality of data frames having a same format as voice frames and to be handled as voice frames for transmission, and wherein the transmitter is further to transmit the data frames as voice frames via the communication network; and a receiver to receive the data frames, the receiver to subject the data frames to voice decoding using a vocoder, the receiver to decode the data frames into a sequence of received symbols, each received symbol having a waveform construct, and the receiver to convert the sequence of received symbols into a sequence of data words or contextual characters by comparing the received symbols to symbols of a receiver symbol alphabet using a pattern matching technique, wherein the receiver symbol alphabet comprises a plurality of receiver symbols, each having a waveform construct assigned to represent a corresponding data code word or contextual character, and wherein each waveform construct of the plurality of receiver symbols corresponds to the waveform construct of the transmitter symbol representing the code word or contextual character modified to take into account the impact of transmission via the communication network on the waveform construct of the transmitter symbol.

12. The data communication system of claim 11 wherein each symbol of the transmitter symbol alphabet symbols is a waveform construct formed by manipulating phase, frequency and amplitude components of one or more waveforms to optimize symbol separation between symbols of the transmitter symbol alphabet within limits defined based on transmission channel characteristics.

13. The data communication system of claim 11 wherein a plurality of corresponding transmitter and receiver symbol alphabet pairs optimized for different channel operational states are provided, and wherein one of the plurality of corresponding transmitter and receiver symbol alphabet pairs are selected for use based on a detected channel operational state.

14. The data communication system of claim 11 wherein at least two transmitter symbol alphabets and corresponding receiver symbol alphabets are provided, wherein each transmitter symbol alphabet is designed to have a different spectral shape, wherein the transmitter dynamically selects a transmitter symbol alphabet to vary a signal spectral envelope in order to activate voice activity detection, and wherein the receiver is triggered to select a receiver symbol alphabet corresponding to the selected transmitter symbol alphabet.

15. The data communication system of claim 11 wherein the system is embedded in a modem having memory adapted to store transmitter and receiver symbol alphabets for communication with a corresponding modem storing corresponding transmitter and receiver alphabets.

\* \* \* \* \*